United States Patent
Boone et al.

(10) Patent No.: US 11,033,139 B2
(45) Date of Patent: Jun. 15, 2021

(54) PORTABLE BEVERAGE BREWING AND BEVERAGE ANALYTE TRACKING DEVICES AND SYSTEMS

(71) Applicant: TEANGO TECHNOLOGIES, INC., San Francisco, CA (US)

(72) Inventors: Alexander Boone, San Diego, CA (US); Stanfell Boone, Thousand Oaks, CA (US); Raphael Lozano, San Diego, CA (US)

(73) Assignee: TEANGO TECHNOLOGIES, INC., San Francisco, CA (US)

( * ) Notice: Subject to any disclaimer, the term of this patent is extended or adjusted under 35 U.S.C. 154(b) by 148 days.

(21) Appl. No.: 15/849,621

(22) Filed: Dec. 20, 2017

(65) Prior Publication Data

US 2018/0168385 A1    Jun. 21, 2018

Related U.S. Application Data

(60) Provisional application No. 62/436,990, filed on Dec. 20, 2016, provisional application No. 62/436,993, (Continued)

(51) Int. Cl.
*A47J 31/00* (2006.01)
*A47J 31/18* (2006.01)
*A47J 31/52* (2006.01)

(52) U.S. Cl.
CPC .............. *A47J 31/005* (2013.01); *A47J 31/18* (2013.01); *A47J 31/52* (2013.01); *A47J 31/525* (2018.08);
(Continued)

(58) Field of Classification Search
CPC ......... A47J 31/005; A47J 31/18; A47J 31/46; A47J 31/52; A47J 31/461
(Continued)

(56) References Cited

U.S. PATENT DOCUMENTS 6,272,974 B1    8/2001  Pascotti et al.
6,964,222 B1 *  11/2005 Tucker ................. A47J 31/057
                                                                 99/281
(Continued)

FOREIGN PATENT DOCUMENTS

CN          201675723       12/2010
CN          201905763        7/2011
(Continued)

OTHER PUBLICATIONS

Merriam-Webster, definition of Analyte.*
(Continued)

*Primary Examiner* — Erin E McGrath
(74) *Attorney, Agent, or Firm* — Kwan & Olynick LLP

(57) ABSTRACT

Disclosed are systems, devices and methods for providing a beverage brewing and analyte tracking portable platform. In some embodiments of the disclosed portable beverage brewing and analyte tracking technology, an intelligent beverage management system includes a portable brewing device in communication with a user's mobile device (e.g., smartphone, smartwatch, etc.) for monitoring and controlling consumption and metabolism of caffeine and other compounds from beverages consumed using the portable brewing device and/or other beverages logged by the user. The intelligent beverage management system includes a cloud-based data processing system in communication with the mobile device and/or portable brewing device to receive, process and/or store data associated with brewing of the beverage and data associated with the monitoring of consumption of the beverage and/or certain beverage constituents.

26 Claims, 56 Drawing Sheets

Related U.S. Application Data filed on Dec. 20, 2016, provisional application No. 62/436,995, filed on Dec. 20, 2016, provisional application No. 62/437,407, filed on Dec. 21, 2016, provisional application No. 62/593,852, filed on Dec. 1, 2017, provisional application No. 62/594,494, filed on Dec. 4, 2017, provisional application No. 62/595,534, filed on Dec. 6, 2017.

(52) U.S. Cl.
CPC ....... *A47J 31/5253* (2018.08); *A47J 31/5255* (2018.08)

(58) Field of Classification Search
USPC .............. 99/279–283, 285, 287; 220/592.16, 220/592.17; 422/68.1
See application file for complete search history.

(56) References Cited

U.S. PATENT DOCUMENTS

| | | | |
|---|---|---|---|
| 7,594,469 B2 | 9/2009 | O'Connor et al. | |
| 7,997,786 B2* | 8/2011 | Liu | A47J 27/004 219/438 |
| 8,234,971 B2 | 8/2012 | Cerroni | |
| 8,584,576 B2 | 11/2013 | Fogg | |
| 9,035,222 B2 | 5/2015 | Alexander | |
| 9,713,399 B2 | 7/2017 | Boone et al. | |
| 2003/0226448 A1 | 12/2003 | Cohen | |
| 2007/0051248 A1* | 3/2007 | Lee | A23G 9/045 99/281 |
| 2009/0178569 A1 | 7/2009 | Tucker et al. | |
| 2009/0192366 A1* | 7/2009 | Mensinger | A61B 5/0031 600/301 |
| 2009/0263550 A1* | 10/2009 | Navarini | A47J 31/0615 426/506 |
| 2010/0185142 A1* | 7/2010 | Kamen | A61M 5/14224 604/66 |
| 2010/0186600 A1 | 7/2010 | Lewis et al. | |
| 2010/0331656 A1* | 12/2010 | Mensinger | A61B 5/7445 600/365 |
| 2011/0050431 A1* | 3/2011 | Hood | A47G 19/2227 340/603 |
| 2013/0129871 A1 | 5/2013 | Ye et al. | |
| 2013/0239821 A1 | 9/2013 | Boettcher | |
| 2014/0042651 A1 | 2/2014 | Kay et al. | |
| 2014/0242226 A1* | 8/2014 | Buttiker | A47J 31/5255 426/231 |
| 2014/0305927 A1* | 10/2014 | Alexander | A47J 41/0044 219/387 |
| 2015/0182059 A1 | 7/2015 | Richardson | |
| 2015/0201795 A1* | 7/2015 | Tinkler | A47J 31/46 426/231 |
| 2015/0250429 A1* | 9/2015 | Hampapuram | A61B 5/0022 340/573.1 |
| 2015/0272473 A1* | 10/2015 | Zafiroglu | A61B 5/682 600/302 |
| 2015/0305551 A1 | 10/2015 | Rosati et al. | |
| 2016/0367072 A1 | 12/2016 | Boone et al. | |

FOREIGN PATENT DOCUMENTS

| | | |
|---|---|---|
| KR | 101667296 | 10/2016 |
| WO | 2010101658 | 9/2010 |
| WO | 2016205561 | 12/2016 |

OTHER PUBLICATIONS

Merriam-Webster, definition of Detect.*
PCT/US2017/067755 International Search Report and Written Opinion dated Jun. 7, 2018.
PCT/US2016/037929 International Search Report and Written Opinion dated Dec. 8, 2016.

* cited by examiner

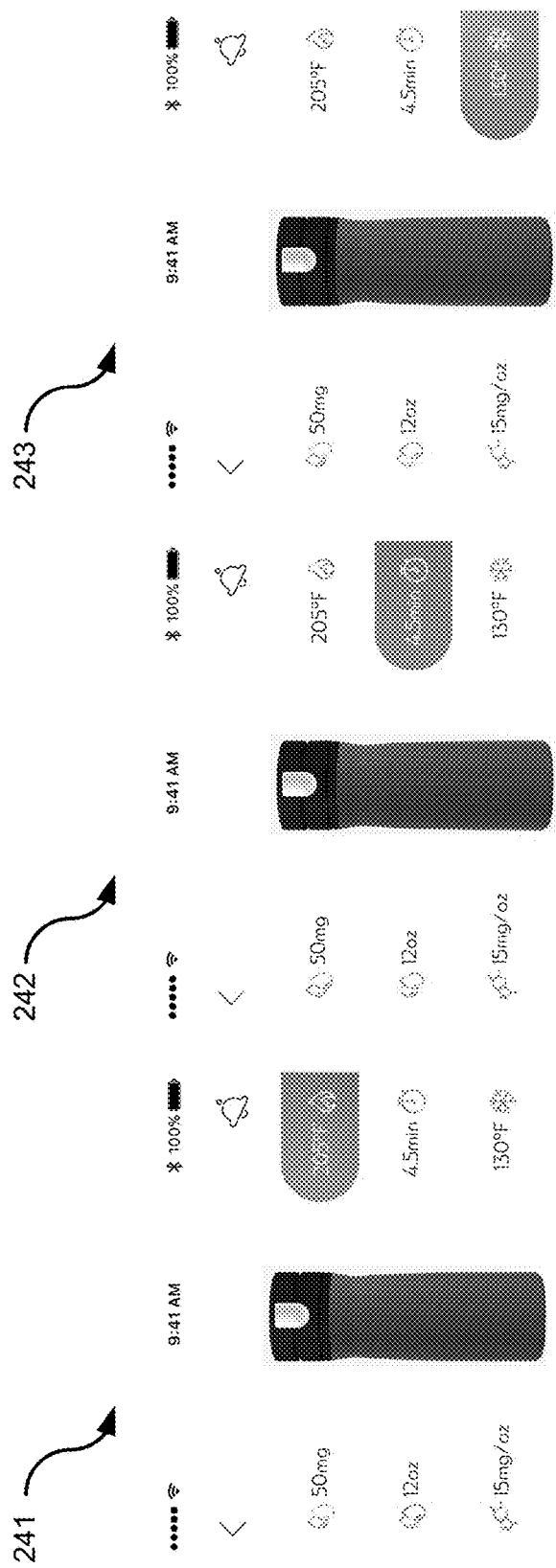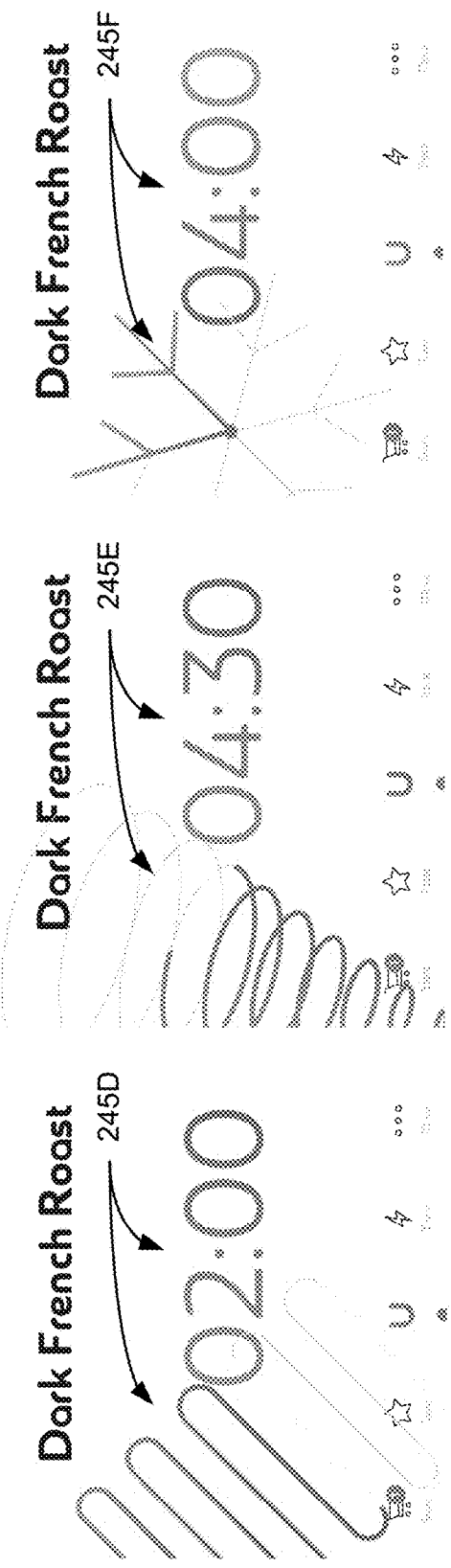
FIG. 2D  FIG. 2E  FIG. 2F

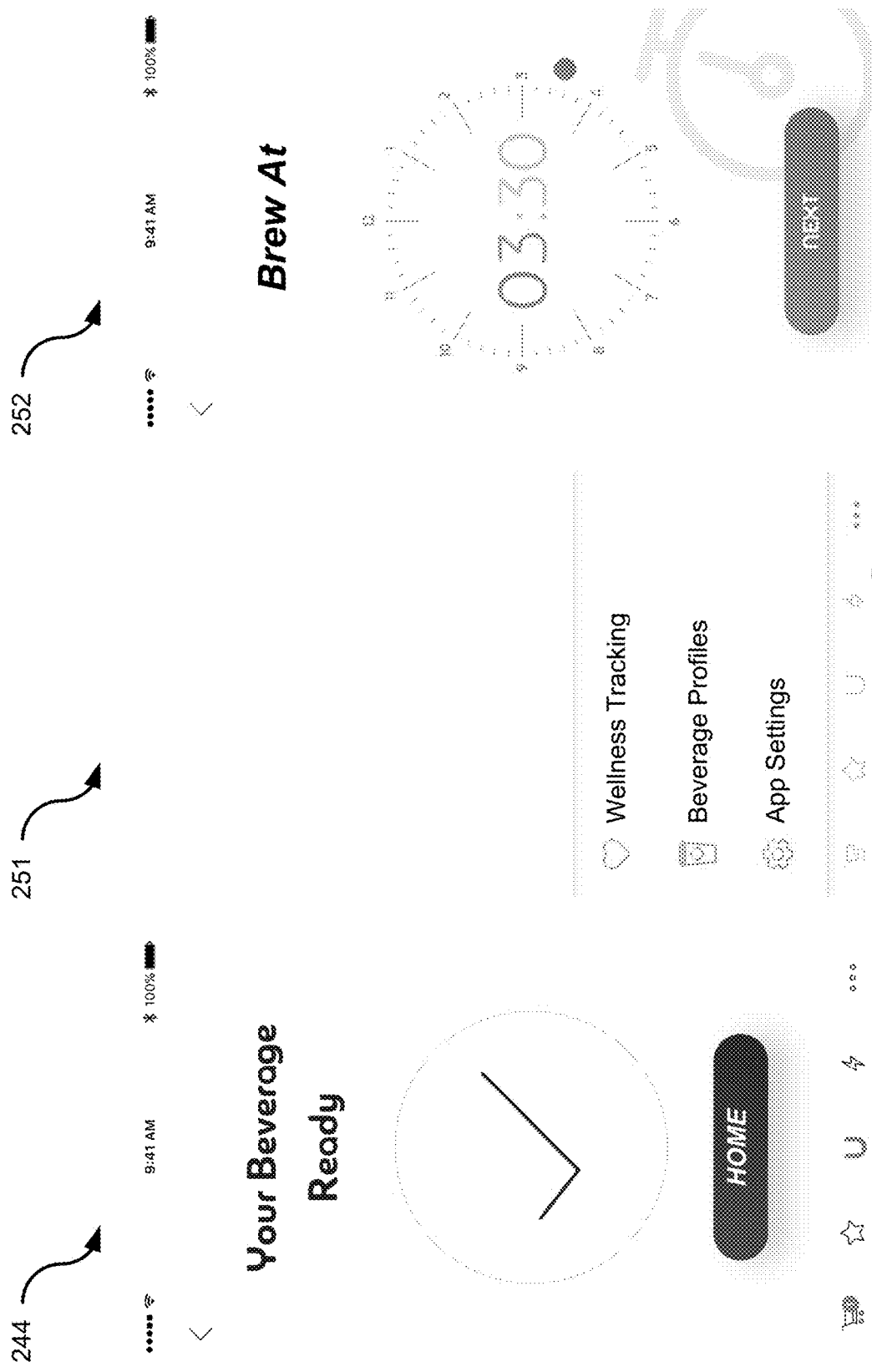

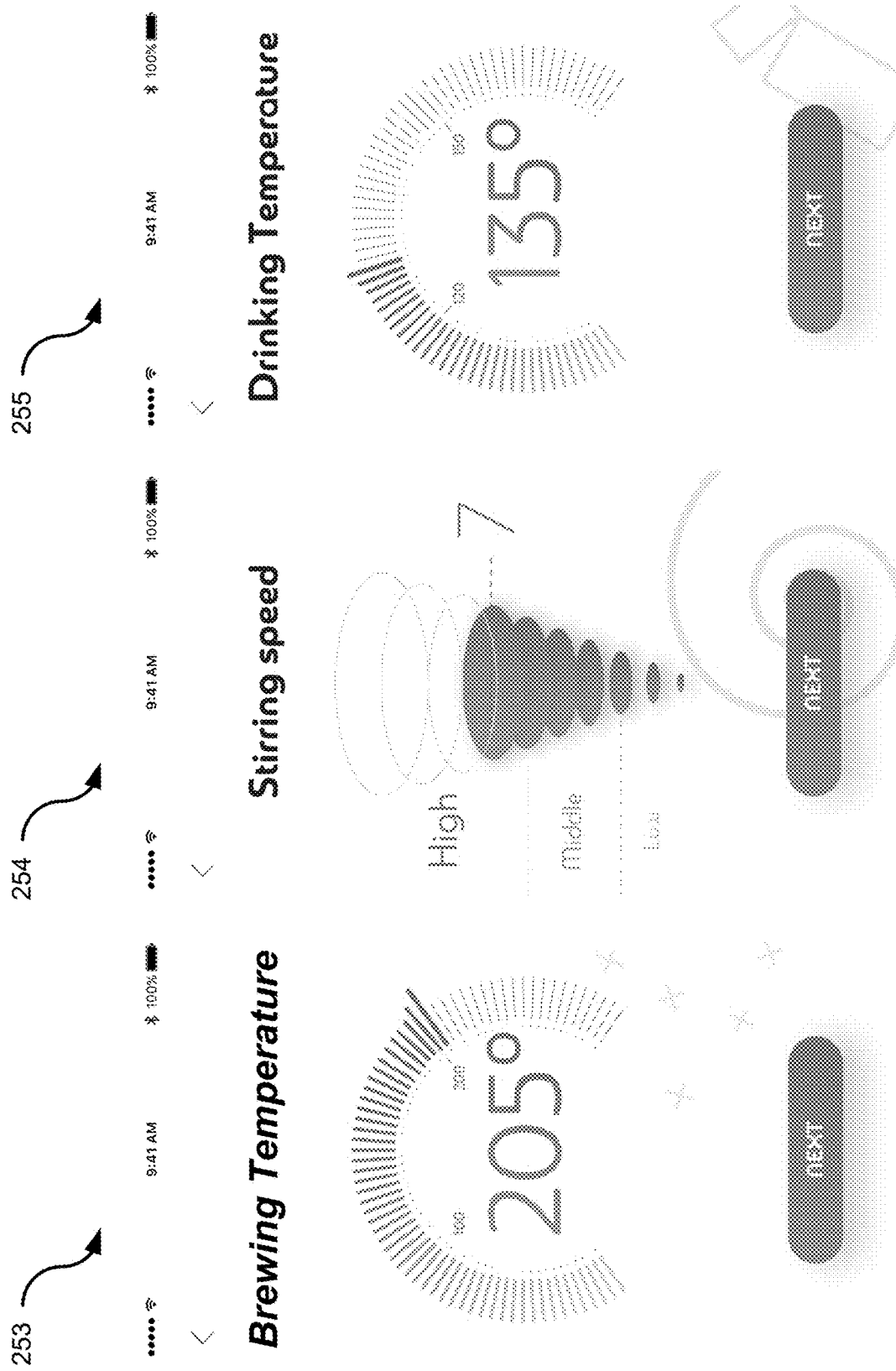

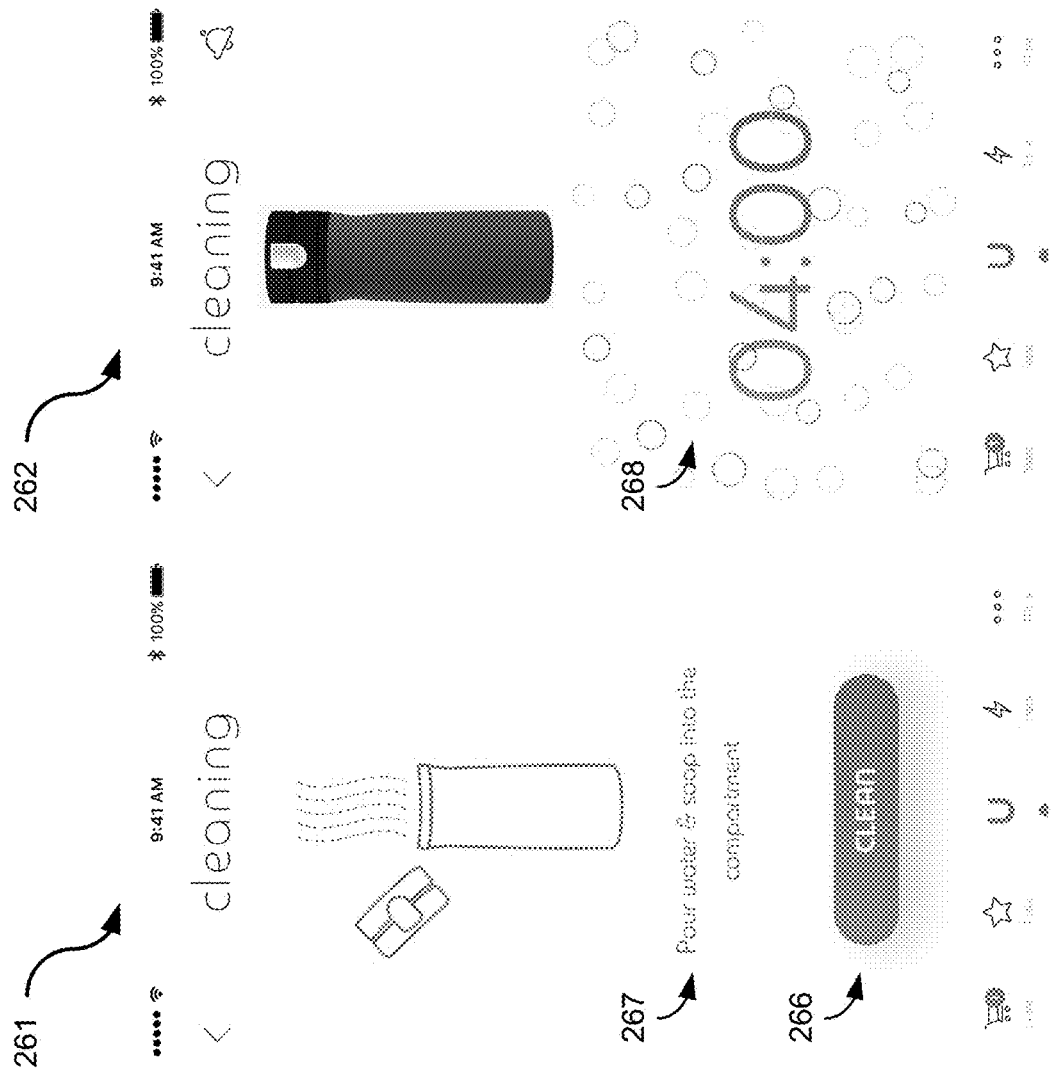

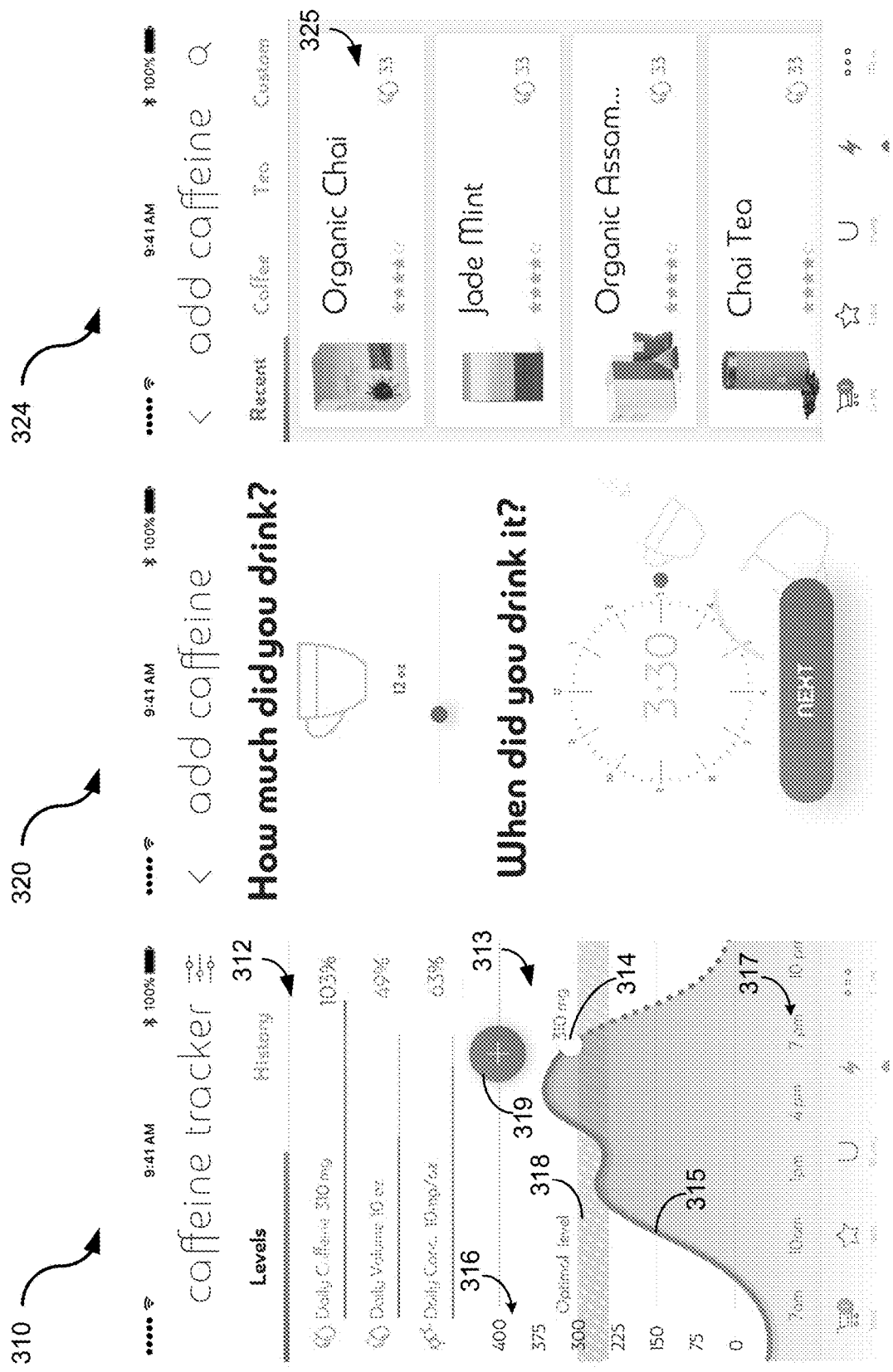

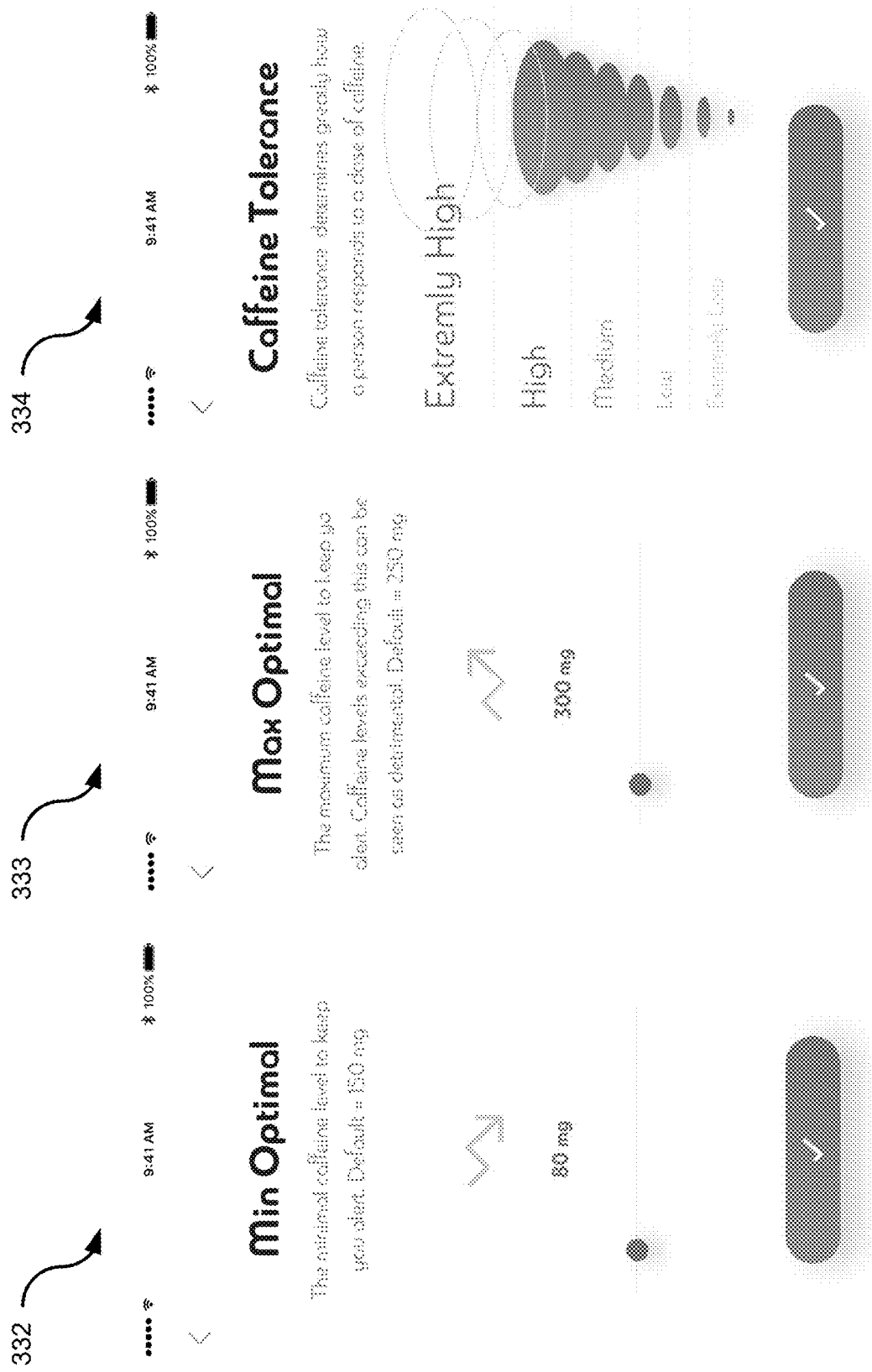

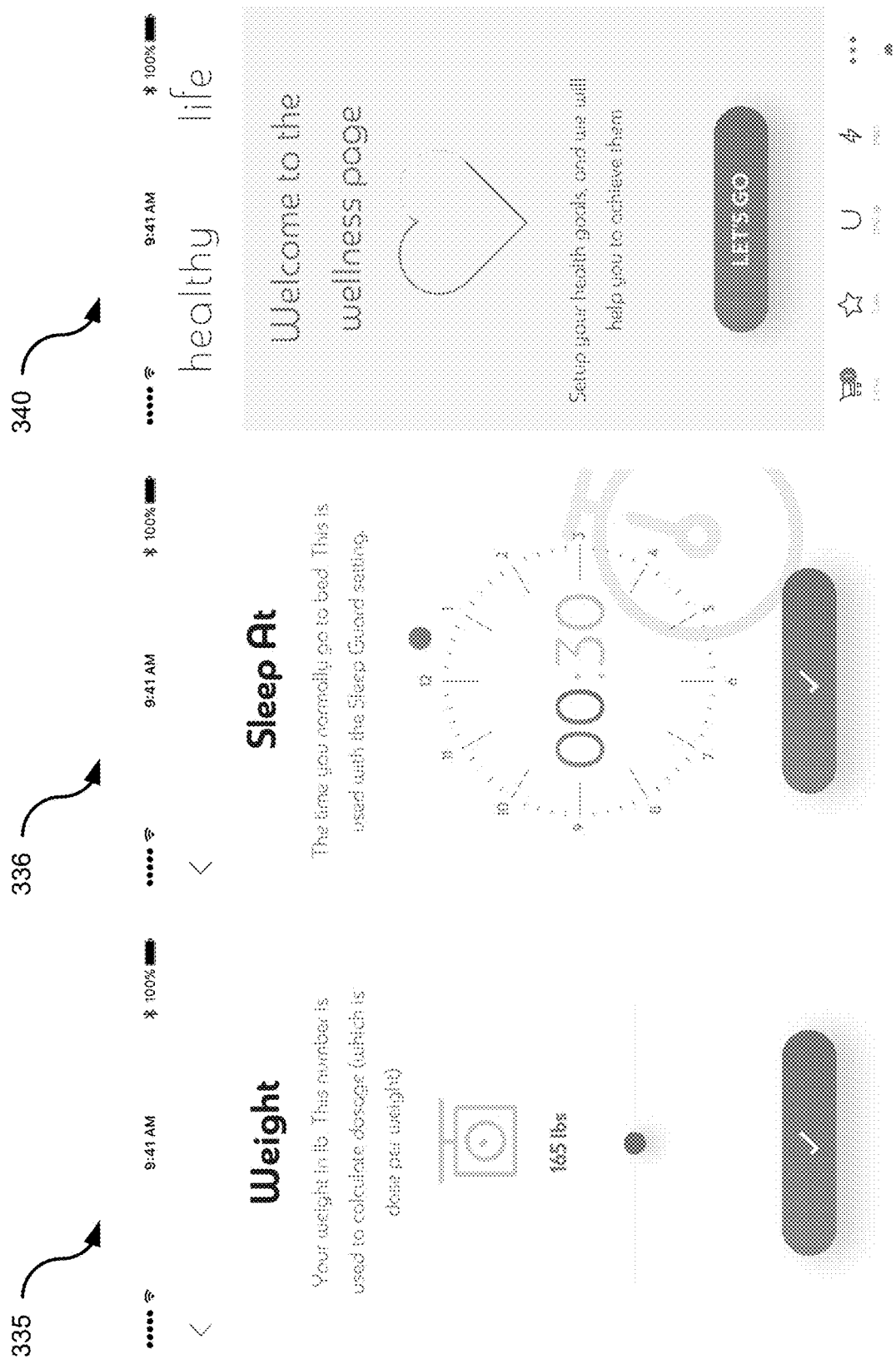

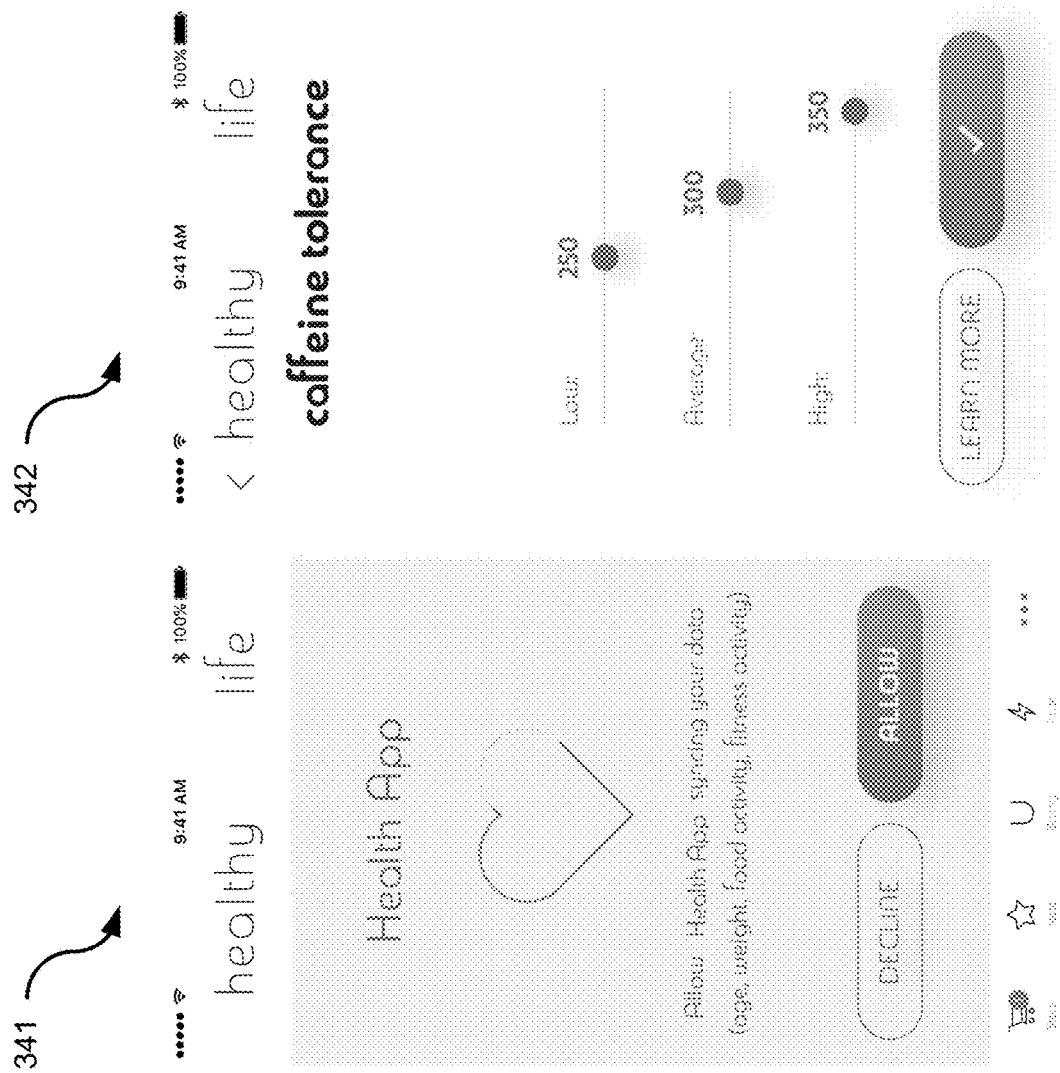

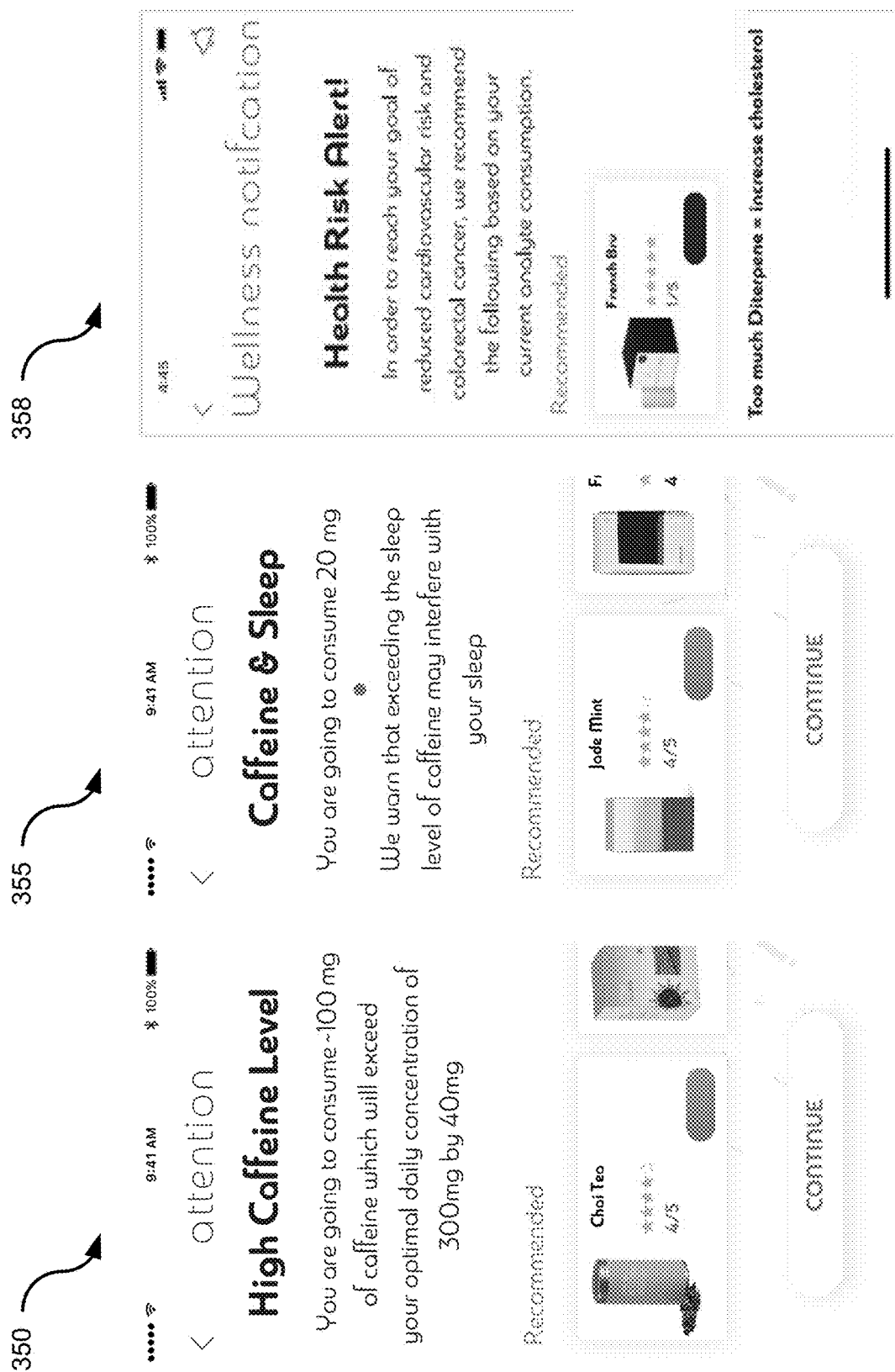

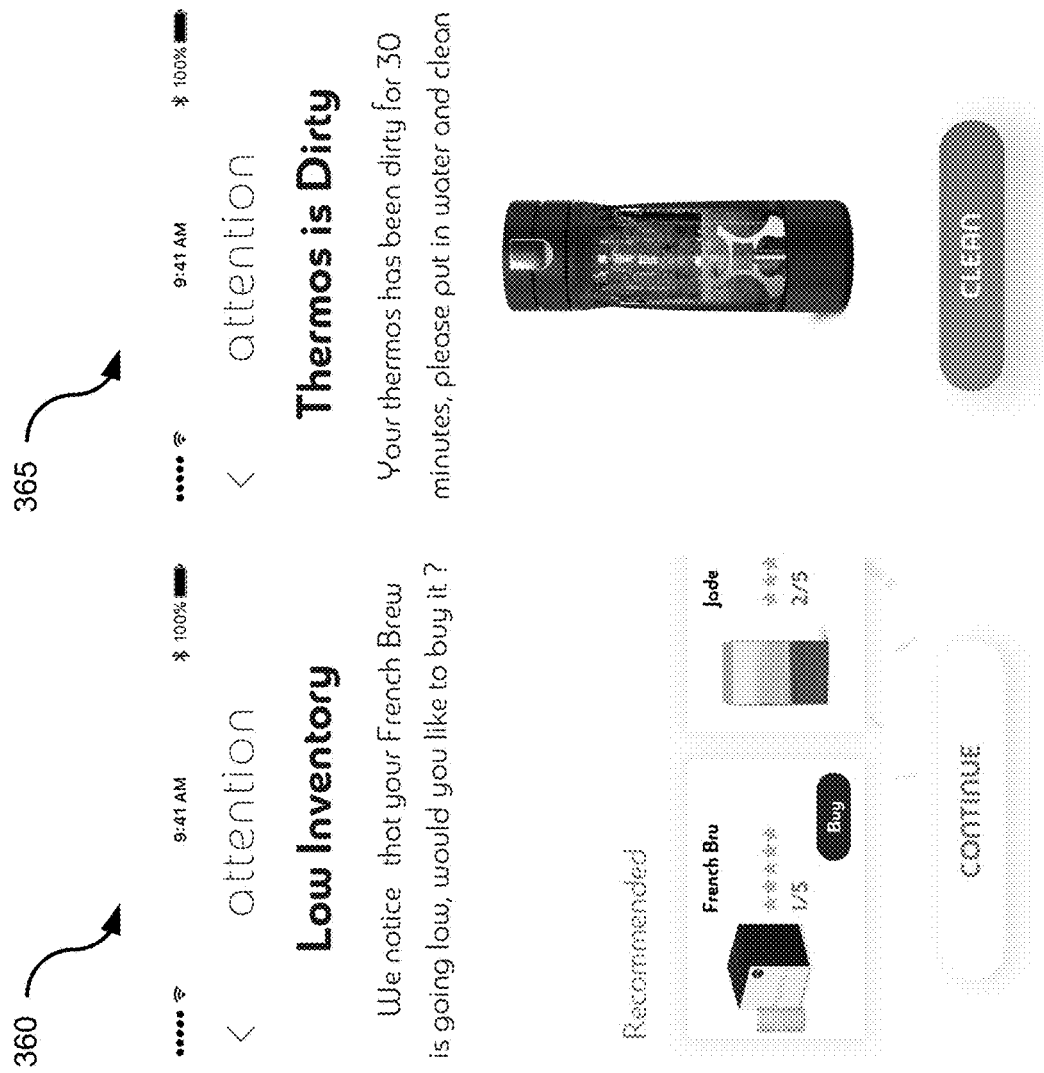

Closed position - sealed

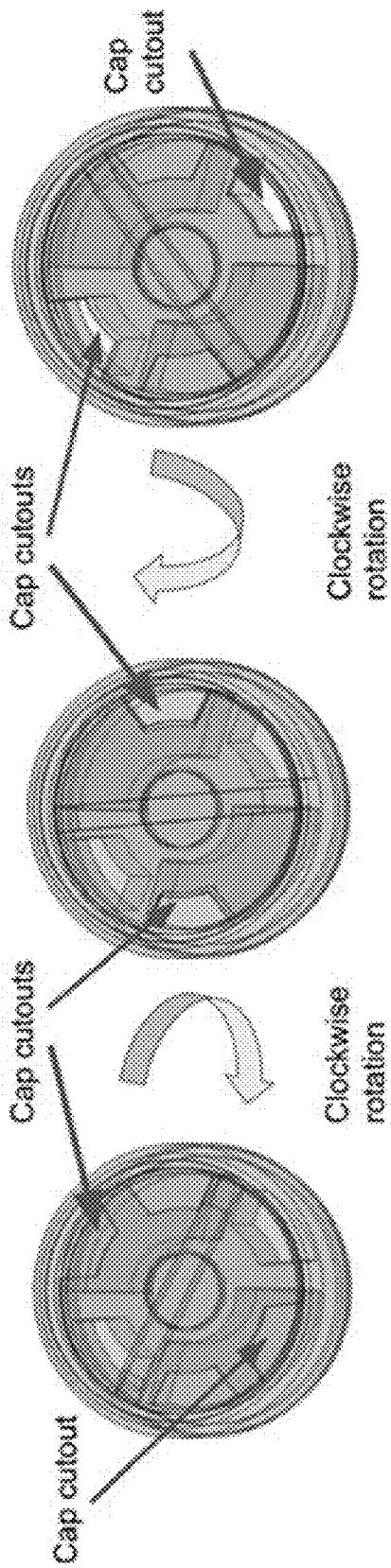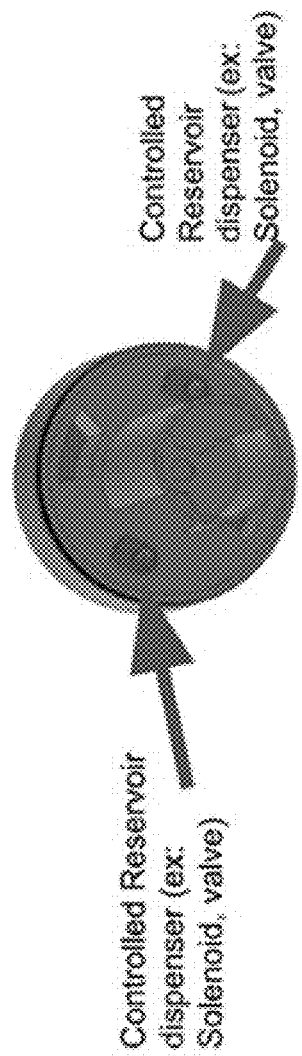
FIG. 15A — Cap cutout — Closed (no fluid can leave chamber)
FIG. 15B — Cap cutouts — Clockwise rotation — Open to Reservoir (ex: milk and sugar can be added)
FIG. 15C — Cap cutouts — Cap cutout — Clockwise rotation — Open to mouthpiece/dispenser (fluid can leave chamber)
FIG. 15D — Controlled Reservoir dispenser (ex: Solenoid, valve)

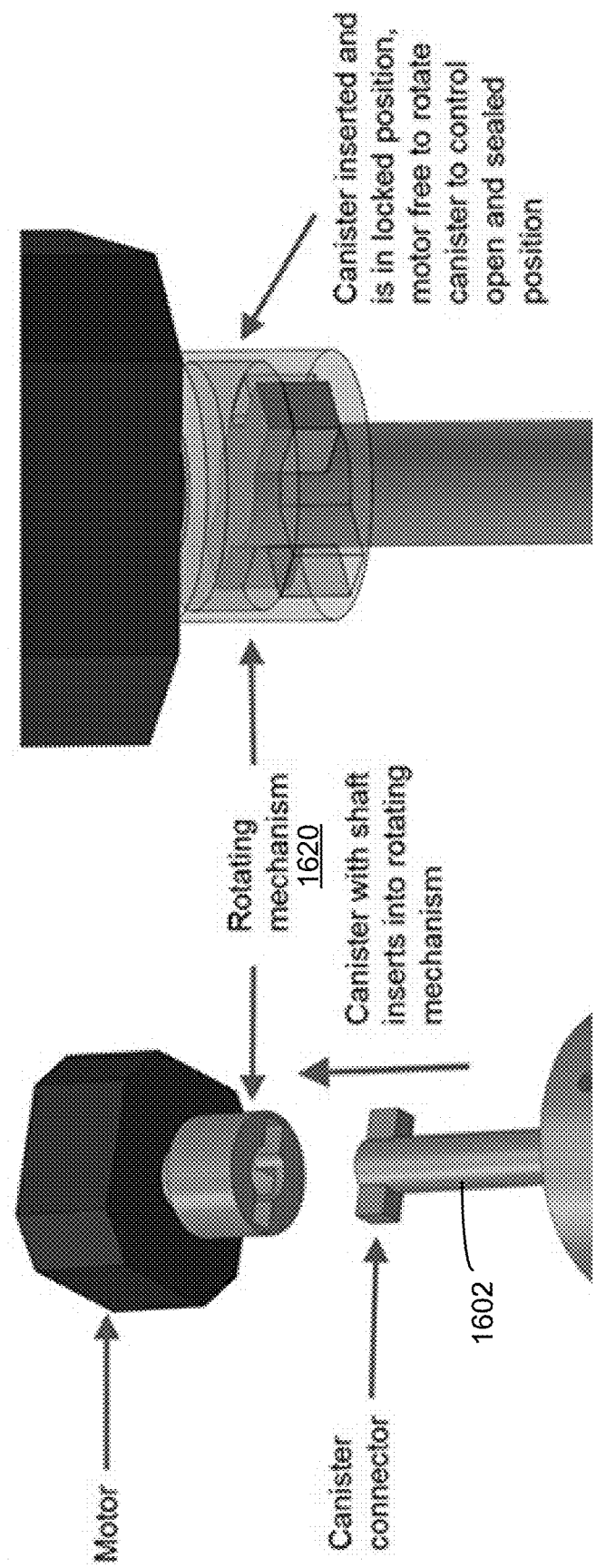

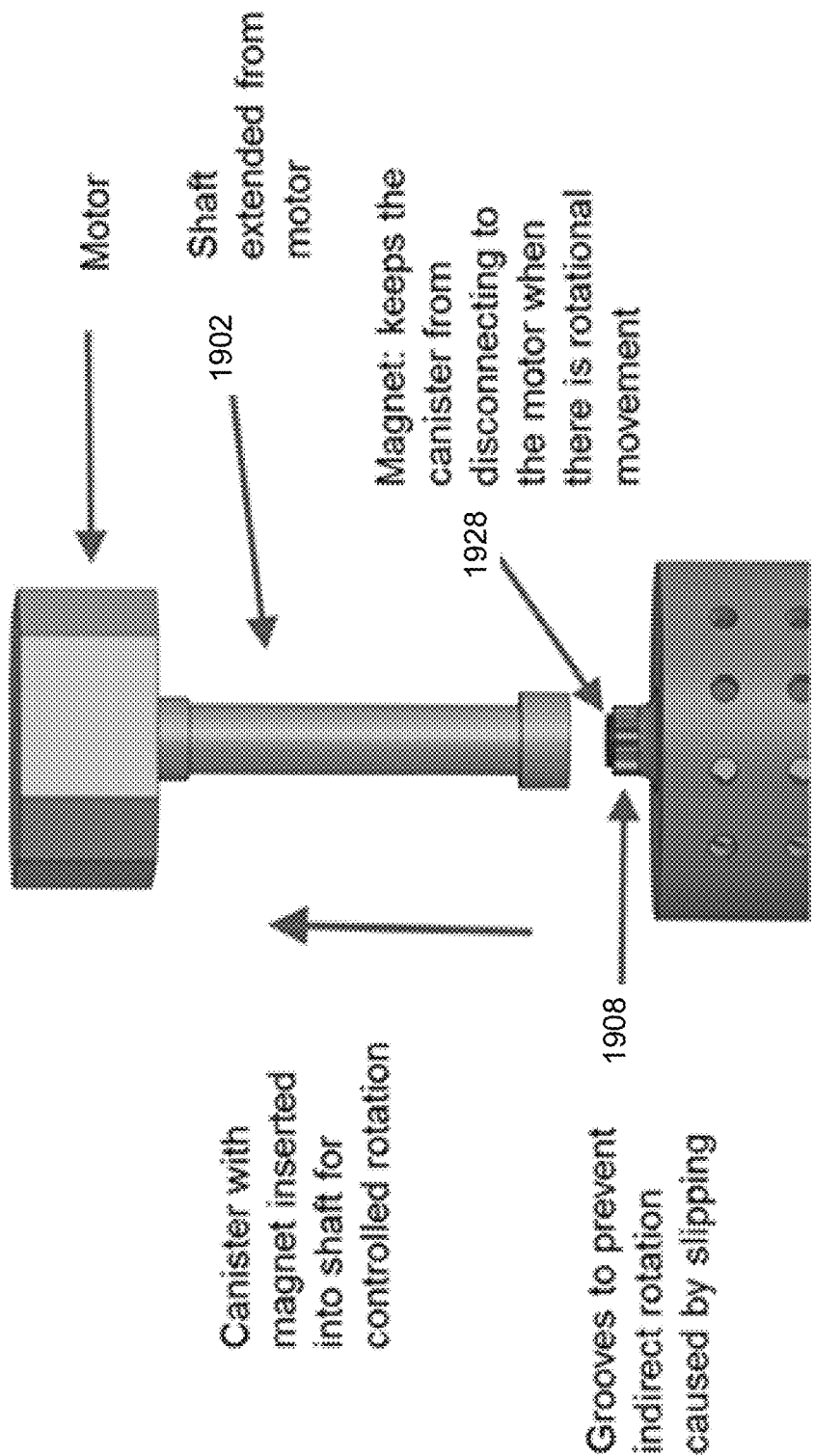

PORTABLE BEVERAGE BREWING AND BEVERAGE ANALYTE TRACKING DEVICES AND SYSTEMS

CROSS-REFERENCE TO RELATED APPLICATIONS

This patent document claims the priority to and benefits of U.S. Provisional Patent Application No. 62/436,993 entitled "PORTABLE DEVICES FOR PREPARING AND TRANSPORTING BREWABLE BEVERAGES" filed on Dec. 20, 2016; U.S. Provisional Patent Application No. 62/436,990 entitled "REMOVABLE LID FOR CONTROLLED VENTING OF A CONTAINER" filed on Dec. 20, 2016; U.S. Provisional Patent Application No. 62/436,995 entitled "POD SYSTEM FOR PORTABLE BEVERAGE BREWING DEVICE" filed on Dec. 20, 2016; U.S. Provisional Patent Application No. 62/437,407 entitled "BEVERAGE BREWING DEVICE ECOSYSTEM" filed on Dec. 21, 2016; U.S. Provisional Patent Application No. 62/593,852 entitled "PORTABLE BEVERAGE BREWING AND BEVERAGE ANALYTE TRACKING DEVICES AND SYSTEMS" filed on Dec. 1, 2017; U.S. Provisional Patent Application No. 62/594,494 entitled "PORTABLE BEVERAGE BREWING AND BEVERAGE ANALYTE TRACKING DEVICES AND SYSTEMS" filed on Dec. 4, 2017; and U.S. Provisional Patent Application No. 62/595,534 entitled "PORTABLE BEVERAGE BREWING AND BEVERAGE ANALYTE TRACKING DEVICES AND SYSTEMS" filed on Dec. 6, 2017. The entire content of the aforementioned patent applications are incorporated by reference as part of the disclosure of this patent document.

TECHNICAL FIELD

This patent document relates to devices, processes, platforms, systems, and media for portable brewing of beverages and consumption tracking of beverage constituents.

BACKGROUND

Tea is a beverage that is ubiquitously enjoyed globally. For example, tea is the second most widely consumed beverage in the world, after water. Tea is derived from leaves of the plant *Camellia sinensis*, and can be processed in various ways, with various herbs and other ingredients from many sources, and with various different flavors to produce various types of teas. Typically, tea is brewed or infused using a hot (or in some cases, cold) solvent, such as water, to extract flavors, colors, and aroma from the tea source. People drink tea based on a variety of reasons, e.g., including the health benefits of certain teas, as a stimulant, for the flavor and aromas, and/or based on cultural behaviors. Similarly, coffee is also a ubiquitously enjoyed beverage and is the third most widely beverage in the world after tea. Typically, coffee is brewed or infused in a manner similar to tea and people drink it for similar reasons.

SUMMARY

Disclosed are systems, devices, platforms, mechanisms, media, and methods for providing a portable beverage brewing and tracking platform, including a portable brewing container operable for brewing and regulating characteristics of brewable beverages and for monitoring and guiding the user's consumption of compounds from the brewed beverages.

In some embodiments in accordance with the present technology, a brewing canister assembly, includes a canister frame including a base coupled to a wall including a first wall region and a second wall region adjoining the first wall region, the base and the wall forming an interior region providing a brewing chamber, wherein the first wall region is structured to include an interior cavity and at least one opening through the first wall region and the interior cavity, and the second wall region is structured to include an internal cavity positionally aligned with the interior cavity of the first wall region; a barricade structure configured to move between the internal cavity of the second wall region and the interior cavity of the first wall region, wherein the barricade structure obstructs the at least one opening of the first wall region when positioned in the interior cavity; and an actuator operable to modulate movement of one or both of the canister frame and the barricade structure between an open position that exposes the at least one opening and a closed position blocks the at least one opening, such that fluid located outside the brewing canister assembly is able to flow in and out of the brewing chamber when in the open position and is unable to flow in and out of the brewing chamber when in the closed position, wherein the brewing canister assembly is operable to contain a brewing material in the brewing chamber and regulate fluid flow in and out of the canister frame to brew the brewing material.

In some embodiments in accordance with the present technology, a portable beverage brewing device includes a container body having an interior chamber to contain a fluid; and a brewing canister assembly positioned in the interior chamber and structured to include (i) at least one component operable to move between a closed position and an open position, the open position providing at least one hole between an exterior and an interior of the brewing canister assembly, and (ii) an actuator configured to modulate movement of the at least one component between the open position and the closed position, such that the fluid is able to flow in and out of the brewing canister assembly when in the open position and is unable to flow in and out of the brewing canister assembly when in the closed position.

In some embodiments in accordance with the present technology, a portable beverage brewing device includes a container body having an interior chamber to contain a fluid; a brewing canister assembly positioned in the interior chamber and structured to include (i) at least one component operable to move between a closed position and an open position, the open position providing at least one hole between an exterior and an interior of the brewing canister assembly, and (ii) an actuator configured to modulate movement of the at least one component between the open position and the closed position, such that the fluid is able to flow in and out of the brewing canister assembly when in the open position and is unable to flow in and out of the brewing canister assembly when in the closed position, wherein the brewing canister assembly is operable to contain a brewing material in the interior chamber and regulate fluid flow in and out of the brewing canister assembly to brew the brewing material; one or more modular units configured to function based on a received command to regulate one or more parameters associated with a beverage to be brewed by the portable beverage brewing device, wherein the one or more modular units includes a heating unit to heat the fluid; and a data processing unit including a processor and a memory and configured to process data and command the brewing canister assembly and the one or more modular units of the portable beverage brewing device.

In some embodiments in accordance with the present technology, a system for portably brewing a beverage includes a portable beverage brewing device, comprising a container body having an interior chamber to contain a fluid; a brewing canister assembly positioned in the interior chamber and structured to include (i) one or more components that move upon a command between a closed position and an open position, the open position providing at least one hole between an exterior and an interior of the brewing canister assembly, and (ii) an actuator operable to modulate between the open position and the closed position, such that the fluid is able to flow in and out of the brewing canister assembly when in the open position and is unable to flow in and out of the brewing canister assembly when in the closed position; a flow sensor to detect fluid flow of a brewed beverage from the device; an analyte sensor to detect a parameter associated with a constituent of the brewed beverage; and a processing unit including a processor and a memory and configured to process data and command at least some modular units of the portable beverage brewing device including the brewing canister assembly; a mobile communication device in wireless communication with the portable beverage brewing device, the mobile communication device including a data processing unit including a processor and memory to receive and process data, wherein at least one of the portable beverage brewing device or the mobile communication device includes a software application program product comprising a non-transitory computer-readable storage medium having instructions, which when executed by the processor, cause the device to change a parameter associated with brewing a beverage using the portable beverage brewing device; and one or more computers in communication with the mobile communications device via a communication network or link, wherein the one or more computers include software modules configured to provide artificial intelligence analyzing and learning about substances consumed from the beverage and to control at least one functionality of the portable beverage brewing device in response to the artificial intelligence, wherein the one or more computers are configured to produce a command to be received by the portable beverage brewing device to adapt a beverage brewing protocol.

In some embodiments in accordance with the present technology, a system for portably brewing a beverage includes a portable beverage brewing device, comprising a container body having an interior chamber to contain a fluid; a brewing canister assembly positioned in the interior chamber and structured to include (i) one or more components that move upon a command between a closed position and an open position, the open position providing at least one hole between an exterior and an interior of the brewing canister assembly, and (ii) an actuator operable to modulate between the open position and the closed position, such that the fluid is able to flow in and out of the brewing canister assembly when in the open position and is unable to flow in and out of the brewing canister assembly when in the closed position; a flow sensor to detect fluid flow of a brewed beverage from the device; an analyte sensor to detect a parameter associated with a constituent of the brewed beverage; and a processing unit including a processor and a memory and configured to process data and command at least some modular units of the portable beverage brewing device including the brewing canister assembly; a mobile communication device in wireless communication with the portable beverage brewing device, the mobile communication device including a data processing unit including a processor and memory to receive and process data, wherein at least one of the portable beverage brewing device or the mobile communication device includes a software application program product comprising a non-transitory computer-readable storage medium having instructions, which when executed by the processor, cause the device to change a parameter associated with brewing a beverage using the portable beverage brewing device; one or more computers in communication with the mobile communications device via a communication network or link, wherein the one or more computers include software modules configured to provide artificial intelligence analyzing and learning about substances consumed from the beverage and to control at least one functionality of the portable beverage brewing device in response to the artificial intelligence, wherein the one or more computers are configured to produce a command to be received by the portable beverage brewing device to adapt a beverage brewing protocol; and a client computer of a beverage material vendor in communication with the one or more computers and operable to receive and process commands generated by the one or more computers, wherein the client computer includes a vendor software application program product comprising a non-transitory computer-readable storage medium having instructions, which when executed by a processor of the client computer, cause the client computer to determine a change to one or more of a production parameter associated with producing the brewing material, a packaging parameter associated with packaging a produced brewing material, a storage parameter associated with a packaged and produced brewing material, or a delivery parameter associated with a packaged and produced brewing material.

In some embodiments in accordance with the present technology, a beverage pod for brewing a beverage includes a pod structure to contain a brewing material and having a shape to fit into an interior region of a brewing canister assembly, the pod structure including a porous material allowing fluid to contact the brewing material and extract constituents of the brewing material for a brewed beverage.

In some embodiments in accordance with the present technology, a beverage pod maker includes a first container to hold a beverage material; a beverage pod material attachable to a bottom region of the first container and structured to include an opening aligned with the first container to allow the beverage material to enter therein; and a pod closure mechanism configured to seal the opening of the beverage pod material after the beverage material enters the beverage pod material from the first container.

In some embodiments in accordance with the present technology, a beverage pod maker includes a beverage material chamber; a pod material holder; and a pod closure mechanism configured to seal the pod material together after the beverage material in the beverage material chamber is placed in the pod material.

In some embodiments in accordance with the present technology, a beverage pod maker includes a beverage material chamber; a beverage material grinder positioned in the beverage material chamber; a pod material holder; and a pod closure mechanism configured to seal the pod material together after the beverage material in the beverage material chamber is ground and placed in the pod material.

In some embodiments in accordance with the present technology, a portable beverage device includes a container body having an interior chamber to contain a fluid; and a spinning mechanism positioned in the interior chamber configured for one or more of (i) cleaning, (ii) cleaning and extraction, (iii) cooling and/or venting/exposure to air, or (iv) extraction and cooling.

In some embodiments in accordance with the present technology, a removable ventable lid includes at least one hole positioning in the bottom of the lid; and (i) at least one piece operable to move between a closed position and an open position, the open position providing at least one hole positioned in the bottom of the lid access to the exterior of the lid and the closed position preventing access of the at least one hole at the bottom of the lid access to the exterior of the lid (ii) an actuator configured to modulate movement of the at least one piece between the open position and the closed position, such that air is able to flow in and out of the at least one hole when in the open position and is unable to flow in and out of the at least one hole when in the closed position.

In some embodiments in accordance with the present technology, a beverage device includes a container body having an interior chamber to contain a fluidic beverage; a flow sensor to detect fluid flow of the fluidic beverage from the device; and a data processing unit including a processor and a memory and configured to process data received from the fluid sensor.

In some embodiments in accordance with the present technology, a method for monitoring and guiding a user's consumption of beverage compounds consumed from a beverage device includes obtaining data associated with a beverage in a beverage device; measuring one or more values associated dispensing of the beverage from the beverage device, the measuring using a fluid sensor of the beverage device; and analyzing the one or more values to determine one or more beverage constituent parameters associated with a beverage constituent consumed by the user over a time period.

In some embodiments in accordance with the present technology, a method for monitoring and guiding a user's consumption of compounds from brewed beverages includes detecting a beverage constituent of a beverage using a sensor of a beverage device; analyzing the detected beverage constituent to determine one or more parameters associated with the beverage constituent consumed by a user over time period; obtaining health data of the user; processing the one or more parameters associated with the beverage constituent and the health data to determine a quantitative effect on a health and wellness goal or a beverage constituent consumption goal associated with the user; and generating a command to change an operation of the beverage device based on the determined quantitative effect; and/or generating a notification to be delivered to the user based on the determined quantitative effect.

In some embodiments in accordance with the present technology, a method for monitoring and guiding a user's consumption of compounds from the brewed beverages includes detecting a beverage constituent of a beverage using a sensor of a beverage device; analyzing the detected beverage constituent to determine one or more parameters associated with the beverage constituent consumed by a user over time period; obtaining taste preference data of the user; processing the one or more parameters associated with the beverage constituent and the taste preference data to produce a brewable beverage product profile associated with the user; and generating a command with instructions to be received by a client computer of a beverage material vendor to modify a beverage material production process to customize a beverage product according to one or more taste parameters from the brewable beverage product profile.

Implementations of the present technology include one or more of the example features described herein. In some embodiments of the disclosed portable beverage brewing and compound tracking technology, for example, an intelligent beverage management system includes a portable brewing device in communication with a user's mobile device (e.g., smartphone, smartwatch, etc.) including an software application for monitoring and controlling consumption and metabolism of caffeine and other compounds from beverages consumed using the portable brewing device and/or other beverages logged by the user. The intelligent beverage management system includes a cloud-based data processing system in communication with the mobile device and/or portable brewing device to receive, process and/or store data associated with brewing of the beverage and data associated with the monitoring of consumption of the beverage and/or certain beverage constituents. In implementations, the cloud-based data processing system is able to provide artificial intelligence for analyzing and learning about the substances the user consumes from beverages, for controlling various functionalities of the portable brewing device to adapt brewed beverages for optimal health and enjoyment purposes, and for communicating (e.g., alerting, recommending, etc.) to the user about their past, present and predicted future beverage consumption behaviors and effects thereof.

The subject matter described herein is optionally implemented in specific ways that provide one or more of the features described herein. By way of example, the disclosed portable brewing technology can allow users to add and store water and brewing materials separately, and initiate brewing of the tea, coffee, or other brewing materials anywhere and anytime. The disclosed portable brewing technology provides control of flow of fluid (e.g., water, etc.) using a specialized canister, heating, cooling, and sealing to brew the beverage (e.g., tea, coffee, etc.) in a user convenient, portable, durable device. Importantly, the portable brewing technology disclosed herein stores fluid and brewing materials separately to control when brewing starts, but does this in a space-efficient manner to further the portability and/or decrease the size of a brewing device employing the portable brewing technology. This is achieved by storing the brewing material in a canister assembly that is submerged in the fluid in which water cannot initially flow in, but that precisely controls contact between the fluid and the brewing material (e.g., via controlled flow of the fluid in/out of the canister) by controlling movement of components of the canister. For example, to brew a beverage, a user can simply activate a brewing sequence to initiate heating and brewing of the beverage, e.g., by push of a button on the portable brewing device or using the app of the mobile device. In some implementations, the user can activate a sequence to cool the brewed beverage to a desired drinking temperature. In some embodiments, the portable brewing device and/or the app on the mobile device includes safety features, such as an external display that optionally alerts the user to the current temperature, or the programmed drinking temperature of the brewed beverage.

BRIEF DESCRIPTION OF THE DRAWINGS

FIGS. 15A-15D show diagrams of an example embodiment of a lid for a portable brewing device in accordance with the disclosed technology.

FIGS. 16A and 16B show diagrams of an example embodiment of a linking assembly for attaching an example brewing canister to a motor.

FIG. 19 shows a diagram of an example embodiment for connecting an example brewing canister to a motor.

DETAILED DESCRIPTION

Figure 1A:
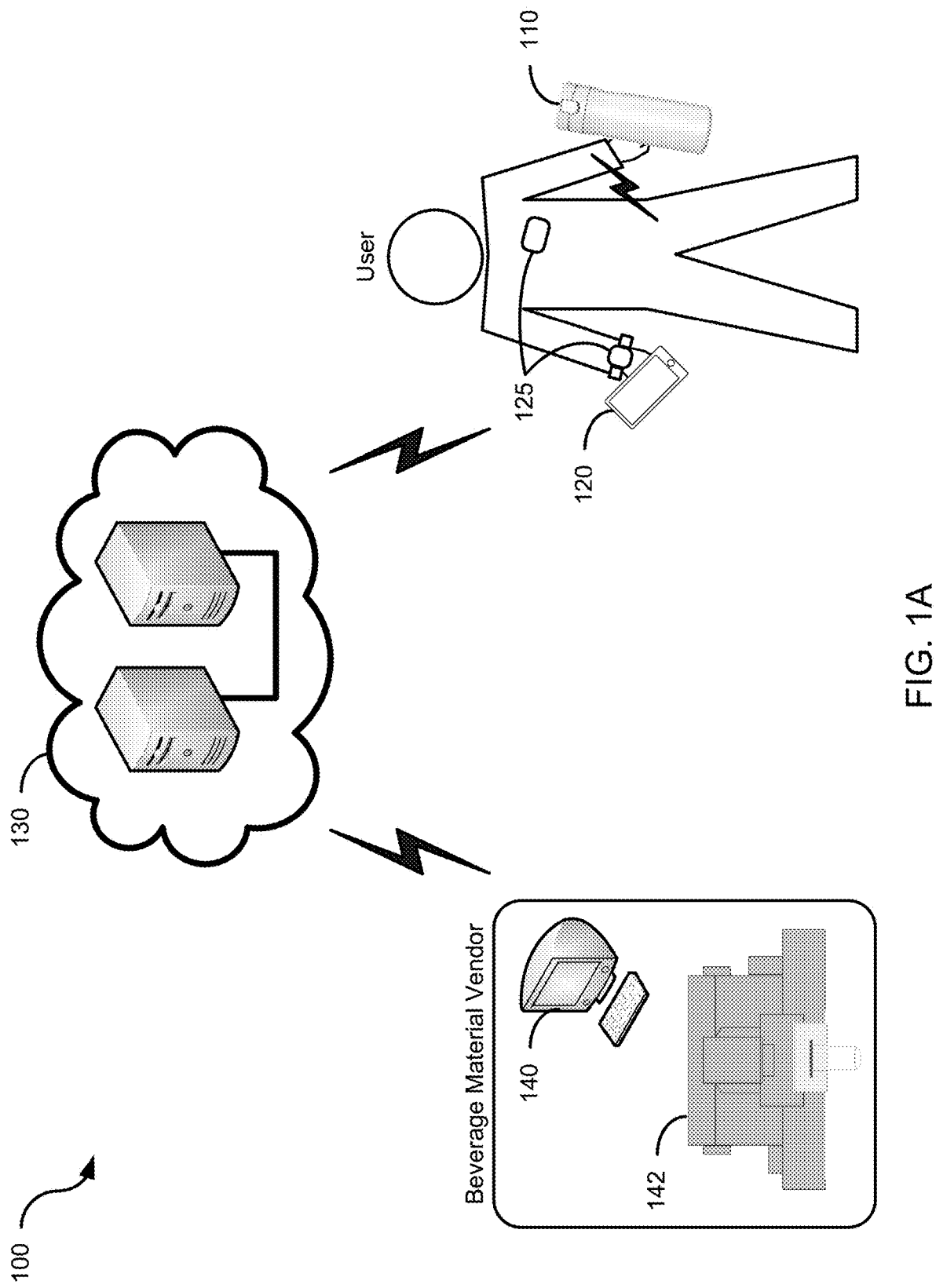
FIG. 1A shows a diagram of an example embodiment of an intelligent beverage management system in accordance with the present technology.

Tea and coffee are beverages enjoyed virtually everywhere. Yet, because of preparation factors, tea or coffee cannot simply be consumed just anywhere. Typically, tea or coffee drinkers are restricted to making the beverage at their homes or offices, buy it from restaurants, cafés or other places due to the lack of access to hot water needed for brewing. Also, tea and coffee generally require several minutes for brewing, and therefore can create complications to prepare when wanting to have one's tea or coffee to drink "on the go." For example, tea preparation may include multiple steps for heating water, brewing the tea (e.g., to control the "strength" of the tea), and transporting the tea, any of which causes the tea drinker to delay departure (e.g., while water heats) and be disordered. Coffee preparation may include similar steps with similar complications, e.g., including heating water, brewing the coffee (e.g., controlling the "strength" of the coffee while preventing grinds from entering the brewed coffee drink), and transporting the coffee at conditions suitable to drink (e.g., typically not as hot as the temperature to brew).

These types of hot beverages are typically made at relatively high temperatures that are generally too hot for consumption and therefore must go through a cooling process such as a natural dissipation of heat to the surrounding environment, which can be naturally slow to cool. For instance, coffee is typically prepared at 205 degrees Fahrenheit, after which some drinkers prefer to consume at 'extra hot' temperatures between 160 degrees and 185 degrees Fahrenheit, and other drinkers prefer to consume at 'hot' temperatures between 120 degrees and 140 degrees Fahrenheit, i.e., both below the preparation temperature. Cooling in a closed portable container such as a double walled vacuum sealed container or a closed mug can take a considerable amount of time depending on the design to dissipate heat. A double walled vacuum sealed container, for example, retains its heat due to the reduction in conduction by creating a vacuum between the inside and outside layers of the container. The lid that closes the container is meant to prevent unwanted liquid from leaving the device when it is not being consumed (e.g., prevent spilling) as well as prevent air flow from entering and exiting the device which would cause the beverage to lose heat when it is supposed to maintain temperature. It is therefore beneficial to control venting for a closed container that contains coffee, tea, or other beverages to be consumed from the container.

In order to brew an ideal cup of coffee, tea, or other beverages, the temperature of the water should be regulated at particular temperature(s) that correspond to appropriate brewing conditions for the certain type of coffee, tea, or other beverage. The temperature of the water affects the extraction of the brewing material into the beverage and therefore will taste differently based on the temperature of the brewing. It is therefore beneficial to control the setting of the water's temperature by the user, e.g., based on user-selected temperature settings associated with the specific type of tea or coffee the user will brew.

Another factor in preparing an ideal cup of coffee, tea or other beverage includes brewing the beverage for a particular amount of time, e.g., dependent on the particular type of brewing material to get a desired levels of extraction or diffusion of the compounds in the water. Without precise control of the brewing time, for example, the brewing process could lead to over brewing and the beverage may become bitter or have undesired tastes. It is therefore beneficial to control the amount of time the brewing occurs, e.g., at the particular temperature, and be definable by the user, such that the user can select brewing time settings associated with the specific type of tea or coffee the user will brew.

Another factor in preparing an ideal cup of coffee, tea or other beverage includes the movement or flow of the fluid (e.g., water) as it contacts the brewing material during the brewing stage. For example, the flow of water during brewing affects the speed at which compounds from the brewing material are extracted, and therefore, the overall composition and quality of the brewed beverage. Therefore, it is beneficial to control the flow or movement of fluid during brewing to provide greater control over extraction and allow a user to regulate the fluid flow based on the type of brewing material (e.g., type of tea, coffee, etc.) and his/her beverage preferences (e.g., "strength" of tea, coffee, etc.).

Yet another factor to prepare an ideal cup of coffee, tea or other beverage, particularly "on the go," is the temperature of the beverage post brewing. Typically, the beverage is too hot to drink right after it is done brewing, as brewing temperatures and one's drinking temperature are often different. As a result, the drinker can end up burning his/her tongue. Therefore, it is beneficial to have a notification system that warns of the temperature of the beverage. Furthermore, it is beneficial to provide a mechanism for cooling the brewed beverage to one's ideal drinking temperature.

Yet another important factor to prepare an ideal cup of coffee, tea or other beverage "on the go" is achieving the space efficiency required to offer complex functionality while preserving portability. Typically, conventional brewing devices and systems require at least two spatially separate compartments, i.e., one for storing fluid and one for storing brewing material, before the brewing process begins. Such inefficient use of space in conventional brewing devices and systems limit their utility and aesthetic design with regard to size, footprint, volume and/or weight of the brewing components and assemblies. Therefore, it is beneficial to have a brewing assembly able to store fluid and brewing materials separately and control their brewing together, within the same overall volume, creating space-efficiency while providing control of the brewing conditions (e.g., time to start, duration, etc.).

Yet another important factor to prepare an ideal cup of coffee, tea or other beverage "on the go" safely is temperature control. Typically, a drinker is unaware of the temperature of a freshly brewed beverage, and may have to test the beverage to determine if it is at a desired temperature, or even drinkable. Beyond just warning the user, it is beneficial to provide an effective user interface that displays specific information for the user to recognize when the brewed beverage is safe to drink and/or if there is a danger in drinking the beverage, e.g., caused by scalding fluids. Furthermore, it is beneficial to provide a cooling element bring a brewed beverage to a safe drinking temperature and/or desired drinking temperature.

Furthermore, there are many additional challenges still plague coffee and tea drinkers from a seamless experience in enjoying their desired brewed beverage. For example, brewing coffee or tea can be a cumbersome process due to the small size of the brewing material as well as the wetting of the material, requiring additional time to clean the brewing device. As such, it would be beneficial for such brewing devices to have a mechanism in which the brewing material can be easily removed and the device be clean for the next cup.

Moreover, the type and amount of constituents (e.g., also referred to as substances, compounds, analytes) found in a brewed beverage is typically dependent on the brewing processing, e.g., the pre-brewing and brewing parameters applied to produce the brewed beverage. Coffee, tea, or other beverage constituents are becoming more and more important to the consumer. One reason, for example, is that the constituents may affect the desired taste of the beverage. Another reason, for example, may be gain a better understanding and knowledge of how one's beverage consumption affects one's health and well-being, in addition to one's desired lifestyle.

While coffee, tea, and other brewable beverages can bring enjoyment and health benefits for a drinker when consumed, there are also aspects to these beverages that may be detrimental for the consumer and the environment. Coffee and teas can include constituents that cause various beneficial or adverse side effects. One example constituent is caffeine, common to coffee and most types of teas. For example, a typical cup of coffee has approximately 60-100 mg of caffeine (e.g., 80 mg), while tea is typically lower with, on average, half the amount of caffeine as coffee, e.g., 40 mg, but can range lower (e.g., 5-40 mg). Tea and coffee also have a multitude of compounds that can have a variety of immediate physical effects such as relaxation with tannin compounds as well as long term health benefits or detriments, such as consuming diterpenes, which can help reduce certain disease risks and affect physiological parameters such as cholesterol. Yet, side effects of caffeine have been known to range from mild to serious forms of headache, nervousness, sleep problems, vomiting, diarrhea, irritability, irregular heartbeat, tremor, heartburn, dizziness, ringing in the ears, convulsions, and confusion. Conversely though, caffeine when consumed in moderation (e.g., safe amount spread over time) can be a beneficial stimulant. Consequently, caffeine is one main reason many coffee or tea drinkers consume these brewable beverages in the first place, or even turn to other types of beverages, like soda pop, to obtain caffeine. Yet, it would be beneficial if constituents from coffee, tea and other beverages were tracked at the point of consumption, and monitored in a way that timely informed users to affect their consumption behavior, as well as provide intelligent recommendations based on the consumption. Currently, there are no cost-effective or convenient ways of tracking and managing the levels of compounds from beverages, such as caffeine, in the body as they are consumed and metabolized.

While coffee and tea are biodegradable materials, the way in which they are packaged for brewing, storage, and transport can create an environmental 'footprint', in which packaging materials are disposed in a detrimental way for the environment. Moreover, coffee and tea can have a 'shelf life', in which, if stored too long or improperly, can degrade in quality to a point where they are not used and disposed, further exacerbating the environmental waste associated with brewable products. As such, new techniques to address and correct imbalances in the supply and demand for these products caused by inefficient distribution channels could reduce negative environmental impacts associated with coffee and tea consumption, as well as lead to new advantages for consumers in managing freshness and creating customizable products.

Existing beverage-brewing devices such as conventional coffee brewers or tea machines have traditionally been implemented as standalone, table-top devices where a user sources their own beverage material from a beverage material producer that is typically a different company than the brewing device manufacturer. Currently, there tends to be a separation between coffee/tea manufactures and beverage-brewing device makers due to a lack of complementary product interactions, even despite the growth of smartphone technology in creating more direct communication links between various entities. With this type of ecosystem, the standard is to allow beverage material sourced from any beverage material producer (e.g., referred to as vendor or retailer) to work with any type machine (e.g., ground coffee) as it benefits both the consumer through more available options and the company since their machine becomes more valuable. Yet, with the introduction of single serve pod machines, another standard was created with some added conveniences in which only a certain pod can brew in the machine; however, with this standard comes the inability for the large number of beverage material retailers from selling to those customers because of the high costs for manufacturing the pods due to the complexity and the inability to scale the manufacturing process from a small retailer to a large retailer. This large cost creates a high barrier to entry where a small number of retailers are able to compete and capture a high volume of consumers which therefore creates an additional barrier to entry besides cost, the need to supply a large number of pods in order to compete competitively.

The inability for beverage material retailers of all sizes to be connected with a standard convenient system of brewing creates a need for a new, integrated beverage platform that can effectively satisfy any retailer's inventory demands, e.g., whether large or small demands, and also be scaled to suit the retailer's needs (e.g., modular system) allowing the retailer to be connected directly with the consumer to receive product orders from anywhere in the world, to advertise to their ideal customers, and to provide unique experiences to their customers.

Disclosed are systems, devices, platforms, mechanisms, media, and methods for providing a portable beverage brewing and tracking platform, including a portable brewing device operable for brewing and regulating characteristics of brewable beverages and for monitoring and guiding the user's consumption of compounds from the brewed beverages.

In some embodiments of the disclosed portable beverage brewing and compound tracking technology, an intelligent beverage management system includes a portable brewing device in communication with a user's mobile device (e.g., smartphone, smartwatch, etc.) including a software application for monitoring and controlling consumption and metabolism of caffeine and other compounds from beverages consumed using the portable brewing device and/or other beverages logged by the user. The intelligent beverage management system includes one or more computers in communication with other computers and devices in a network, such as over the Internet, referred to as a "cloud-based data processing system" or "cloud system". The one or more computers are also referred to as cloud computer(s) or server(s). The cloud-based data processing system in communication with the mobile device and/or portable brewing device to receive, process and/or store data associated with brewing of the beverage and data associated with the monitoring of consumption of the beverage and/or certain beverage constituents. In implementations, the cloud-based data processing system is able to provide artificial intelligence for analyzing and learning about the substances the user consumes from beverages, for controlling various functionalities of the portable brewing device to adapt brewed beverages for optimal health and enjoyment purposes, and for communicating (e.g., alerting, recommending, etc.) to the user about their past, present and predicted future beverage consumption behaviors and effects thereof.

In some embodiments, the intelligent beverage management system provides an integrated consumer-to-retailer beverage platform that can allow the consumer to easily find and purchase from particular retailers based on their own preferences, explore new retailers without having to travel, and customize orders in real-time through the software application on the consumer's mobile device. Such an integrated, intelligent beverage platform may allow for synergistic relationships among consumers and retailers via interactions facilitated by their own devices and interfaces, which can transform beverage brewing material manufacturing and distribution (e.g., pod production), e.g., including, but not limited to, creating a real-time inventory system, collecting data on consumer preferences and offering smart and tailored suggestions, smart subscription service, blind taste test systems, beverage and retailer specific brewing instructions, social interactions, and smart notifications.

In some implementations of the intelligent beverage management system, the portable brewing device includes a container having a specialized canister system in the interior of the container that encloses the brewing material (e.g., tea leaves, tea bags, coffee grinds, coffee pods, etc.) and controls the movement of water, storable in the interior of the container, in/out of the canister for regulating brewing of the brewing material. The portable brewing device can further include a data processing system and an intelligent heating system, cooling system, mixing system, and/or cleaning system to continuously regulate parameters of a beverage to be prepared (brewed), stored and/or dispensed by the device to produce the desired cup of coffee, tea, etc.

Example regulated brewing parameters include the temperature, flow and amount (e.g., concentration and volume) of the fluid in the canister system and container of the device, which are used to affect brewing conditions such as extraction. For example, the brewing parameters can include brewing time (e.g., to affect dynamic temperature), spinning rate and/or spinning time of a spinning mechanism of the portable brewing device (e.g., to affect dynamic extraction, dynamic cooling speed, etc., which can be based on sensing certain analytes). For example, regulated parameters can include drinking temperature of the brewed material in the container of the device. For example, parameters that can be regulated or at least accounted for by the device can include pre-brewing parameters, such as brewing material size (e.g., size of the grind), roasting properties, beverage amount, filter/non-filter, pod properties (e.g., shape, size, etc.), and canister assembly properties (e.g., shape, size, quantity of holes and/or shape and size range of holes, etc.).

For example, the portable brewing device can control for a user's ideal brewing parameters and ideal drinking conditions to enable the user to have the "perfect cup" where and when upon desire, e.g., allowing the user to prepare and consume tea, coffee, and other hot or cold brewed beverages while on the go. Moreover, for example, the portable brewing technology disclosed herein stores fluid and brewing materials separately to control when, and under what conditions, brewing starts, but does this in a space-efficient manner. By storing the brewing material in a canister in accordance with the disclosed technology that is submerged in the fluid, but that precisely controls contact between the fluid and the brewing material, the need for two spatially-separate compartments, one for fluid and one for brewing material, in is eliminated. In some embodiments, for example, the portable brewing device includes a cooling element, and effective user interface allowing the user to recognize danger formed by scalding fluids. In some embodiments, the portable brewing device includes safety features, such as an external display that optionally alerts the user to the current temperature or the programmed drinking temperature of the brewed beverage and a cooling unit to cool the beverage to a safe temperature.

In some implementations of the intelligent beverage management system, the portable brewing device transfers and receives communications from the mobile device, e.g., such as a smartphone, tablet, or wearable communication device, that includes the software application ("app") with which the user interacts to send the portable brewing device instructions to brew a desired beverage (e.g., coffee, tea, etc.) based on the user's defined parameters (e.g., brewing temperature, brewing time, and/or drinking temperature or other). In some implementations, the app may provide a brewing procedure based on the type of beverage to be brewed, e.g., such as a specific type of tea like chamomile tea versus black tea, or type of coffee. The brewing procedure can be displayed by the app on the mobile device as a default procedure that can be modifiable by the user with regard to certain regulated parameters, e.g., brewing parameters, drinking parameters. The app can maintain information about the user in an account, e.g., such as name, address, contact information, credit card or other purchasing information, etc., and information about the user's beverage consumption by the portable brewing device, which can be used for automated ordering and other functions by the app.

In some embodiments, the app operable on the mobile device can be in communication with the cloud server(s) where the user's data (e.g., account) can be stored, such as the user information, beverage consumption information, types of beverages and custom parameters (e.g., pre-brewing, brewing, drinking parameters, etc.) he/she desires to create and store, and monitored data tracking the consumption of beverages and/or certain compounds in the beverages consumed by the user. In some implementations, the cloud server can generate recommendations and suggest to the user to make purchases for more brewing material (e.g., coffee pods, tea pods, etc.), including customized brewing material products having user-specific features (e.g., a type of material and/or pod, a material preparation parameter such as degree of roasting, particle size, etc.) at/after a specific number of uses, e.g., depending on the activity of the user. In some implementations, the cloud server can automate the ordering process. The user data that can be stored in the cloud and/or via the app on the mobile device can be utilized by the system to make suggestions for a purchase of a specific beverage product from the retailer based on the consumption of the beverages.

FIG. 1A shows a diagram of an example embodiment of an intelligent beverage management system 100 in accordance with the present technology. The intelligent beverage management system 100 includes a portable brewing device 110 that includes modular brewing subsystems and one or more sensors to track fluid flow and/or one or more sensors to detect one or more substances in fluid flowing from the device 110; an app operable on a mobile communication device 120 (e.g., smartphone) that is in wireless and/or wired data communication with the portable brewing device 110; and a cloud system 130 including one or more computers in communication with other computers and devices in a network, such as over the Internet, to process and store data.

In some embodiments, the cloud system 130 receives and manages data processing of the data obtained by the portable brewing device 110 and/or by the app on mobile device 120, e.g., including brewing parameter data, user data and fluid and/or analyte tracking data. In some implementations, for example, the app of the mobile device 120 is in communication with other sensor and/or wearable devices 125 that can monitor health related data of the user, such as heart rate, analyte levels (e.g., glucose), perspiration, breathing rate, or other. The app of the mobile device 120 can aggregate the data provided from the portable brewing device 110 and other devices (e.g., sensors/wearables 125) and transfer the aggregated data to the one or more computing devices of the cloud system 130 using a communication protocol, e.g., including a wired or a wireless communication protocol such as LTE, Wi-Fi, or other.

In some embodiments, the intelligent beverage management system 100 includes a software application ("vendor app" or "retailer app") resident on a client computer 140 of a beverage material vendor in communication with the cloud system 130 to receive and send data associated with brewing material products and the production process. The vendor client computer 140 may, in some embodiments, be in communication with a beverage material manufacturing and/or packaging system 142 to produce a finalized product of beverage material, such as a coffee product (e.g., coffee pods, etc.), a tea product (e.g., tea pods, tea bags, etc.), or other beverage product.

Figure 1B:
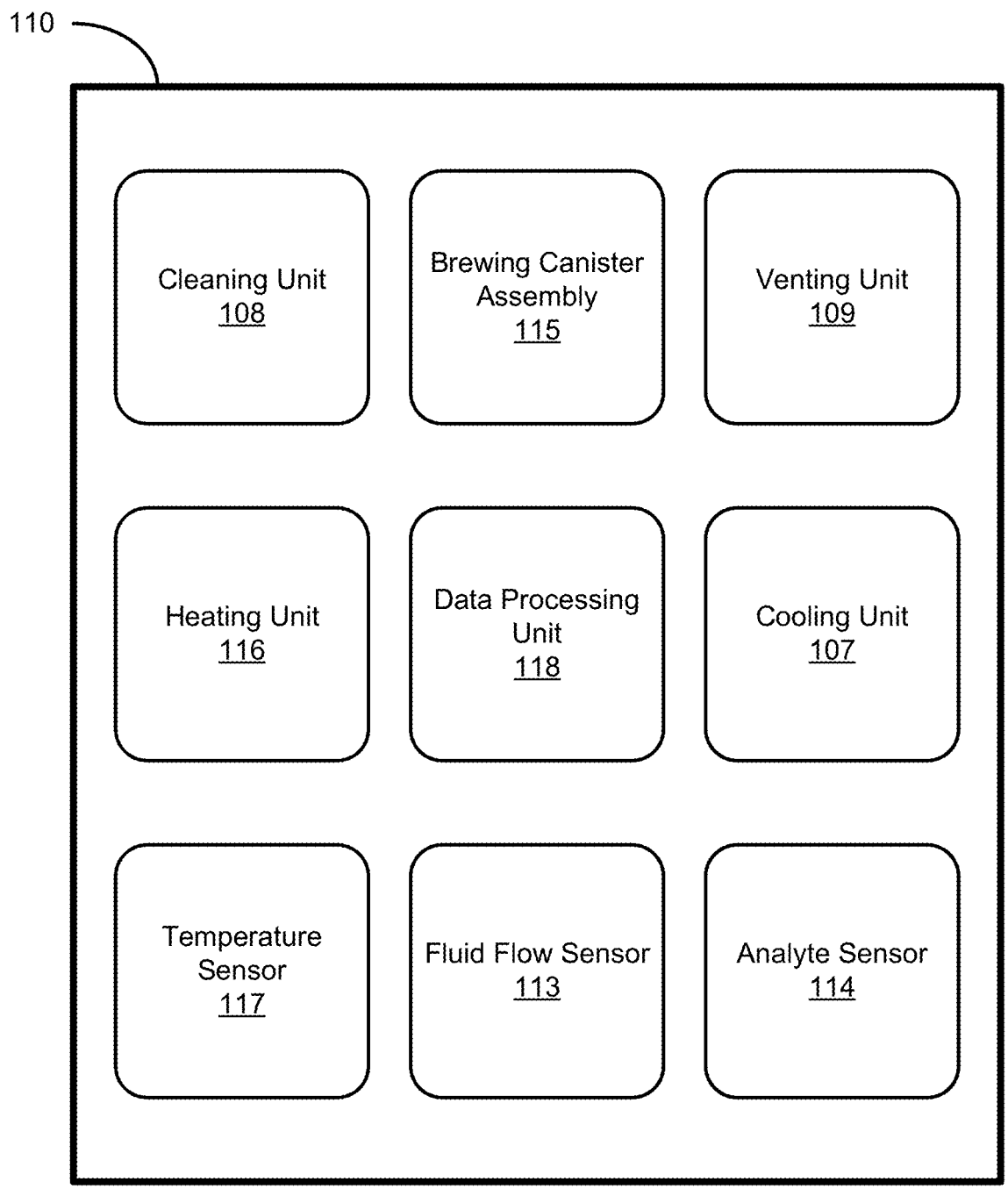
FIG. 1B shows a block diagram of an example embodiment of a portable brewing device in accordance with the present technology.

FIG. 1B shows a block diagram of an example embodiment of the portable brewing device 110 including example modular subsystems and sensors. The portable brewing device 110 includes a brewing canister assembly 115 to control brewing of a brewing material in the canister by controlling how and when fluid in the surrounding environment is able to flow in and out of the brewing canister assembly 115. The brewing canister assembly 115 includes a moveable component operable to move between a closed position and an open position; such that when in the open position, at least one hole between an exterior and an interior of the brewing canister assembly is exposed to allow the fluid to flow in and/or out of an interior chamber of the canister where the brewing material is contained, and when in the closed position, the hole or holes are blocked to prevent the fluid to flow in and/or out of the interior chamber of the canister. The brewing canister assembly 115 includes an actuator configured to modulate movement of the moveable component between the open position and the closed position. In some implementations, the brewing canister assembly 115 is a manually-controlled brewing canister, where the user manually operates the actuator (e.g., through a linking switch, handle, etc.) to modulate the movement of the moveable component. In some implementations, the brewing canister assembly 115 is automatically controlled through a data processing unit 118 of the portable brewing device 110.

The data processing unit 118, also referred to as a control unit, of the portable brewing device 110 is operable to control features and functionality of the device 110. The data processing unit 118 can include a processor to process data and a memory in communication with the processor to store and/or buffer data. In various examples, the processor can include a central processing unit (CPU) or a microcontroller unit (MCU). For example, the memory can include processor-executable code, which when executed by the processor, configures the data processing unit 118 to perform various operations, such as receiving information, commands, and/or data, processing information and data, and transmitting or providing information/data to another entity (e.g. external device). To support various functions of the data processing unit 118, the memory can store other information and data, such as instructions, software, values, images, and other data processed or referenced by the processor. Various types of Random Access Memory (RAM) devices, Read Only Memory (ROM) devices, Flash Memory devices, and other suitable storage media can be used to implement storage functions of the memory. The memory can store data and information of the data processing unit 118 and other units of the device 110, e.g., such as those shown in FIG. 1B, as well as information about other devices and systems in communication with the device 110, such as the mobile device 120 and/or peripheral devices 125. For example, the memory can store device unit parameters, and hardware constraints, as well as software parameters and programs for operation on the device 110. The data processing unit 118 can include an input/output (I/O) unit that can allow communicative connectability of the data processing unit 118 to other units of the device 110 and other devices. For example, I/O unit can provide the data processing unit 118 to be in communications with other devices or systems, e.g., using various types of wired or wireless interfaces compatible with typical data communication standards, for example, including, but not limited to, Universal Serial Bus (USB), IEEE 1394 (FireWire), Bluetooth, Bluetooth Low Energy (BLE), ZigBee, ANT, IEEE 802.11 (Wi-Fi), Wireless Local Area Network (WLAN), Wireless Personal Area Network (WPAN), Wireless Wide Area Network (WWAN), WiMAX, IEEE 802.16 (Worldwide Interoperability for Microwave Access (WiMAX)), 3G/4G/LTE/5G cellular communication methods, and parallel interfaces. The I/O unit can also provide communicative connectability of the data processing unit 118 to an external interface, source of data storage, or display device. The I/O unit of the data processing unit 118 can also interface with other external interfaces, sources of data storage, and/or visual or audio display devices, etc. to retrieve and transfer data and information that can be processed by the processor, stored in the memory, or exhibited on an output unit of the device 110. In some implementations, for example, the data processing unit 118 can include a signal processing unit to amplify, modulate, or otherwise modify the captured electrical signals of the sensors of the device 110 or control signals to the units of the device 110. For example, the signal processing unit can include circuitry to amplify signals, and/or convert signals to and from an analog signal and a digital signal. For example, the signal processing unit can include transistors, capacitors, resistors, inductors, transistors, diodes, amplifiers, and/or other circuit elements, etc.

In some embodiments, the portable brewing device 110 can include a fluid flow sensor 113 in communication with the data processing unit 118 to measure an amount of fluid and/or flow rate of the fluid leaving the device 110. In implementations, the device 110 is able to detect a flow rate of the fluid dispensed by the device, and thereby the amount of fluid dispensed, which can be proportional to the amount of the beverage consumed by the user. In some embodiments, the portable brewing device 110 can include an analyte sensor 114 in communication with the data processing unit 118 to measure one or more parameters of a particular beverage constituent (also referred to as an analyte), such as caffeine, diterpene, sugar and/or other compound or substance in a brewed beverage. For example, the analyte sensor 114 can be configured in the drinking channel to detect the analyte (e.g., beverage constituent) as the brewed beverage is dispensed from the device 110 (e.g., consumed by the user), and the analyte sensor 114 can be configured in the interior of the device 110, where fluid is contained, which can detect the concentration of the analyte in the device 110. Examples of the sensors 114 can include electrochemical sensors (e.g., amperometric, potentiometric, conductimetric, etc.), optical sensors, pH sensors, or other class of sensors. The analyte sensor 114 transduces a detected attribute (e.g., electrochemical reaction with a detecting region of an electrochemical sensor, an optical response to an optical probe signal of an optical sensor, or other) to a transduction signal, which includes an electrical signal that can be amplified and/or digitized for processing by the data processing unit 118.

In some embodiments, the portable brewing device 110 can include a heating unit 116 to heat the fluid and regulate the temperature of the fluid in the device 110. In some embodiments, the portable brewing device 110 can include a temperature sensor 117 to determine the temperature of the fluid, e.g., in which the measured temperature is used in regulating the temperature of the fluid by the heating unit 116. In some embodiments, the portable brewing device 110 can include a cooling unit 107. In some implementations, the cooling unit 107 can include a Peltier cooling apparatus, a refrigeration module, and/or a spinning apparatus to aid in the flow of air between the interior environment of the device 110 and the outside environment. In these respective embodiments, the heating unit 116, the temperature sensor 117, and/or the cooling unit 107 are in communication with the data processing unit 118 to control the respective modular unit, e.g., through data command.

In some embodiments, the portable brewing device 110 includes a cleaning unit 108 in communication with the data processing unit 118 and including a spinning apparatus to perform a cleaning protocol of the device 110 and/or certain modular units, e.g., such as the brewing canister assembly 115. In various implementations of the cleaning unit 108, the user can select an assortment of cleaning protocols (e.g., via a user interface of the app on the mobile device 120, or a display on the portable brewing device 110), which can include a quick rinse, normal clean, deep clean, soak clean, etc. The cleaning function for the portable brewing device 110 can be initiated by the data processing unit 118, in which it can go through a series of steps depending on the protocols. For instance, in a normal clean protocol, water in the device 110 can be heated, e.g., via the heating unit 116, to a predetermined cleaning temperature, in which a blade of the spinning apparatus spins in order to agitate the fluid for certain cleaning protocols, and implement spinning for the desired time. For example, the cleaning protocols may simply require the user to only add new water to the interior of the device 110, e.g., and replace any existing fluid (such as previously brewed beverage) in the device 110. Also, for example, to aid in the effectiveness of the clean, a cleaning pod can be added directly into the interior container or in the brewing canister assembly 115 of the device 110, in which the spinning apparatus can cause the cleaning pod to be automatically opened via the cleaning protocol and provide a detergent or other ancillary cleaning substance to assist in cleaning with the water. The cleaning pod adds convenience such that the fluid can be stored in a convenient manner. Alternatively, for example, in some implementations a cleaning solution such as dish soap can be added. In some implementations, the material of the cleaning pod can be made out of a cleaning material that will diffuse in when exposed to water and thereby help in the overall breakdown of the left over material.

In some embodiments, for example, the fluid flow sensor 113 can detect the fluid level, and therefore know the time that a fluid has been in there in order to warn the user, e.g., via a notification generated by the data processing unit 118, that he/she should clean the device 110. For example, this reminder can notify the user until it is detected that fluid is added/replaced and a cleaning protocol was implemented. Consequently, such monitoring of fluid conditions in the device 110 can inform the user that the fluid in the container does not remain in the device to a point in which it will cause a flavor change, will solidify, or in general, make it harder to get to a full clean and/or cause unnecessary damage to the device 110. Notification settings for such monitoring protocols can be set by the user via the app, and notifications can be delivered by the device 110 and/or the user mobile device 120. The example cleaning protocols may be utilized for other containers, e.g., such as double-walled vacuum-sealed devices to increase the life of the device and prevent unwanted changes in the device through improper cleaning. In general, the example cleaning setup and protocols do not require the user to scrub the features of the device 110, or place it into an external cleaning process such as a dishwasher, since it is able to clean itself.

In some embodiments, the portable brewing device 110 includes a venting unit 109 in communication with the data processing unit 118 to vent heat from the device 110. In some implementations, the venting unit 109 includes one or more channels in the lid, wells of the container, or both, which lead from the interior of the device 110 to the exterior, and a mechanism coupled to a moveable component positioned in the channel(s) to expose or block the channel(s) to controllably close or open the channel(s) for venting.

Figure 1C:
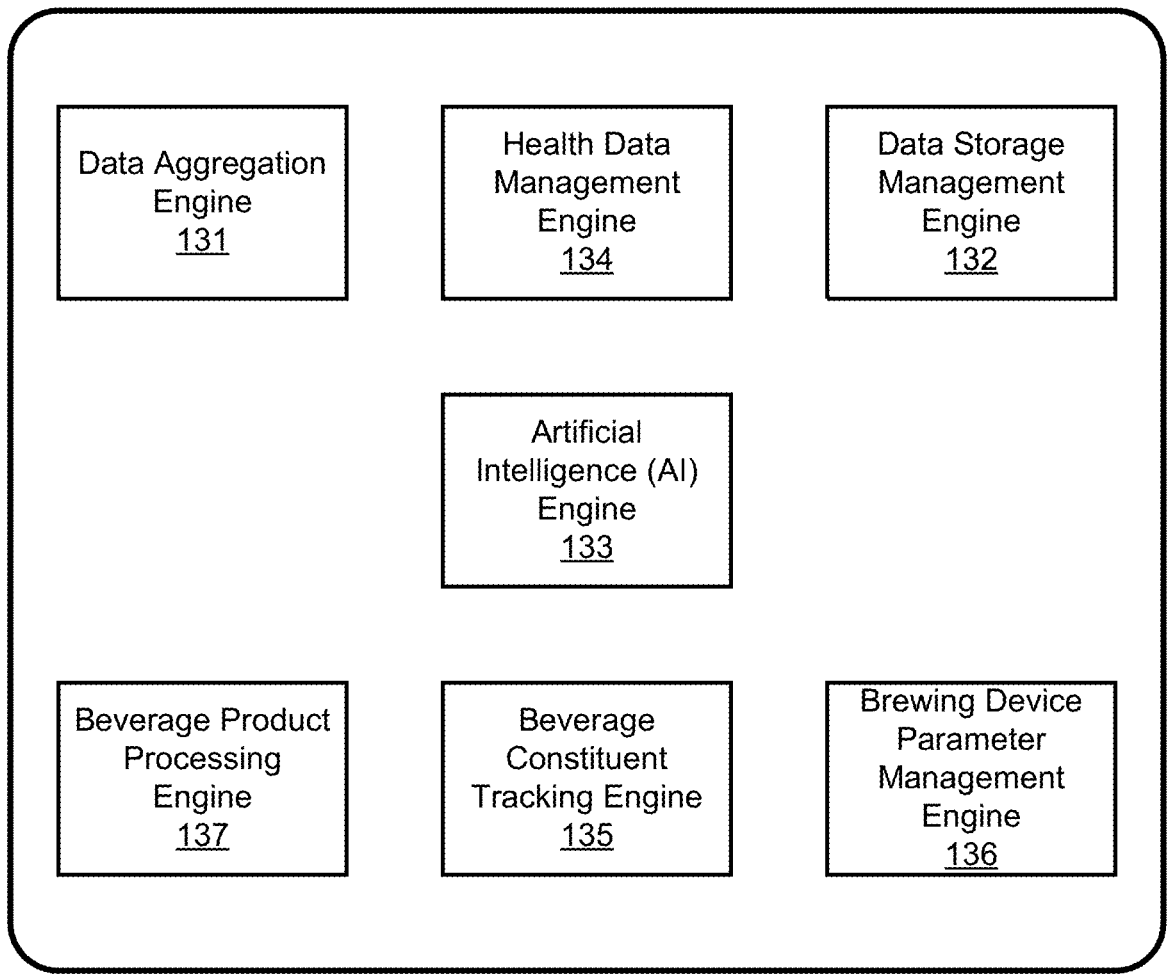
FIG. 1C shows a diagram of an example architecture of data aggregation, processing and storage modules/engines in accordance with the present technology.

FIG. 1C shows a block diagram of an example architecture of data aggregation, processing and/or storage modules in accordance with some example embodiments of the system 100. The data aggregation, processing and/or storage modules are also referred to as data aggregation, processing and/or storage engines, or simply software modules or engines. In some embodiments, the data aggregation, processing and/or storage modules can be resident on the cloud system 130. In some embodiments, at least some of the modules of the data aggregation, processing and storage modules can be resident on the mobile device 120 as part of the app, and/or on the portable brewing device 110. The architecture can includes various software modules or engines (e.g., functions or algorithms) that can be operated and/or stored on one or more computers within a single software application or multiple software applications to control various operations of the system 100. For example, in various embodiments, the data aggregation, processing and/or storage software modules can be resident on the cloud system 130, the mobile device 120 (e.g., included in the app), and/or on the portable brewing device 110. The software modules of the system 100 can include a data aggregation engine 131, a data storage engine 132, an artificial intelligence (AI) engine 133, a health data management engine 134, a beverage constituent tracking engine 135, a brewing device parameter management engine 136, and/or a beverage product processing engine 137. These example software modules of the system 100 are further described below.

The software modules can include a data aggregation engine 131 to obtain data from any of the devices of the system 100, such as the portable brewing device 110, e.g., directly and/or via the mobile device 120, the app of the mobile device 120, the app of the vendor client computer 140, and/or other devices or apps in communication with the system 100. In some implementations, for example, the data aggregation engine 131 communicates with the other devices to obtain data from the devices, including, but not limited to: (i) the brewing and pre-brewing parameters of the portable brewing device 110; (ii) the monitored fluid flow data and/or substance data detected by the sensors 113, 114 of the portable brewing device 110; (iii) device status data of the portable brewing device 110; (iv) user input data, e.g., which can be inputted via the app of the mobile device 120 or via the portable brewing device 110, which can include but not limited to (a) ratings of a brewed beverage, (b) goals associated with a desired amount or level for consumption of a particular substance, or overall beverage (e.g., daily caffeine, daily diterpenes, daily/weekly/monthly coffee or tea consumption, etc.), (c) taste feedback on a particular beverage consumed using the device 110, best matches, etc., and user personal data including age, weight, gender, health status (e.g., including if pregnant), disease risks, known disease states, and known health metrics (e.g., cholesterol, glucose tolerances, etc.); (v) beverage material supply data associated with previous, present and future orders and quantities used by the portable brewing device 110; and (vi) beverage material processing data by the vendor client computer 140, including but not limited to existing supply for particular beverage products, specifications associated with particular beverage products, distribution information, manufacturing parameters (e.g., such as those a vendor is willing to modify based on custom ordering); and other types of data.

The software modules can include a data storage engine 132 to manage storage of all the received and processed data. The data storage engine 132 is configured to control communications with one or more internal databases and/or external databases to store the obtained data. For example, the data aggregation engine 131 and/or the data storage engine 132 can parse data to identify attributes of the data, such as the source, size, security, and route them to the appropriate processing engines of the system 100 and/or databases for storage. For example, third-party data such as health data (e.g., activity information, such as exercise, meal, and/or medication recordings) can be obtained by the system 100 from other devices or imported from other apps using an appropriate API.

In some implementations, the software modules on the computing device (e.g., computers of cloud system 130 and/or the mobile device 120) may operate in conjunction with or may otherwise utilize remote computing resources, e.g., over a network such as the Internet, such as external data storage and data processing systems and services. Examples data storage and data processing services can include cloud services, data centers, real-time computing, software as a service (SaaS), platform computing, etc.

The software modules can include an artificial intelligence (AI) engine 133 to learn, adapt, communicate and command other devices of system 100 based on processing the data. The software modules includes multiple data processing engines that analyze data provided to the system, which inform the AI engine 133 to produce new information and cause a device of the system 100 to act accordingly. As an example, the AI engine 133 can determine a brewing protocol for a beverage to be brewed presently or in the future by the portable brewing device 110 and modify the brewing protocol. Specifically, the AI engine 133 can generate a command to be sent to the data processing unit of the portable brewing device 110 to change the operation of one or more modular subsystems of the device 110, e.g., such as the heating unit, spinning apparatus and/or cooling unit, brewing canister assembly or other. For example, the command generated by the AI engine 133 and received by the device 110 can cause a change in the brewing temperature or temperature ramp-up or ramp-down process (e.g., affecting brewing time), the spinning speed of the spinning apparatus or cooling unit (e.g., affecting brewing and/or cooling to drinking temperature). As another example, the AI engine 133 can determine a suggestion or recommendation to deliver to the user, e.g., via a notification by the app or portable brewing device 110, that informs the user regarding the effects of beverage constituents consumption (e.g., caffeine, diterpenes, etc.) and health parameters (e.g., heart rate, blood pressure, etc.) on their present or predicted beverage consumption behavior, and/or that recommends a particular action or behavior for the user to perform.

The software modules can include a health data management engine 134 to process health data received by the system 100, e.g., via the data aggregation engine 131, which can be obtained from health monitoring devices and/or health data aggregation apps, e.g., Apple HealthKit, Google Fit, FitBit, etc. Example health data that can be processed with the beverage consumption data by the system 100 to intelligently support a user with his/her health and lifestyle behaviors includes, but is not limited to, heart rate, body movement (e.g., via an accelerometer), blood pressure, blood oxygen levels (e.g., pulse oximetry), glucose levels, electrophysiological readings such as electrocardiograms (ECG), electroencephalograms (EEG) (e.g., as increased brain activity from caffeine is a factor of interest in monitoring progress of Parkinson's disease to adjust the amount of caffeine they should consume), blood ATP levels, body temperature, galvanic skin responses (e.g., transpiration), respiratory activity, electrochemical levels such as lactic acid or uric acid levels, pain levels (e.g., headaches, including migraine), sleep information, and other electrolyte levels. For example, electrolytes can be used by the system 100 to monitor loss due to excessive urination because caffeine is a diuretic which increases micturition and thereby reduces hydration, deplete electrolyte levels, and thereby the system can determine when the user should not consume more caffeine and instead drink more beverages that better hydrate the consumer. Also, for example, the system 100 can utilize sleep data to determine how the user's sleep levels may be disrupted by consumption of recorded beverages, e.g., using the portable brewing device 110, such that the system 100 can make predictions to recommend more appropriate levels and/or timing of beverage consumption. For example, the body motion data can be used by the system to determine if the user has been inactive for too long, which can have effects on how their body reacts to consumed caffeine. For example, blood ATP levels can be processed by the system 100 to measure the effects of energy levels per dosage on caffeine and give feedback such as consume more, consume less, get up and move based on desired levels, etc. In some implementations of the health data management engine 134, for example, the health data management engine 134 analyzes the aggregated health data with current levels of tracked beverage constituent analytes (e.g., monitored by the analyte sensor 114 of the portable brewing device 110) to further analyze the user's health and wellness parameters as they related to the tracked analytes can and the user's health and wellness related-thresholds and goals. In various implementations, the health data management engine 134 can generate notifications to be delivered by the app of the mobile device 120 and/or the portable beverage device 110 to notify the user of progress, achievements, and/or alerts with respect to the user's health and wellness goals.

The software modules can include a beverage constituent tracking engine 135 to process the detected fluid flow data and beverage constituent analyte data, e.g., caffeine, diterpene, etc., detected by the portable brewing device 110. Using the detected data, the beverage constituent tracking engine 135 can determine a beverage parameter-time profile for each monitored constituent of the beverages dispensed from the portable brewing device 110 (e.g., drank by the user) over any defined time period (e.g., daily, hourly, weekly, etc.). The beverage constituent tracking engine 135 can also receive additional information from the data aggregation engine 131 regarding beverages (and/or food) consumed by the user, which the user inputs to the system 100 and/or is monitored or inputted using another device that is provided to the software modules. In an illustrative example, a user purchases a latte from a coffee shop, and later inputs the coffee event to the app of the mobile device 120. In some implementations, the app may have data preloaded and request limited data, such as the size of the latte and/or if the latte used skim, 2% or whole milk, etc. From this data entry, the beverage constituent tracking engine 135 can update the beverage parameter-time profile to include the additional coffee event. Similarly, the beverage constituent tracking engine 135 can monitor produce the beverage parameter-time profile for a plurality of monitored constituents and/or other health factors, e.g., such as a daily caffeine and heart-rate profile. In some implementations of the beverage constituent tracking engine 135, for example, the beverage constituent tracking engine 135 analyzes the aggregated monitored beverage constituent data and additional information to produce analysis information as the user's tracked parameters relate to the user's beverage constituent thresholds and goals. In some implementations, for example, the AI engine 133 can be implemented to receive the health and wellness parameters and tracked beverage constituent analytes to determine how each of these affect the user's health and wellness related-thresholds and goals, e.g., including individual effects and combination effects. The AI engine 133 can produce a quantitative data set associated with the tracked, aggregated and analyzed data (e.g., health data, beverage constituent data, user data, etc.) that the AI engine 133 can use to machine-learn various trends and patterns and produce improved and predictive analytical tools to better guide a user to achieve a 'beverage consumption lifestyle' that accounts for the user's health, wellness and desired beverage consumption habits and decisions. In various implementations, the beverage constituent tracking engine 135 can generate notifications to be delivered by the app of the mobile device 120 and/or the portable beverage device 110 to notify the user of progress, achievements, and/or alerts with respect to the user's goals.

In some implementations, the AI engine 133 can produce commands to affect the manufacturing process of beverage materials that can be customized for a particular individual user or groups of users. In an illustrative example, the AI engine 133 can analyze the health data, the beverage constituent data, the beverage material data, and the user's goals (e.g., for constituent consumption, health goals, etc.) and determine an optimization of the beverage material (e.g., coffee) the user would order in a next purchase from a particular coffee vendor. Subsequently, the AI engine 133 can produce a command to transmit to the vendor client computer 140 that can automatically implement a reduction or increase in a production parameter (e.g., roasting temperature and/or roasting time of coffee beans, or other) by the beverage material manufacturing and/or packaging system 142 to produce a finalized product of coffee to be sent to the particular user in the next purchase.

The software modules can include a brewing device parameter management engine 136 that receives data the produced information from the AI engine 133, which can include specific commands that control the operations of the portable brewing device 110. For example, the AI engine 133 may determine, that for a user to achieve a particular goal on their beverage parameter-time profile, the next cup of green tea the user wishes to brew in the device 110 would overshoot the caffeine concentration based on the user's inputted or default settings for that cup. As such, the AI engine 133 may command the device 110 to modify the brewing parameters, e.g., changing the extraction time and/or flow rate of the water into the canister, in order to produce the green tea in a manner that will meet the user's caffeine target goals. Notably, in some implementations, the portable brewing device 110 can alert the user of the modified brewing protocol, and allow the user to override the AI engine's commands, and thereby produce the cup of green tea as the user intended.

The software modules can include a beverage product processing engine 137 that manages data associated with the production of beverage products produced by material vendors, distributors or others in the product pipeline. In some implementations, the beverage product processing engine 137, which can be resident on the vendor client computer 140, can receive a beverage optimization protocol from the AI engine 133 to modify a production parameter for a particular product order or continuing orders associated with the particular user. The beverage product processing engine 137 can process the received beverage optimization protocol and generate and provide a command (e.g., command protocol) for the beverage material manufacturing and/or packaging system 142 to modify the production process of the beverage material product to adapt the finalized product of coffee that is to be sent to the particular user in the next purchase.

Example implementations of the system 100, including the portable brewing device 110, user app on the mobile device 120, the vendor app on the vendor client computer 140, and the software modules, can include methods for monitoring consumption of beverages and beverage constituents (e.g., caffeine and/or other analytes) over time periods, such as on a daily basis for an extended period of time, which include the system 100 learning about the user's physiological and/or behavioral reactions to the beverages he/she consumes and controlling functionality of the portable brewing device 110 and/or the beverage material production process to optimize the preparation and distribution of beverages for the user's benefit. In various implementations, the app of the mobile device 120 can provide an interface that facilitates communication (e.g., information exchange) between the user and the AI engine 133. In various implementations, the app of the mobile device 120 can facilitate an interface that facilitates information exchange between the user and other entities that are part of the ecosystem of the intelligent beverage management system 100, such as other users of the portable beverage device 110 and/or vendors that produce beverage materials operating their respective vendor app on the vendor client computer 140.

In some implementations of the intelligent beverage management system 100, the system 100 can manage custom ordering and production of beverage materials by the beverage material retailers for use in the portable brewing device 110. For example, the custom ordering and production processes can be managed by the cloud system 130 through data communications between the app on the user's mobile device 120 and the app on the vendor client computer 140.

Referring back to the diagram of FIG. 1A, an example implementation of the system 100 includes managing the production and distribution of the brewing materials by the vendor based on analysis of the data provided by the portable brewing device 110. For example, a beverage material vendor of any size (e.g., small-scale, large-scale, or other) can adopt an example scalable pod maker to manufacture beverage material pods (e.g., coffee, tea). The vendor client computer 140 is in communication with the cloud system 130, which effectively enables an interaction to the consumer through the use of accessing information on the retail and consumer aspects of the interface (e.g., via the app) that is communicating to the portable beverage brewing device 110. The portable beverage brewing device 110 can receive instructions from the cloud system 130, as well as provide data (e.g., user feedback inputted to the app via the interface of the mobile device 120) to the cloud system 130, which can in turn process the received data and determine commands and information to be given to the beverage material vendor's system. For example, a user is able to explore the beverages from various retailers to order the coffee, tea, or other beverage through the retailer side of the smartphone app. For example, this can implemented be for on demand purchases to be delivered directly to the user or for subscription services. The consumer is able to save data including payment information on their profile in order to be able to seamlessly purchase from the retailers as well as their preferences which can then interact with the portable beverage brewing device. These types of interactions can provide various benefits, including but not limited to real-time inventory system, collecting data on consumer preferences and offering smart and tailored suggestions, smart subscription service, blind taste test ordering systems, beverage and retailer specific brewing instructions, social interactions, and smart notifications.

In some example implementations, the brewing material vendor is able to use the example scalable pod maker that is modular to adapt to their needs which is connected to cloud system 130 that can update the retailer side of the ecosystem, e.g., via an application interface on the vendor client computer 140, to reflect available inventory which the portable brewing device 110 user can interact with to order from the vendor. The brewing material vendor is able to receive the order through the cloud system 130 and satisfy the order using the pod maker for timely delivering the custom-order product to the user. For example, this can be optimized based on location where the retailer can make the pods at the location that is cheapest to deliver to the customer. The app interface for the user allows them to know their inventory of the different beverages they have ordered and select and make it using the portable beverage brewing device. This updates the users account which is connected to the cloud such that a user can order more when they are almost running out or be notified about their inventory. A user can also order it based on a subscription service that is based on the usage so the user does not run out before a new shipment arrives or does not have too many left when they get their next batch. This is a common problem with most subscription services as it is time-based rather than inventory-based because consumption cannot be automatically tracked when the inventory is used. The beverage brewing device can keep track of which kind of beverage material is used and actively keep track of how many are left because the user profile will keep data of the number ordered. This allows the user to specify at what number of pods left that they will get notified or automatically reordered. This type of real time and/or just-in-time inventory system allows the user to get fresh new coffee, tea, or other beverage material.

Example User Interface of the User App

Figures 2A, 2B, 2C:
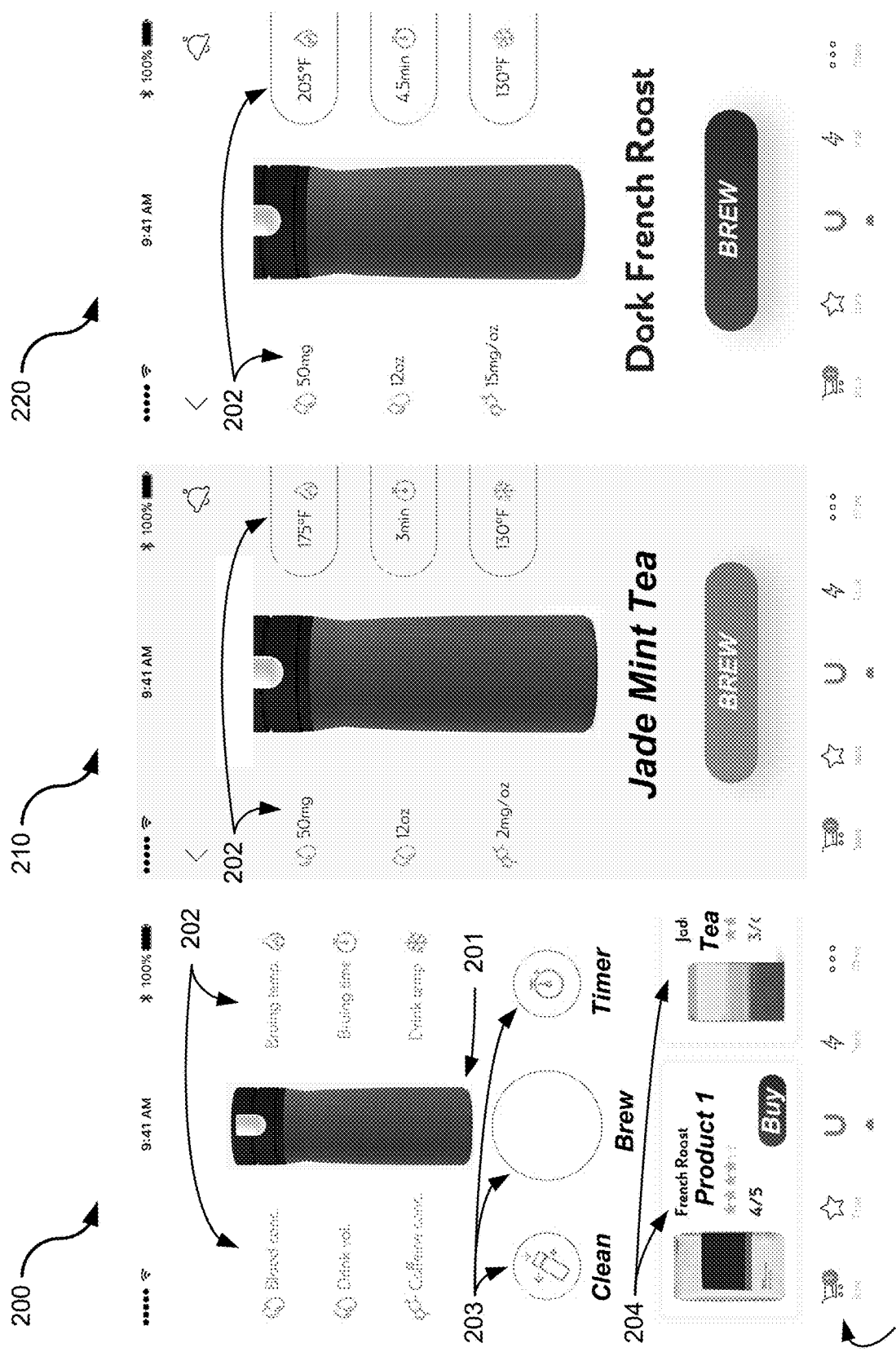
FIGS. 2A-2Q show display screens of an example user interface of a software application in accordance with the present technology for controlling various functionalities of the portable brewing device including brewing and temperature regulating brewable beverages and for providing brewing product information.
Figures 2O, 2P, 2Q:
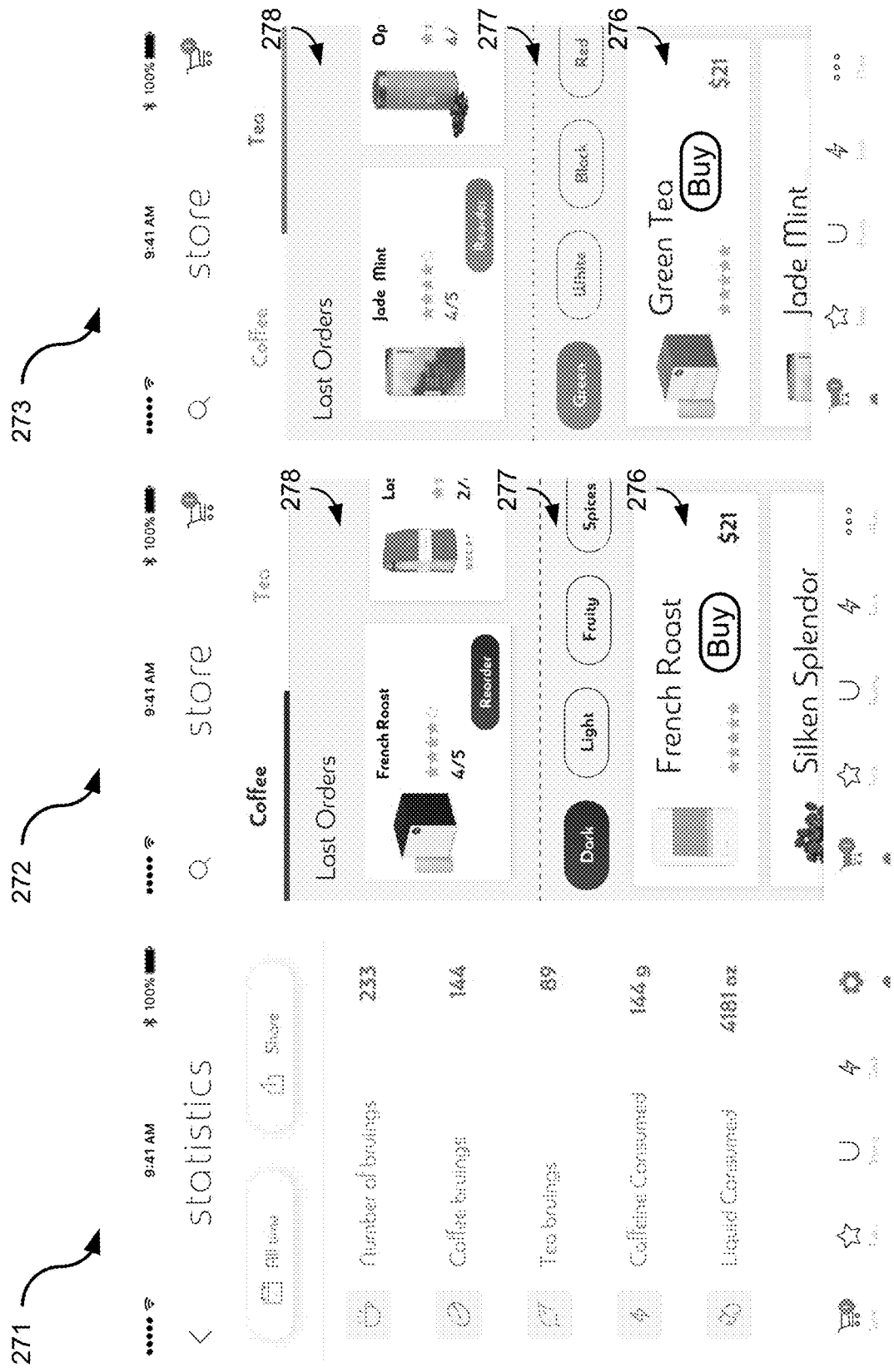

FIGS. 2A-2Q show display screens of an example user interface of a software application, e.g., the user app on the mobile device 120, for controlling various functionalities of the portable brewing device 110 including brewing and temperature regulating brewable beverages and for providing brewing product information.

FIG. 2A shows a display screen of an example user interface depicting a home screen 200 of the app. The example home screen 200 depicts a graphic 201 of the portable brewing device 110 that the app is associated with. The example home screen 200 includes an information panel 202 pertaining to parameters of the portable brewing device 110, including pre-brewing parameters, brewing parameter, device configurations, device conditions, etc. The example information featured on the information panel 202 can include brewing temperature, brewing time, drink temperature, drink volume, monitored beverage constituents (e.g., caffeine concentration, diterpene concentration, etc.) and/or monitored health parameters (e.g., heart rate, measured analyte like glucose, blood pressure, etc.). For example, the user interface home screen 200 can present the values associated with the parameters of information 202 on the screen, or can present them when activated by the user, e.g., via user touch of the screen or other user activation to cause their display, which can allow an additional layer of privacy for the user. The example home screen 200 includes functional buttons 203 to control initiation of certain functionalities of the portable brewing device 110, such as initiate brewing of a beverage material in the brewing canister (e.g., "Brew"), initiate a cleaning protocol (e.g., "Clean"), and or set a timer (e.g., "Timer"). In some implementations of the home screen 200, the user interface on the display screen can provide product information 204 about brewing materials inside and/or stored by the portable brewing device 110, product information previously purchased (e.g., inventory), and/or product information recommended to the user for purchase. In the example display screen shown in FIG. 2A, the home screen 200 includes a tab 205 of additional functions, operations, and links of the app, e.g., including but not limited to a store page ("Store") to purchase products via the app, a product recommendation page ("Taste") that allows a user to input desired characteristics of a brewable beverage for subsequent analysis and recommendations, and a monitoring page ("Track") that allows a user to view tracked parameters, e.g., including beverage and beverage constituent parameters, health and wellness parameters, etc., and a settings page that allows a user to set parameters of the portable brewing device 110, the app, account information, etc.

FIGS. 2B and 2C show display screens of the example user interface depicting example brewable product settings screens 210 and 220 of the app. The example brewable product screen 210 depicts the user's brewing settings associated with a stored beverage product, e.g., a mint tea, shown in the information panel 202 on the screen 210. Similarly, the example brewable product screen 220 depicts the user's brewing settings associated with a stored beverage product, e.g., a dark French roast coffee, shown in the information panel 202 on the screen 220. The brewable product settings screens 210 and 220 depict other like features of the home screen 200 and other user interface screens described herein.

FIGS. 2D, 2E, 2F and 2G show display screens 241, 242, 243 and 244, respectively, of the example user interface depicting an implementation of a brewing protocol according to the brewing settings of a stored beverage, e.g., dark French roast coffee from the user interface screen 220 of FIG. 2C. For example, when the user initiates brewing by hitting the "Brew" button of the screen 220 of the app, the portable brewing device 110 can perform the brewing protocol based on the brewing settings associated with a certain brewing material, e.g., displayable on the screen 220. FIG. 2D shows the display screen 241 depicting the progress of the portable brewing device 110 raising the temperature to the set brewing temperature associated with the certain beverage (e.g., 205° F. for dark French roast coffee), which is settable by the user via the app. The display screen 241 includes a timer and/or graphic 245D showing the progress associated with the brewing temperature operation. FIG. 2E shows the display screen 242 depicting the progress of the portable brewing device 110 brewing the brewing material temperature associated with the certain beverage (e.g., dark French roast coffee), which is settable by the user via the app. The display screen 242 includes a timer and/or graphic 245E showing the progress associated with the brewing operation. FIG. 2F shows the display screen 243 depicting the progress of the portable brewing device 110 lowering the temperature to the set drinking temperature associated with the certain beverage (e.g., 130° F. for dark French roast coffee), which is settable by the user via the app. The display screen 243 includes a timer and/or graphic 245F showing the progress associated with the drinking temperature operation. FIG. 2G shows the display screen 244 depicting the progress of the portable brewing device 110 completing the brewing protocol.

FIGS. 2H-2L show display screens of the example user interface depicting example setting pages and displays. FIG. 2H shows a display screen 251 depicting a listing of additional tabs from the tab 205, shown as tab button 205H in FIG. 2H, which allows the user to open other display screens and pages of the app, e.g., Wellness Tracking, Beverage Profiles, and App Settings. FIG. 2I shows a display screen depicting an example brewing time setting screen 252 that allows a user to set the time of brewing a brewable beverage by the portable brewing device 110. Similarly, the user interface of the app can include a display screen to allow a user to set a brewing duration time for brewing a brewable beverage by the portable brewing device 110. FIG. 2J shows a display screen depicting an example brewing temperature setting screen 253 that allows a user to set the temperature of brewing of a brewable beverage by the portable brewing device 110. FIG. 2K shows a display screen depicting an example stirring setting screen 254 that allows a user to set a stirring speed for brewing a brewable beverage by the portable brewing device 110. FIG. 2L shows a display screen depicting an example drinking setting screen 253 that allows a user to set the drinking temperature of a brewed beverage brewed by the portable brewing device 110.

FIGS. 2M and 2N show display screens of the example user interface depicting example cleaning protocol pages and displays. FIG. 2M shows a display screen depicting an example cleaning protocol initiation screen 261 that provides a button 266 to initiate a cleaning protocol (e.g., the button "CLEAN") that can command the portable brewing device 110 to operate a cleaning protocol. In some implementations, the cleaning protocol initiation screen 261 includes instructions 267 displayed on the screen for a user to execute prior to, during, and/or after initiating the cleaning, e.g., such as "Pour water into the compartment." FIG. 2N shows a display screen depicting an example cleaning tracking screen 262 to display a cleaning parameter, e.g., such as a cleaning time 268, before and/or during implementation of the cleaning protocol. Similarly, the user interface of the app can include a display screen to allow a user to set a cleaning parameter, such as cleaning duration time and/or cleaning initiation time, for automated cleaning of the portable brewing device 110.

FIG. 2O shows a display screen of the example user interface depicting an example statistics screen 271 of the app, which provides summaries of tracked parameters including, but not limited to device usage parameters, brewing parameters, analyte parameters, etc. In the example shown in FIG. 2O, the example parameters summarized in the statistics screen 271 include the number of total brewing events by the device 110 (e.g., over a selected time frame), number of brewing events for a particular beverage material (e.g., coffee, tea), the amount of an analyte monitored (e.g., caffeine consumed, via tracking amount of caffeine measured and dispensed from the device 110), and the amount of beverage fluid consumed.

FIGS. 2P and 2Q show display screens of the example user interface depicting example store page of the app for a particular type of brewing beverage product, such as coffee or tea, respectively, which in some implementations can facilitate direct ordering for beverage materials from certain vendors participating in the ecosystem of the intelligent beverage management system 100. For example, in some implementations, the beverage product processing engine 137 can receive product order information from product information and/or selected products for purchase inputted by the user using the app, and can provide the information to the specific vendor, e.g., via the vendor client computer 140, to fulfill the desired order by the user. FIG. 2P shows a display screen depicting an example coffee store screen 272 that provides a series of product panels 276 displaying information about a brewing material product (e.g., a specific type of coffee and associated information such as price, user reviews/rankings, vendor, etc.). In some implementations, the panels 276 can include a button to purchase a particular product (e.g., the button "BUY"), which can be used to command the portable brewing device 110 to initiate a purchase of the beverage product facilitated via the software modules of the system 100. In some implementations, the coffee store screen 272 includes a set of criteria 277 to assist the user in selecting a desired product based on the displayed characteristic criteria. The example of FIG. 2P shows a selected list of coffee types or characteristics, such as dark, light, fruity, spices, etc. In some implementations, the coffee store screen 272 includes a panel of previous, recent orders and/or favorite products 278 displayed on the screen. For example, selection of a product in the panels 276 and/or 278 can cause further product information to be displayed on the same or new display screen of the user interface. Additional or the same information and/or functional features of the display screen (e.g., buttons) can appear on the further product information screens. Features of the display screen shown in FIG. 2Q are similar to that of FIG. 2P. FIG. 2Q shows a display screen depicting an example tea store screen 273 that provides the series of product panels 276 displaying information about a brewing material product (e.g., a specific type of tea and associated information such as price, user reviews/rankings, vendor, etc.). In some implementations, the tea store screen 273 includes the set of criteria 277 to assist the user in selecting a desired product based on the displayed characteristic criteria. The example of FIG. 2Q shows a selectable list of tea characteristics or types, such as green, black, white, red, etc. In some implementations, the tea store screen 273 includes the panel of previous, recent orders and/or favorite products 278 displayed on the screen.

In some implementations, for example, the AI engine 133 receives and analyzes data associated with the portable beverage device control functions of the app, beverage parameters of the app, user preferences and product purchase information provided by the app. The AI engine 133 can determine, based on analysis of the information, certain brewing material products that would benefit the user, and generate an automated order for the certain brewing material products from the specific vendor, which can be implemented via the beverage product processing engine 137 providing the appropriate product order information for the vendor to fulfill for the user.

FIGS. 3A-3S show display screens of an example user interface of the software application for controlling various functionalities of the portable brewing device 110 including monitoring and guiding consumption of compounds from beverages and for notifying users of monitored data.

Figures 3D, 3E, 3F:
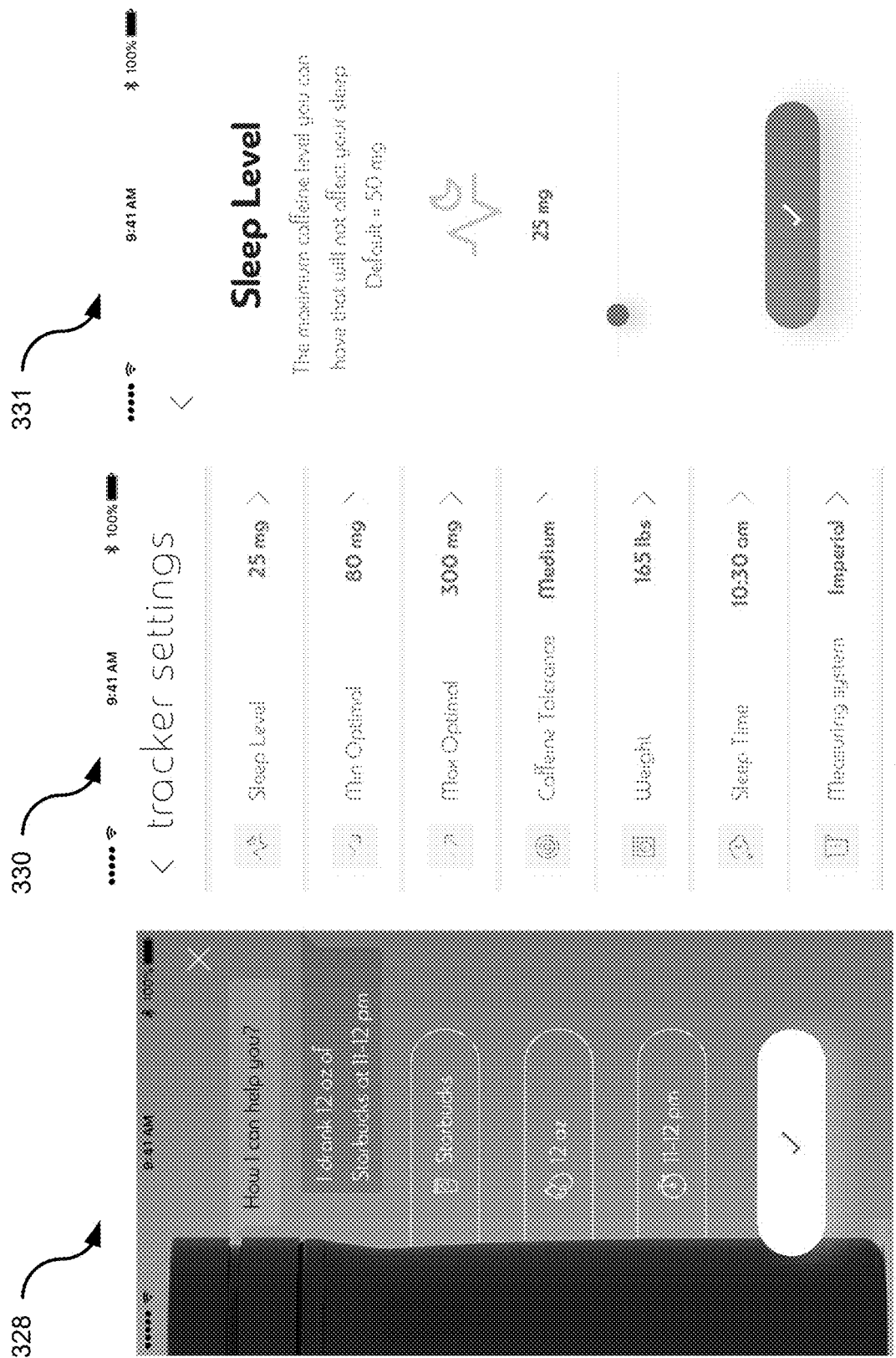
FIGS. 3A-3S show display screens of an example user interface of a software application in accordance with the present technology for controlling various functionalities of the portable brewing device including monitoring and guiding consumption of compounds from beverages and for notifying users of monitored data.

FIG. 3A shows a display screen of an example user interface of the app for tracking an analyte, i.e., analyte tracker screen 310, such as a caffeine tracker as shown in this example. The analyte tracker screen 310 can include an analyte summary region 312 displaying analyzed parameters pertaining to a monitored analyte (e.g., caffeine) using the analyte sensor 114 of the portable brewing device 110, e.g., caffeine amount consumed by the user, estimated caffeine concentration in the user's body, estimated caffeine volume consumed, etc. The analyte summary region 312 can present the summarized analyte parameters as numbers, as a percentage of a user's goal (e.g., daily goal), and/or graphically (e.g., such as a line graph of the percentage goal shown in FIG. 3A). The analyte summary region 312 can display current information (e.g., current "Levels" tracking the analyte for the user in real-time and/or over a set time period, such as daily), and can display historical information, in which the user can toggle between the current and historical levels. The analyte tracker screen 310 can include an analyte tracking graph 313 displaying a parameter versus time graph on the screen 310. In the example shown in FIG. 3A, when the caffeine amount parameter (e.g., daily caffeine) is selected, and the analyte tracking graph 313 shows the user's tracked consumption of the analyte caffeine monitored by the analyte sensor 114 of the portable brewing device 110 over the course of the day, depicted by the plot 315 spanning across amount value axis 316 and time period 317, including the current caffeine amount value 314 (e.g., 310 mg of caffeine around 7 pm), and with respect to the user's optimal level 318 (e.g., caffeine goal set by the user). In some implementations, the analyte tracker screen 310 includes an add button 319 that allows a user to add an additional amount of the analyte (e.g., caffeine) and/or an additional beverage including the tracked analyte that the user has consumed, for example, not using the portable brewing device 110. In such implementations, when the add button 319 is activated by the user on the analyte tracker screen 310, the app can open a new display screen to allow the user to input information for the analyte and/or beverage consumed, such as those shown in FIGS. 3B-3D. In some implementations, when the add button 319 is activated by the user on the analyte tracker screen 310, the app can enable other features of the mobile device 120 to input the information, e.g., initiate the camera to image a bar code or object to perform estimation of the additional analyte and/or beverage. This captured information can be provided to the AI engine 133 to analyze, e.g., by extracting information from the image, obtaining additional information from other resources via the network, and estimating the parameters associated with the additional analyte to be included in the analyte tracker screen 310.

FIGS. 3B and 3C show display screens of the example user interface depicting example add analyte screens 320 and 324 of the app, e.g., the analyte caffeine in this example. The example add analyte screen 320 includes one or more prompts, which can be graphical, textual, or both, to input information from the user about the analyte and/or beverage the user consumed not using the portable brewing device 110 for tracking. In the example of FIG. 3B, the add caffeine screen shows graphical prompts to allow the user to enter the volume of the coffee beverage and time the beverage was consumed. Implementations of the add analyte screen 320 can include a single screen or multiple screen to obtain the inputted information from the user. The example add analyte screen 324 includes a list of products that the user can select and/or search to aid with inputting information about the additional analyte and/or beverage consumed. In the example of FIG. 3C, the add caffeine screen shows a list 325 of recent products purchased by the user which may assist in determining the additional caffeine parameters for the caffeine tracking. Once inputted via the add analyte screens 320 and/or 324, the inputted information can be provided to the AI engine 133 to analyze, e.g., by extracting key information about the analyte from the inputted information, obtaining additional information associated with the analyte and/or beverage inputted from other resources via the network, and estimating the parameters associated with the additional analyte to be included in the analyte tracker screen 310.

FIG. 3D shows a display screen of the example user interface depicting example device chat screen 328 of the app, in which a user can input text to conduct various inquiries, commands, or requests of the portable brewing device 110 and system 100. In the example shown in device chat screen 328, the user enters an additional beverage consumed (e.g., 12 oz. of coffee between 11 am-12 pm). Once inputted via the device chat screen 328, the inputted information can be provided to the AI engine 133 to process, e.g., by analyzing the inputted text to determine the desired result of the user's inquiry, request or command, extracting key information about the analyzed information and desired result, obtaining additional information as necessary associated with the analyzed information from other resources via the network, and generating the desired result. In the example of FIG. 3D, the AI engine 133 recognizes the user is entering an additional beverage he/she consumed for tracking an analyte, such as caffeine, using the app. The AI engine 133 is able to determine the type of beverage and obtain and process the information about the analyte (e.g., caffeine) to estimate the parameters associated with the additional caffeine to be included in the analyte tracker screen 310.

FIGS. 3E-3K show display screens of the example user interface depicting example analyte tracker setting pages and displays. FIG. 3E shows a tracker settings display screen 330 depicting a listing of tabs, which displays current settings for the analyte tracker and allows the user to open other display screens and pages of the app to modify those settings. The examples shown in the tracker settings display screen 330 include Sleep Level, Minimal Optimal Level of the analyte (e.g., caffeine), Maximum Optimal Level of the Analyte, Analyte Tolerance, Weight and/or desired Weight Goal of the user, Sleep Time, and other settings. In implementations, for example, the settings of the analyte tracker settings display screen 330 can be used by the beverage constituent tracking engine 135 to determine how current levels affect thresholds and goals and provide notifications, and/or inform the AI engine 133 to affect changes to the portable brewing device 110 to assist the user in their achieving goals. FIG. 3F shows an example of a Sleep Level screen 331 that allows a user to set a maximum analyte (e.g., caffeine) level for affecting a user's sleep, such as at/around the user's time of sleep. FIG. 3G shows an example of a Minimum Optimal Level screen 332 that allows a user to set a minimum analyte (e.g., caffeine) level threshold for affecting a user's sense of alertness, e.g., throughout the day or over a set time period. FIG. 3H shows an example of a Maximum Optimal Level screen 333 that allows a user to set a maximum analyte (e.g., caffeine) level threshold for affecting a user's sense of alertness to not be exceeded, e.g., throughout the day or over a set time period. FIG. 3I shows an example of a Caffeine Tolerance screen 334 that allows a user to set a user-perceived response tolerance to the tracked analyte (e.g., caffeine) when the user consumes it. FIG. 3J shows an example of a Weight screen 335 that allows a user to his/her weight used to calculate dosage for the analyte tracking. FIG. 3K shows an example of a Sleep Time screen 336 that allows a user to set a time the user typically goes to bed, e.g., such that the beverage constituent tracking engine 135 can determine how current levels of caffeine may affect sleep and act accordingly.

FIGS. 3L-3N show display screens of an example user interface of the software application for utilizing health monitoring with beverage and beverage constituent consumption, based on health, fitness and wellness data monitored by the devices 120 and/or 125, such as heart rate, movement, blood pressure, blood oxygen levels, glucose levels, electrophysiological readings, etc. In implementations, for example, the health and wellness tracking display screens can provide data, including health and wellness-related data settings, to be used by the health data management engine 134 to determine how current levels affect the user's health and wellness related-thresholds and goals and provide notifications, and/or inform the AI engine 133 to affect changes to the portable brewing device 110 to assist the user in their achieving goals. FIG. 3L shows an example health and wellness set-up home screen 340 that initiates a process to prompt a user for information about the user's health and wellness data tracking, authorization, and preferences. FIG. 3M shows an example health and wellness data authorization screen 341. In the example of FIG. 3M, the app of the system 100 prompts the user to allow access to aggregate and/or provide data to a health data aggregation app on the user device 120. Examples of a health data aggregation app include Apple HealthKit and Google Fit, among others. FIG. 3N shows an example health and wellness settings screen associated with a health and wellness parameter for monitoring, including a user's tolerance profile to a particular substance that the portable brewing device 110 is operable to monitor, such as caffeine.

FIGS. 3O-3Q show display screens of an example notifications displayable on a user interface of the software application for notifying the user of current and/or predicted beverage constituent and/or health monitored parameters. In some implementations, for example, the beverage constituent tracking engine 135 and/or the health data management engine 134 determines how current or predicted levels of the beverage constituent and/or health monitored parameters affect the user's respected thresholds and goals and generate the example notifications, like those shown in FIGS. 3O, 3P and 3Q. In some implementations, the notifications can be provided to a notification management module of the operating system on the mobile device 120 such that it is delivered even when the app of the system 100 is closed or inactive (e.g., background mode). FIG. 3O shows an example high analyte level notification 350 providing information about a tracked analyte (e.g., caffeine) and the user's current and/or predicted level. In the example of FIG. 3O, the high analyte level notification 350 provides a recommendation of how the user can modify behavior to meet their goal, e.g., which can include recommending a particular beverage to be brewed in the portable brewing device 110. In some implementations, the notifications generated by the beverage constituent tracking engine 135 and/or the health data management engine 134 informs the AI engine 133 of the tracked parameters, such that the AI engine 133 can modify brewing parameters associated with the next beverage material to be brewed in the portable brewing device 110 to assist the user in their achieving goals. FIG. 3P shows an example analyte level and sleep notification 355 providing information about the tracked analyte (e.g., caffeine) with respect to the user's settings associated with sleep. In the example of FIG. 3P, the analyte level and sleep notification 355 provides a recommendation of how the user can modify behavior to meet their sleep-related goal, e.g., which can include recommending a particular beverage to be brewed in the portable brewing device 110. FIG. 3Q shows an example health risk alert notification 358 providing information about the tracked analyte or analytes (e.g., caffeine, diterpene, sugar, etc.) with respect to the user's health metrics, which can be monitored via the health data management engine 134. In the example of FIG. 3Q, the analyte levels of caffeine and diterpene are tracked, and an alert is generated warning the user to use a particular brewable material (e.g., French Roast coffee) to meet a particular health and wellness goal, such as consumption of analytes known to reduce cancer risk and/or cardiovascular disease risk, e.g., which can include recommending a particular brewing parameters associated with the recommended beverage to be brewed in the portable brewing device 110.

FIG. 3R shows an example low inventory notification 360 providing information about products the user has purchased and the portable brewing device 110 has brewed, which can be used to track amounts of brewing materials the user may possess for the products purchased. In the example of FIG. 3R, the low inventory notification 360 provides a recommendation that the user may have limited amounts of French Roast coffee, which can include estimated numbers of cups left for brewing from the user's previous purchase. The low inventory notification 360 can provide recommendations and links to the store pages of the app to repurchase the products of low inventory.

FIG. 3S shows an example cleaning notification 365 providing information and recommendations associated with cleaning the portable brewing device 110. The cleaning notification 365 can be generated based on diagnostic information of the portable brewing device 110 analyzed by the system 100 (e.g., AI engine 133) that detects performance issues that can be remedied by implementing a cleaning protocol. The cleaning notification 365 can be generated based on a timed cleaning schedule (e.g., every night, certain days of the week, etc.), and/or based on a use schedule (e.g., after each brewing event by the portable brewing device 110).

FIGS. 4A-4F show display screens of an example user interface of the software application for learning user preferences based on taste characteristics and guiding recommendations for products that can be purchased.

Figures 4A, 4B, 4C:
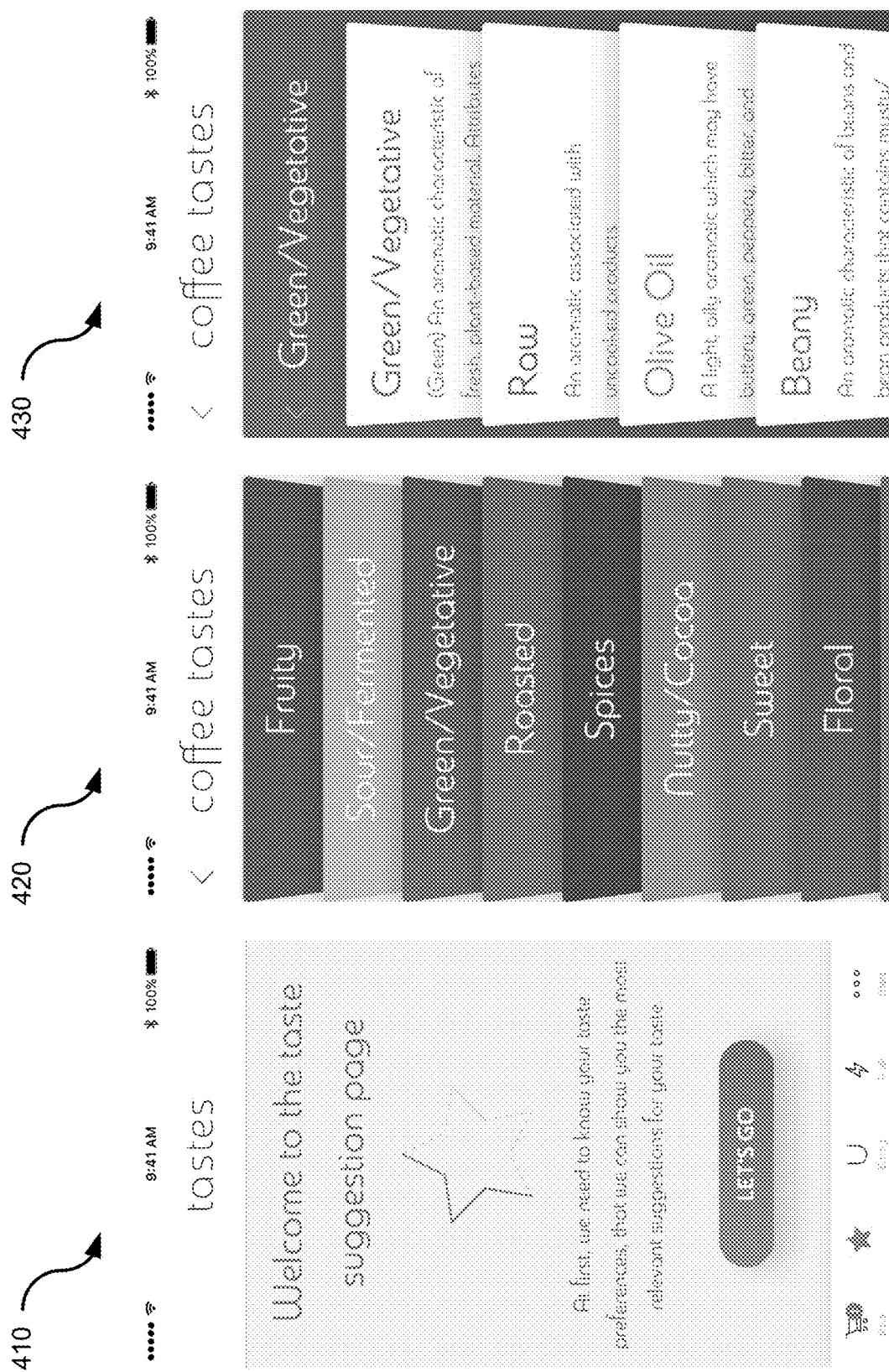
FIGS. 4A-4F show display screens of an example user interface of a software application in accordance with the present technology for learning user preferences based on taste characteristics and guiding recommendations for products that can be purchased.
Figures 4D, 4E, 4F:
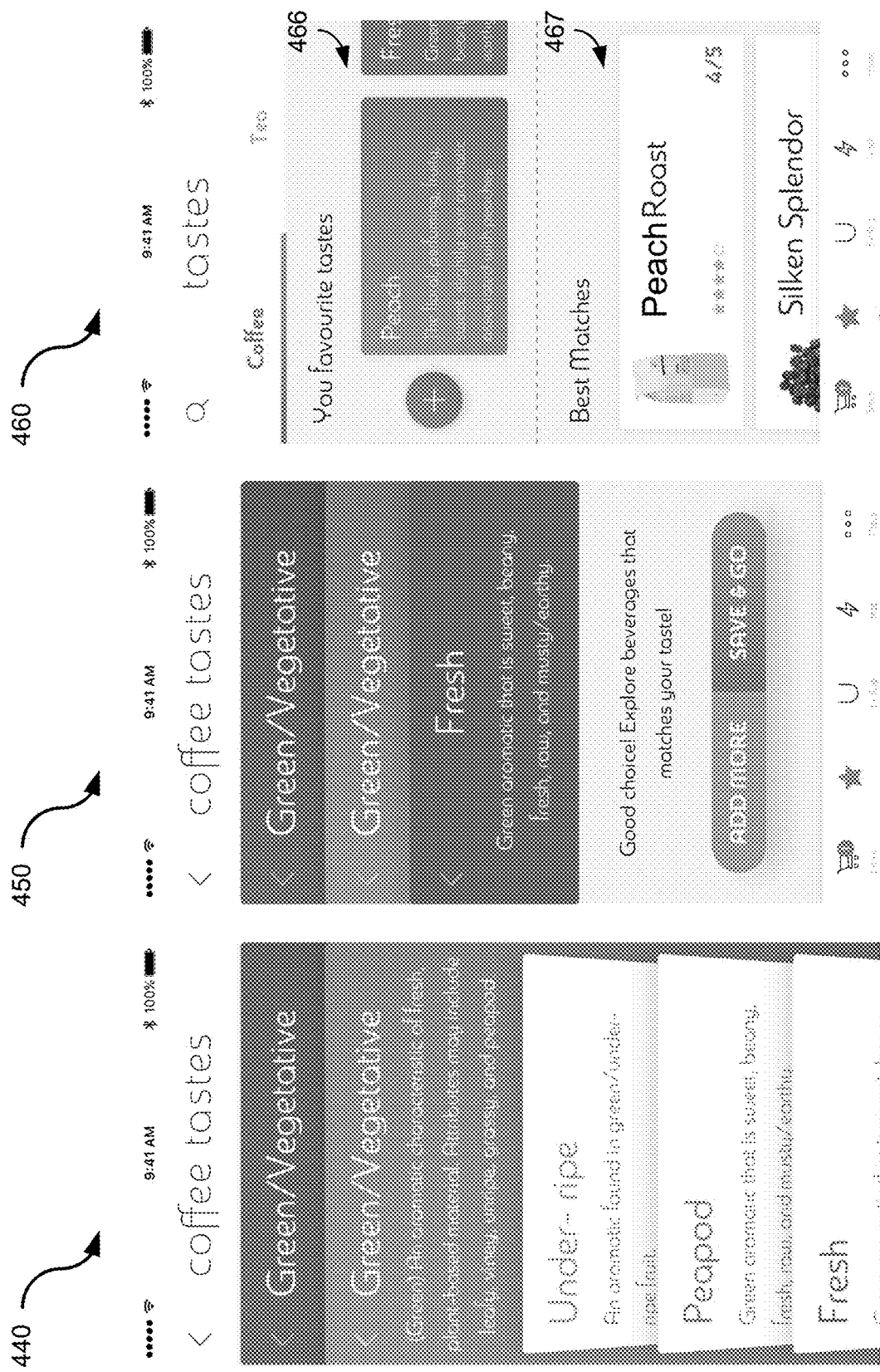

FIG. 4A shows an example taste evaluation home screen 410 that initiates a process to prompt a user for information about the user's taste preferences associated with a type and/or sub-type of brewing material, such as coffee or tea, and/or a particular subgroup of coffee or tea. The taste evaluation home screen 410 can include a list of brewing material types or sub-types for the user to select to initiate the learning process. FIG. 4B shows an example of coffee tastes screen 420 that provides predetermined taste characteristics associated with the selected brewing material (e.g., coffee) or subgroup of the brewing material for the user to select. FIG. 4C shows an example of coffee tastes screen 430 that provides predetermined taste characteristics associated with the selected taste characteristic(s) of the screen 420, e.g., coffee in this example. FIG. 4D shows an example of coffee tastes screen 440 that provides predetermined taste characteristics associated with the selected taste characteristic(s) of the screen 430, e.g., Green/Vegetative in this example. FIG. 4E shows an example of coffee tastes screen 450 that provides predetermined taste characteristics associated with the selected taste characteristic(s) of the screen 440, e.g., Fresh in this example. FIG. 4F shows an example of coffee tastes analysis screen 460 showing a summary of the characteristics 466 and/or example best matches and purchase information 467. In some implementations, for example, the responses inputted by the user via the screens 410-450 can be processed by the AI engine 133 to determine certain products and/or categories of products that is predicted to be enjoyed by the user, and thereby provide the app with information to structure the coffee tastes analysis screen 460.

Example Use Case Implementations

Some example use cases of implementations of the system 100 using the user app on the mobile device 120 are described for providing the user with predictive analytics from tracking beverage constituents and health parameters and recommendations for modifying behavior.

Example use case 1. A person having Type 2 diabetes or prediabetes who enjoys brewable beverages utilizes the system 100 for tracking various beverage constituents such as caffeine, diterpenes, etc. and for assisting his/her management of diabetes with respect to his/her beverage consumption habits. In some examples, the user can input a health condition in the app (e.g., via the health and wellness setup, such as the example user interface of FIG. 3L), or the system 100 can determine the health condition (e.g., diabetes) based on data shared through the data aggregation engine 131 provided via a health data aggregation app, such as Apple HealthKit, etc. Health data associated with their condition is reported to the system 100, e.g., stored via the user database engine 132, and processed by the health data management engine 134; and beverage consumption data including beverage constituents monitored by the portable brewing device 110 and by the app (e.g., to input additional beverage consumption events) is processed by the beverage constituent tracking engine 135. The user's health data shows that the user has an impaired glucose tolerance. For example, studies have shown that habitual caffeine consumption (e.g., above 500 mg) for most of the day (especially during times of eating) can help with impaired glucose tolerance. As such, the AI engine 133 of the system 100 can process the health data with the beverage consumption data to (i) suggest different types of brewable beverages (e.g., coffees/teas) and/or the amount over time periods (e.g., throughout the day) in order to achieve a consistent level for health and beverage constituent parameters, and to (ii) change particular brewing parameters in order to extract a correct amount of certain beverage constituent parameters, like caffeine, in the individuals beverages that the app suggests. Consequently, for example, the system 100 can augment the user's ability to manage their health condition in a simple, lifestyle friendly manner that utilizes the features of the portable brewing device 110, the cloud system 130 and app on the user's mobile device 120 in accordance with the present technology.

Example use case 2. There are certain compounds such as diterpenes that have been shown to decrease the synthesis and secretion of bile acids, which may promote colon carcinogenesis. As such, diterpenes are of interest as a substance that may reduce the risk of colorectal cancer. Diterpenes may help promote the elimination of carcinogens and improve antioxidant status by enhancing glutathione synthesis as it has been shown in studies that glutathione concentrations are significantly increased in colorectal mucosa and plasma. Yet, it is important to modulate the amount of diterpenes consumed. Therefore, a user who enjoys brewable beverages can utilize the system 100 for tracking various beverage constituents such as caffeine, diterpenes, etc. and assist his/her management of target constituents he/she may wish to consume.

Example use case 3. Yet, a person may have two or more different health issues, either reported by that person or determined automatically by the system 100, which can have conflicting management goals tracked and analyzed by the system 100, e.g., using the AI engine 133 and the beverage constituent tracking engine 135 and/or health data management engine 134. For example, the user could have a high risk of cardiovascular disease (e.g., because of high cholesterol levels, high blood pressure, family history etc.). The optimal consumption for that disease risk state, based on research, could be moderate consumption of caffeine (e.g., 3-6 cups per day of coffee). However, if the person had a second health risk such as colorectal cancer (e.g., based on family history, previous cancer, etc.) where the optimal consumption could be 2-4 cups of coffee per day because more than 5 cups of coffee could be detrimental, then the AI engine 133 can take both of these conditions and conflicting management goals into account and suggest and adjust the user to a range of 3-4 cups per day. An example of a notification or alert can include the example shown in FIG. 3Q.

Example use case 4. A person using the system 100 could go through the day drinking sufficient amounts of coffee to reach a desired caffeine amount (e.g., 500 mg) monitored and managed through caffeine tracking and brewing protocol management. Yet, if the person has not reached the daily recommendation for additional compounds that he/she is tracking and managing, such as diterpenes, glucose or other, then the system 100 can suggest switching to a decaffeinated version of the person's brewable beverage that includes the additional compound(s) in order to satisfy the person's daily amount, e.g., of diterpenes.

For example, in some implementations, the system 100 provides predictive analytics in real time for monitoring the person's beverage constituent consumption to determine when there is/will be a time point at which the user would not be able to satisfy two or more conflicting goals, such as an optimal caffeine goal and an optimal diterpene goal. As an example, the user may reach or approach a caffeine level at a time point with little diterpene consumed by the time point, such that it may be impossible to achieve both goals with the user's current inventory and/or known beverage substances. Consequently, the system 100 can suggest a modified caffeine goal 300 mg, for example; or when the user initiates brewing on the portable brewing device 110, the system 100 notifies the user that it would be impossible to achieve his/her goal by carrying out the brewing event.

Certain combinations could be virtually impossible to achieve without intelligent management. Take, for example, a molecule B is not commonly found without molecule A. And, if molecule A is found in a plethora of beverages (e.g., caffeine), but not molecule B is not common in most beverages (e.g., diterpene), then a user would struggle to manage daily tracking, let alone know what beverages to consume in what quantities and when. By tracking beverage constituents, the system 100 can figure out in advance how the user can manage this, and warn the user when they are in ranges that make it challenging or impossible to achieve an optimal goal of two or more compounds. Also, the system 100 can track when one molecule would exceed a maximum threshold in order for a second molecule to achieve a minimum threshold (goal) for a given time period.

In some implementations, the system 100 is configured to change the brewing parameters of the device 110 to extract a certain amount of the analytes such as changing the diterpene to achieve X %. For example, filtering coffee during brewing traps diterpenes; so, if a person needs more diterpene, the system 100 could suggest eliminating the filter in order to achieve a higher diterpene concentration, an example being without a coffee pod and only in the brewing canister of the portable brewing device 110, e.g., with certain settings. Unfiltered coffee can significantly raise total cholesterol and LDL levels, yet also allow for more diterpene concentration known to reduce risks to certain cancers, for example Notably, raising cholesterol level and colorectal cancer risk are at odds with one another. Yet, the system 100 can determine if and where there may be a small overlap for an optimal amount of molecules (e.g., caffeine and diterpenes) with respect to known benefits, known risks, and user-desired goals. In an illustrative example, an optimal amount could include 60-80 mg of diterpene and 400-500 mg of caffeine; but in order to achieve this, it would require recommendations for multiple brewing parameters and device settings, e.g., unfiltered/filtered brewing, type of brewable material, amount of brewed beverage, current consumption status, etc. The AI engine 133 of the system 100 would allow the user to consume as they normally would, but by tracking all of the activity, the AI engine 133 could make a timely recommendation on what they should do to achieve the optimal combination of beverage types. For example, if someone got off track (too much caffeine and not enough diterpene), then the system 100 would recommend a way to get back on track.

Example use case 5. A female person using the system 100 wishes to become pregnant, and still enjoy brewable beverages. Observational studies have found significant decreases in the probability of pregnancy in women who consumed 300 mg or more of caffeine daily. If a woman is trying to become pregnant, it may be beneficial for her to consume less caffeine. The AI engine 133 can autonomously manage brewing protocols, make recommendations, and notify her of current and predicted caffeine levels to seamlessly assist the female user to manage caffeine consumption at less than 300 mg per day. The AI engine 133 could also recommend other behaviors known to be beneficial to pregnancy, e.g., per information provided by the health data management engine 134.

Example use case 6. Large observational studies have suggested that 3 or more cups of black tea a day decrease the risk of coronary heart disease. Polyphenolic compounds (e.g., present in different concentrations in green and black tea/*Camellia sinensis*) have been shown in studies that they may reduce risk of developing chronic disease such as cancer, cardiovascular diseases, arthritis, and diabetes. Yet, there has been studies that have shown there is an inverse relationship between drinking black tea and Parkinson's disease risk that was independent of total caffeine intake. This has not been demonstrated with green tea. As such, the AI engine 133 could make beneficial recommendations to a user of the system 100 who may be at risk for coronary heart disease. For example, the system 100 could recommend the user to drink black tea to obtain certain if there was a desire to reduce the risk of Parkinson's disease instead of drinking coffee and green tea since the green tea was unrelated.

Example Embodiments of Methods for Beverage Brewing and Management

Figure 5A:
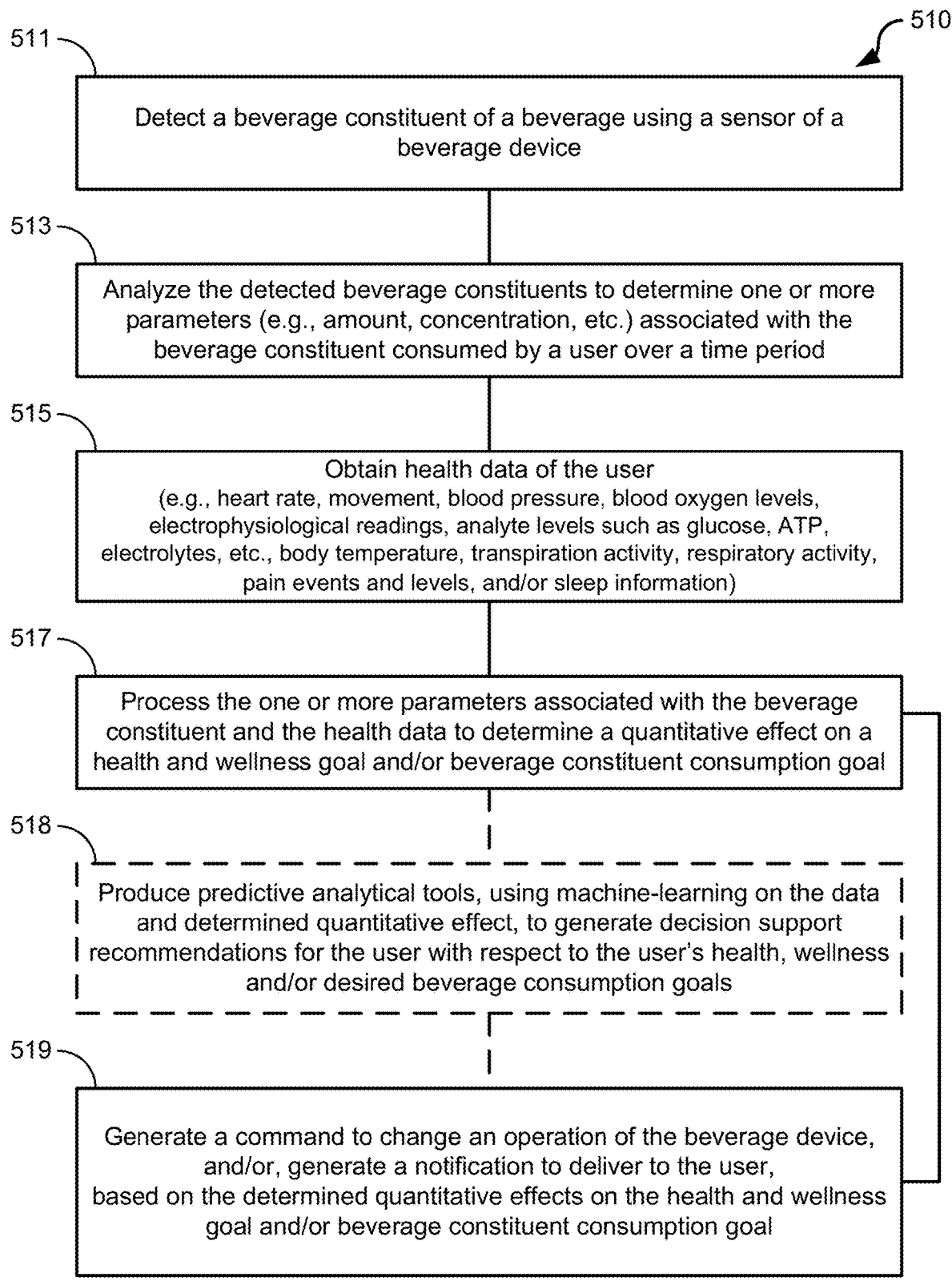
FIGS. 5A and 5B show diagrams of example embodiments of methods for monitoring and guiding a user's consumption of compounds from the brewed beverages in accordance with the present technology.

FIG. 5A shows a block diagram of an example embodiment of a method 510 for monitoring and guiding a user's consumption of compounds from brewed beverages. The method 510 includes a process 511 to detect a beverage constituent of a beverage using a sensor of a beverage device. The process 511 can be implemented using the portable brewing device 110 and the software modules of the system 100. In some implementations, the process 511 can include measuring one or more values of the beverage in the device 110 such as fluid flow (e.g., using the sensor 113), measuring one or more values of a beverage constituent of the beverage (e.g., using the analyte sensor 114), or measuring one or more values of the fluid in the device 110 and one or more values of beverage constituent. The method 510 includes a process 513 to analyze the detected beverage constituents to determine one or more parameters (e.g., amount, concentration, etc.) associated with the beverage constituent consumed by a user over time period. The method 510 includes a process 515 to obtain health data of the user. Examples of the health data include, but are not limited to, heart rate, body movement, blood pressure, blood oxygen levels, electrophysiological readings, analyte levels such as glucose, ATP, electrolytes, etc., body temperature, transpiration activity, respiratory activity, pain events and levels, and/or sleep information. The process 515 can be implemented by the data aggregation engine 131 obtaining health data from a health data aggregation app. The method 510 includes a process 517 to data process the one or more parameters associated with the beverage constituent and the health data to determine a quantitative effect on a health and wellness goal and/or beverage constituent consumption goal associated with the user. Examples of the determined quantitative effect can include a relational data point or a relational function between a health metric and one or more beverage constituents tracked by the system 100 that is specific to the user, e.g., such as a health metric-time curve depicting the user's health metric (e.g., heart rate, blood pressure, etc.) changing over past, present and future time based on the determined parameter(s) associated with consumption of the beverage constituent (e.g., caffeine). The determined quantitative effect can be produced by the AI engine 133, and used by the AI engine 133 in further processing. The method 510 includes a process 519 to generate a command to change an operation of the beverage device, and/or generate a notification to deliver to the user, which is based on the determined quantitative effect on the health and wellness goal and/or beverage constituent consumption goal. In some embodiments of the method 510, for example, the method 510 includes a process 518 to produce predictive analytical tools, e.g., using machine-learning on the data and determined quantitative effect, to generate decision support recommendations for the user with respect to the user's health, wellness and/or desired beverage consumption goals.

Figure 5B:
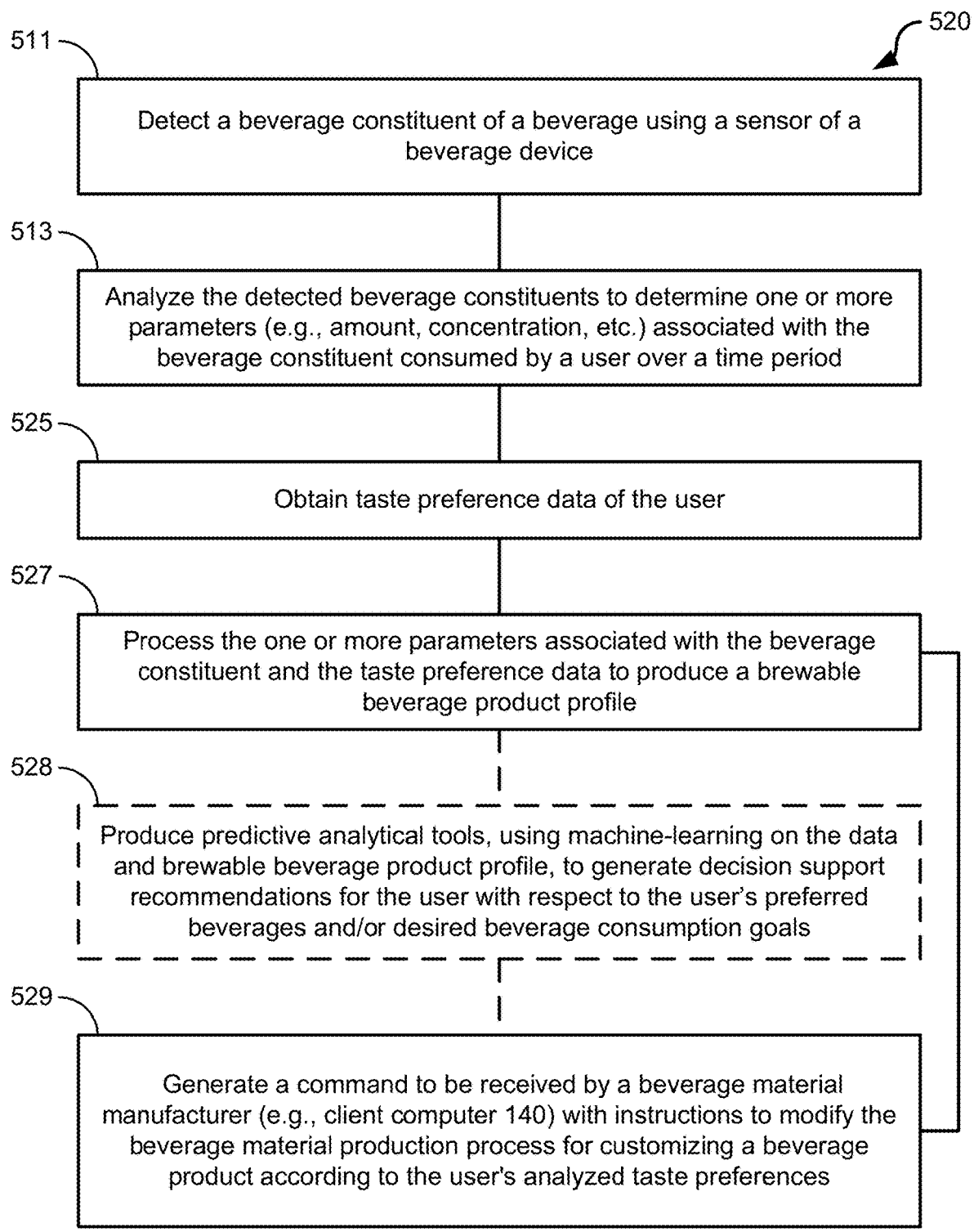

FIG. 5B shows a block diagram of an example embodiment of a method 520 for monitoring and guiding a user's consumption of compounds from the brewed beverages. The method 520 includes the 511 to detect a beverage constituent of a beverage using a sensor of a beverage device. The method 520 includes the process 513 to analyze the detected beverage constituents to determine one or more parameters (e.g., amount, concentration, etc.) associated with the beverage constituent consumed by a user over time period. The method 520 includes a process 525 to obtain taste preference data of the user. For example, in some implementations, the process 525 includes processing taste analysis data obtained via the user app, e.g., such as from user interface screens 410-460 shown in FIGS. 4A-4F. In some implementations, the method 520 can optionally include the process 515 to obtain health data of the user. The method 520 includes a process 527 to data process the one or more parameters associated with the beverage constituent and the taste preference data to produce a brewable beverage product profile associated with the user. The method 520 includes a process 529 to generate a command with instructions to be received by the vendor client computer 140 to modify the beverage material production process, via the beverage material manufacturing and/or packaging system 142, and thereby customize a beverage product according to the user's analyzed taste preferences. In some implementations of the process 529, the process 529 includes generating a notification to deliver to the user. In some embodiments of the method 520, for example, the method 520 includes a process 528 to produce predictive analytical tools, e.g., using machine-learning on the data and produced brewable beverage product profile, to generate decision support recommendations for the user with respect to the user's preferred beverages and/or desired beverage consumption goals.

Figure 5C:
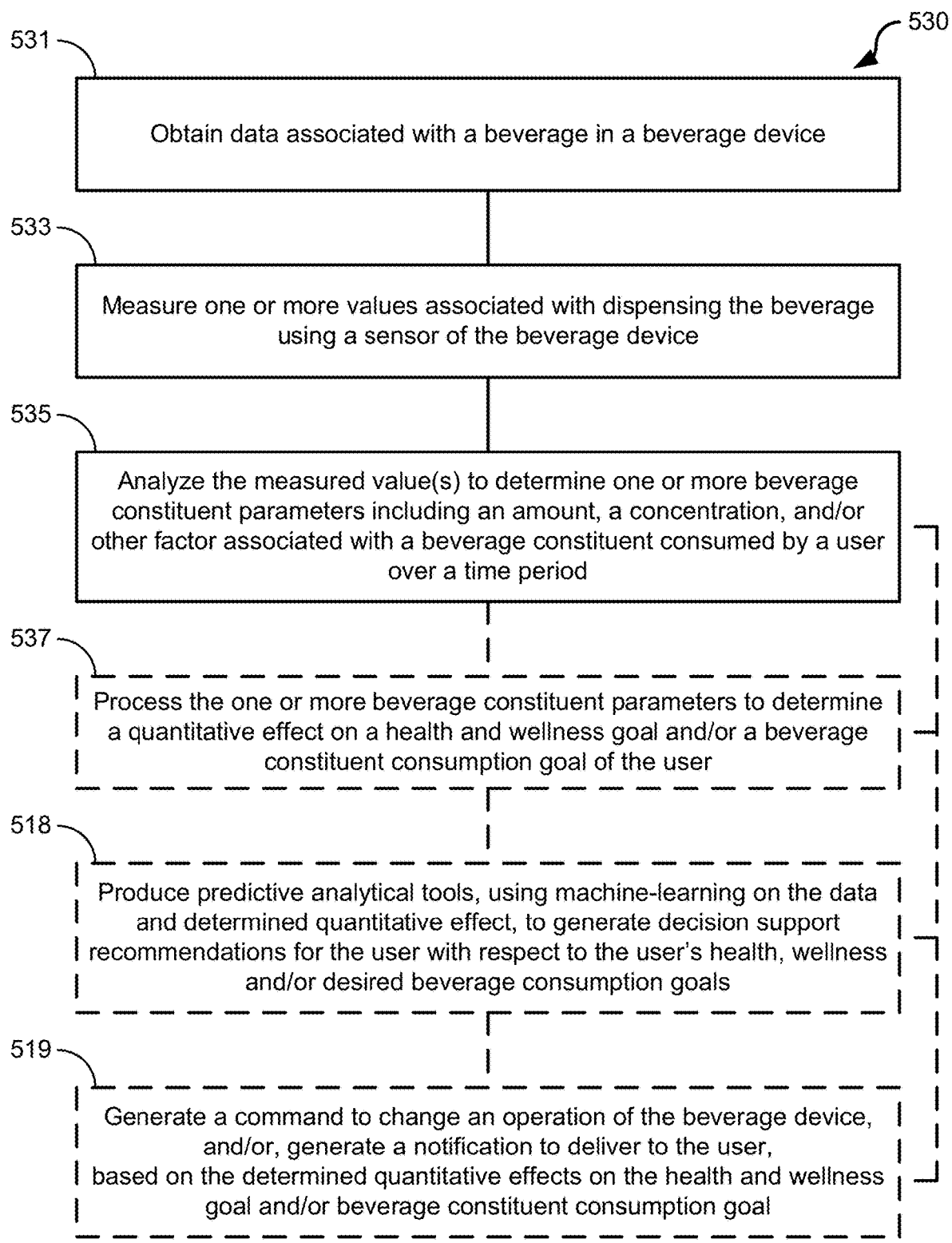
FIGS. 5C and 5D show diagrams of example embodiments of methods and systems for monitoring and guiding a user's consumption of compounds from beverages in accordance with the present technology.

FIG. 5C shows a block diagram of an example embodiment of a method 530 for monitoring and guiding a user's consumption of compounds from any beverage in a beverage device, which can include brewed and non-brewed beverages. In implementations of the method 530, the beverage device can include the portable beverage device 110 or a beverage device 540 shown in the diagram of FIG. 5D. The method 530 includes a process 531 to obtain data associated with a beverage in a beverage device. In some implementations of the process 531, a user can enter info to the app associated with the beverage device using his/her mobile device 120, and the app can obtain information about the beverage including beverage type, beverage amount, and information associated with the contents of the beverage. In some implementations of the process 531, the beverage device can automatically determine the data on the beverage (e.g., brewable beverages brewed by the portable brewing device 110). The method 530 includes a process 533 to measure one or more values associated with dispensing the beverage using a sensor of the beverage device. For example, the measured value(s) includes an amount of the beverage dispensed, flow rate at which the beverage was dispensed, and time of dispensing. In some embodiments of the beverage device, the device includes sensors to provide motion and/or location data for determining if the beverage was dispensed in the user's mouth or poured out. For example, the sensor to sense the dispensing, such as a fluid flow sensor, can provide data that the data processing unit can determine if the beverage was consumed by the user versus not consumed, e.g., based on probabilities using flow amount, flow rate, time between dispensing events, and/or other data. In some implementations using the portable brewing device 110, for example, the process 531 can include measuring one or more values of the beverage in the device 110 such as fluid flow (e.g., using the sensor 113), measuring one or more values of a beverage constituent of the beverage (e.g., using the analyte sensor 114), or measuring one or more values of the fluid in the device 110 and one or more values of beverage constituent. The method 530 includes a process 535 to analyze the measured value(s) to determine one or more beverage constituent parameters, e.g., such as an amount, a concentration, and/or other factor associated with a beverage constituent consumed by a user over a time period.

In some embodiments of the method 530, for example, the method 530 can include a process 537 to data process the one or more beverage constituent parameters to determine a quantitative effect on a health and wellness goal and/or a beverage constituent consumption goal of the user. Examples of the determined quantitative effect can include a relational data point or a relational function between a health metric and one or more beverage constituents tracked by the system 100 that is specific to the user, e.g., such as a health metric-time curve depicting the user's health metric (e.g., heart rate, blood pressure, etc.) changing over past, present and future time based on the determined parameter(s) associated with consumption of the beverage constituent (e.g., caffeine). In some embodiments of the method 530, for example, the method 530 can include the process 518 to produce predictive analytical tools, e.g., using machine-learning on the data and determined quantitative effect, to generate decision support recommendations for the user with respect to the user's health, wellness and/or desired beverage consumption goals. In some embodiments of the method 530, for example, the method 530 can include the process 519 to generate a command to change an operation of the beverage device, and/or, generate a notification to deliver to the user, which may be based on the determined quantitative effect on the health and wellness goal and/or beverage constituent consumption goal.

Figure 5D:
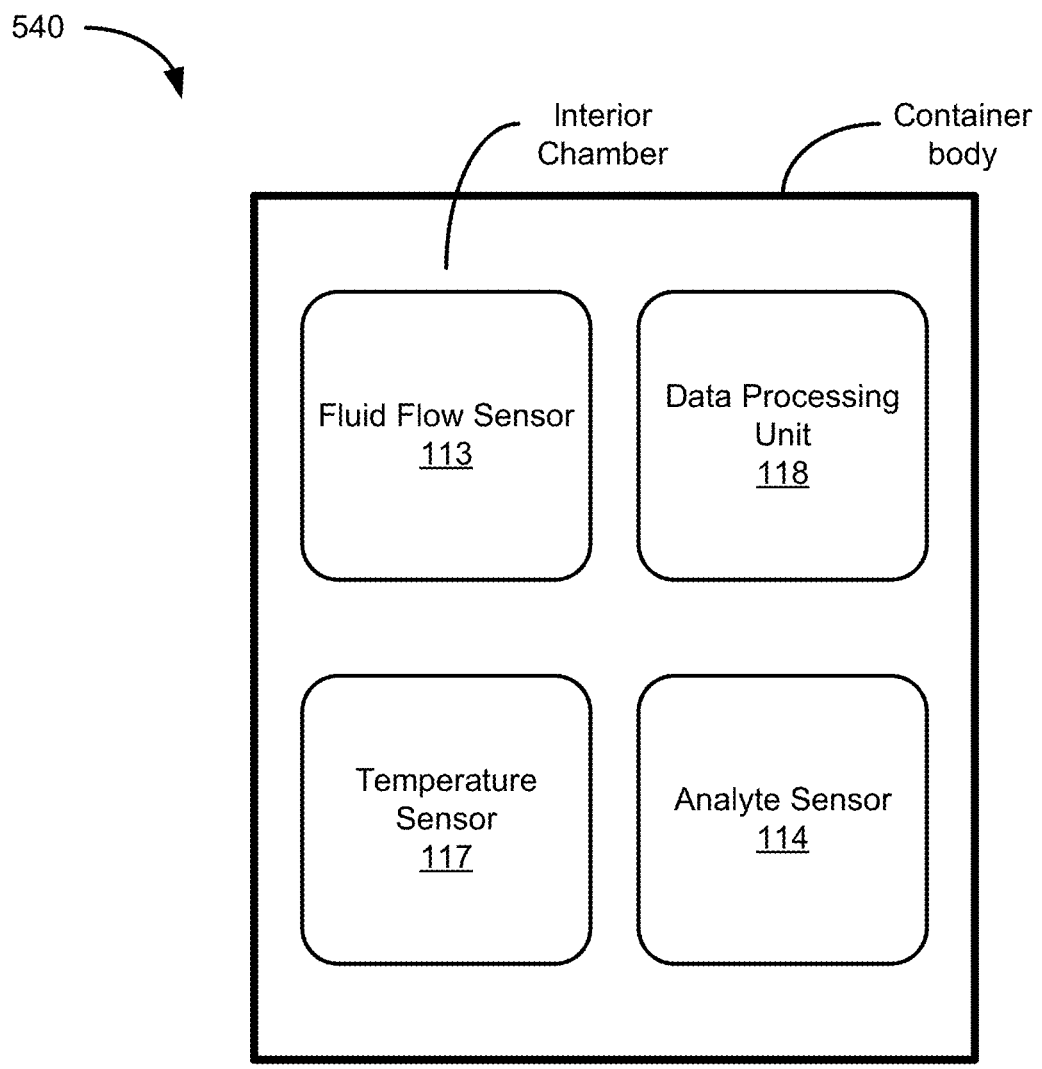

FIG. 5D shows a block diagram of an example embodiment of the beverage device, labeled device 540, of FIG. 5C. The beverage device 540 includes a container body having an interior chamber. The beverage device 540 includes a fluid sensor positioned in the interior chamber (and/or an optional lid of the beverage device 540) to measure one or more values of the fluid, e.g., during a dispensing event. The fluid sensor can include the fluid flow sensor 113 in some embodiments of the device 540. The beverage device 540 includes a data processing unit in communication with the fluid sensor. The data processing unit can include the data processing unit 118 in some embodiments of the device 540. In some embodiments of the beverage device 540, the beverage device can include a temperature sensor, an analyte sensor, or other sensors to measure attributes of the fluid in the device 540 and/or functional parameters of the device 540 itself. The sensors are in communication with the data processing unit, e.g., data processing unit 118, which can be used to communicate to the user app of the mobile device 120. The beverage device 540 can be implemented in the system 100 in addition to, or alternatively to, the portable beverage brewing device 110, for certain applications of the system 100.

Example Embodiments of Portable Brewing Devices

Some example embodiments of the portable brewing device 110, including the modular brewing subsystems and components of the portable brewing device 110, in accordance with the present technology are described below.

Figure 6A:
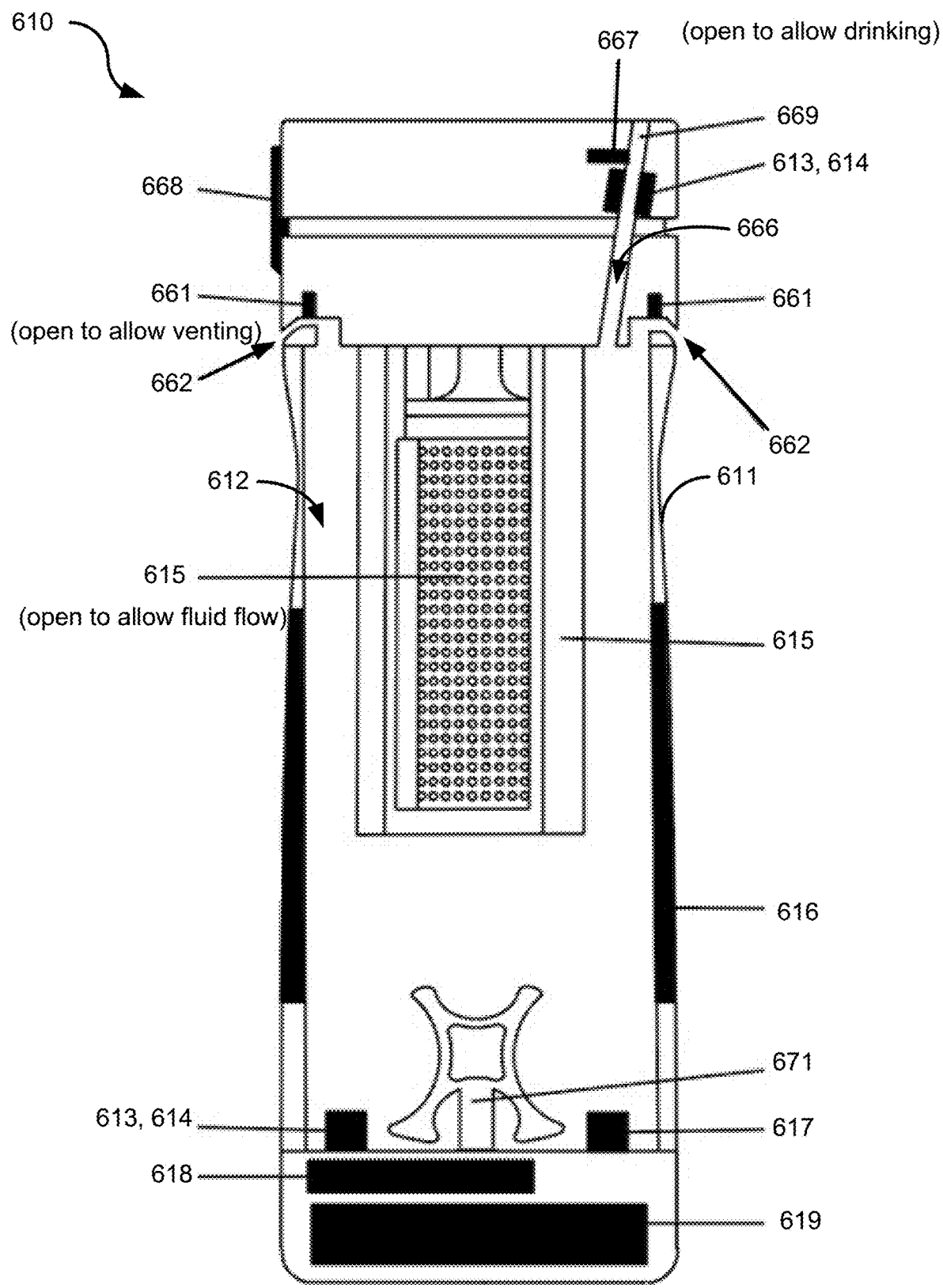
FIGS. 6A and 6B show diagrams of an example embodiment of a portable brewing device in accordance with the present technology.

FIG. 6A shows a diagram of an example embodiment of the portable brewing device 110, labeled in the figure as portable brewing device 610, including example modular subsystems and sensors. The portable brewing device 610 includes a container body 611 to house the components of the device 610, which can be configured to have a variety of shapes and sizes, and to include any of various materials to provide sufficient strength, support, electrical insulation, insulation and/or dissipation of heat, and grip for a user to hold, carry, and store the device 610. The container body 611 is structured to include an opening at the top, at which a detachable/attachable (i.e., reversibly attachable) lid or cap can be secured to the container body 611. The container body 611 can include an ergonomic design that includes a region for gripping. The portable brewing device 610 includes an interior chamber 612 located in the container body 611. In some embodiments, for example, the interior chamber 612 is part of the container body 611, whereas in some embodiments, the interior chamber 612 is a separate component that attaches to the container body 611. The portable brewing device 610 includes a drinking channel of the lid or cap that passes between an outer opening or mouthpiece 669 of the lid or cap and the interior chamber 611, when attached.

The portable brewing device 610 includes a brewing canister assembly 615 that can be positioned at various depths within the interior chamber 612, e.g., such as at the bottom of the interior chamber 612 or suspended by the lid, as depicted in the example shown in FIG. 6A. The brewing canister assembly 615 provides a compartment to contain the beverage material (e.g., coffee, tea, etc.) for brewing under controlled parameters. For example, by controlling the movement of components of the brewing canister assembly 615, the device 610 controls the diffusion of fluid into and out of the canister assembly 615. In some embodiments, the brewing canister assembly 615 includes a motor to move one or more components of the canister assembly between different positions. Various example embodiments of the brewing canister assembly 615 are disclosed in later figures. In implementations of the brewing canister assembly 615, for example, the opening and closing of the canister allows fluid to come in contact with the beverage material (e.g., tea, coffee, etc.) for brewing the beverage material to the ideal conditions, e.g., which can be based on a user defined level of extraction. For example, to obtain the ideal beverage for the user defined level of extraction, there should be a specific flow depending on the beverage material. In some embodiments, the brewing canister assembly 615 can have different hole sizes in order to control the amount of fluid passing through the beverage material. The hole sizes can be small such that it acts as a filter to prevent the beverage material from entering the interior chamber 612 as to prevent continued brewing with the fluid in the interior chamber 612 after the brewing canister assembly 615 is closed. In some implementations, the hole sizes can be specified based on their physical design of the canister walls. Whereas, in some implementations, the hole sizes can be specified based on the controlled movement of components of the canister assembly 615.

The portable brewing device 610 includes a fluid flow sensor 613 to measure an amount of fluid and/or flow rate of the fluid leaving the device 610. In implementations, the device 610 is able to detect a flow rate of the fluid dispensed by the device, and thereby the amount of fluid dispensed, which can be proportional to the amount of the beverage consumed by the user. For example, the fluid flow sensor 613 can be configured in the drinking channel 669. In some implementations, the beverage constituent tracking engine 135 can receive and process the detected fluid flow data to estimate a beverage constituent value consumed by the user using the device 610, such as an amount, concentration or volume of a beverage constituent, such as caffeine. For example, data processed by the beverage constituent tracking engine 135 can utilize the fluid sensor data (e.g., fluid volume, fluid flow, time, etc.) and information known or determined about the brewed beverage, and make an estimation of the beverage constituent level consumed by the user and/or estimated to be in the user's body. This information can then be processed to display the levels to the user, e.g., by the app on the mobile device 120 and/or a display of the portable brewing device 610; and determine quantitative effects for health purposes or taste preferences using the analytical tools, e.g., by the AI engine 133, which can be presented to the user and provide recommendations and decision support (e.g., via notifications) regarding beverage consumption or wellness activity, and/o can be used by the AI engine to cause a modification to a brewing parameter (e.g., for a future brewing event using the device 610).

In some embodiments, the portable brewing device 610 can include one or more analyte sensors 614 to measure one or more parameters of a particular analyte, such as caffeine and/or other compound or substance in a brewed beverage. For example, the one or more analyte sensors 614 can be configured in the drinking channel 669, e.g., to detect the analyte as the brewed beverage is dispensed from the device 610 (e.g., consumed by the user). In some embodiments, the portable brewing device 610 includes analyte sensor(s) 614 configured in the interior chamber 612 of the device, which can detect the concentration of the analyte in the device 610. In some embodiments, the one or more analyte sensors 614 can be configured in the drinking channel 669 and in the interior chamber 612. The fluid flow sensor(s) 613 and the analyte sensor(s) 614 are in communication with a data processing unit 618 of the device 610.

The portable brewing device 610 includes a heating unit 616 to cause heating of the fluid (e.g., water) and regulate the temperature of the fluid within the interior chamber 612. The heating unit 616 can be positioned at various locations with respect to the interior chamber 612. The device 610 includes one or more temperature sensors 617 that can be located at various locations along the interior chamber 612 to determine the temperature of the fluid, in which the measured temperature is used in regulating the temperature of the water by the heating unit 616. Examples of the temperature sensor 617 include contact and/or noncontact sensors, e.g., such as thermocouple, thermistor, resistance temperature detector, and thermostat units. In some implementations of the heating unit 616, the temperature of the fluid can be heated and/or cooled by induction heating, Peltier effect, electric heating, or other as shown in subsequent figures.

In some embodiments, the portable brewing device 610 includes a cooling unit. The example shown in FIG. 6A depicts a spinning apparatus 671 positioned in the interior chamber 612 to rotate and agitate the fluid in the container, which aids in the flow of air between the container environment and the outside environment. For example, when the fluid is relatively hot, rotation of the spinning apparatus 671 can cause flow of the fluid that subsequently exposes the fluid to more air which will in turn rise and cause a natural air flow of hot air rising to the outside environment and cool air down to the fluid. In addition to the example spinning apparatus 671, the cooling unit of the device 610 can additionally or alternatively include other cooling mechanisms.

In some implementations of the cooling unit, cooling is achieved through the spinning apparatus 671 that includes a spinner coupled to a motor to driving spinning of the spinner (e.g., paddle or other shaped component) in the interior chamber 612. The spinning by the spinning apparatus, which can be in conjunction with vented air in the chamber, can decrease the time for the brewed beverage to cool by moving the brewed fluid to cause convection, e.g., faster heat transfer from the fluid to surrounding air in the interior chamber 612. In some implementations, like the example shown in FIG. 6A, the spinning apparatus 671 is positioned at the base of the vessel and is configured to spin at a high enough speed (e.g., RPM) to cool the fluid. In some implementations, venting may not be available or utilized, and the spinning apparatus 671 can be operated to induce a Vortex shaped field in the brewed fluid that maximizes what existing air is present in the interior chamber 612. The resulting forced induction achieves faster cooling than otherwise would be possible in stagnant fluid. In some implementations, for example, the spinning apparatus 671 can be combined with a Peltier unit, heat sink, or other modular devices for providing additional cooling effects. In the example of a heat sink, cooling can be achieved through the heat sink material arranged to surround the interior chamber 612 by transferring the heat energy into the heat sink material. In some embodiments, the cooling unit can include a Peltier unit to achieve cooling, in which the Peltier is arranged such that the side of the Peltier unit touches the interior chamber 612 such that the brewed fluid can be cooled. For example, the Peltier unit can allow for both heating and cooling of the fluid and thereby allows for brewing the brewing material in hot and cold temperatures. For example, a beverage can be brewed at a hot temperature and then cooled to become a cold beverage, or vice versa.

The portable brewing device 610 includes a data processing unit 618, also referred to as a control unit of the device 610, to control features and functionality of the device 610. The data processing unit 618 can include a processor to process data and a memory in communication with the processor to store data. The memory can locally store data and information including settings associated with the modules of the device 610, e.g., including settings of the heating unit 616, the temperature sensor 617, the cooling unit (e.g., spinning apparatus 671), the fluid flow sensor 613, the analyte sensor(s) 614, and/or the brewing canister assembly 615 (e.g., via sensors or components interfaced to the canister), as well as information about other systems and devices in communication with the device 610. In some implementations, for example, the data processing unit 618 can include a signal processing unit to amplify, modulate, or otherwise modify the captured electrical signals of the sensors of the device 610 or control signals to the units of the device 610. For example, the signal processing unit can include circuitry to amplify signals, and/or convert signals to and from an analog signal and a digital signal. For example, the signal processing unit can include transistors, capacitors, resistors, inductors, transistors, diodes, amplifiers, and/or other circuit elements, etc.

The portable brewing device 610 includes a power supply 619 to supply power to the components of the device 610. For example, the power supply 619 can include replaceable batteries and/or a rechargeable battery electrically coupled to the data processing unit 618 and the modular units and components of the device 610. In some embodiments, for example, the power supply 619 can include an AC to DC converter to supply DC power to certain components of the device 610. For example, the power supply 619 can be charged by direct charging (e.g., connection to an external power source, e.g., such as an electrical outlet, a computer via USB connection, etc.), by wireless charging, and/or by solar energy conversion (e.g., using solar panels).

The portable brewing device 610 includes a venting system including a vent-stop mechanism 661 coupled to one or more venting holes 662 positioned at the bottom portion of the lid, which allows the interior chamber 612 access to outside air (outside of the container body 611). In some implementations, the venting holes 662 are configured as channels having a contoured shape. In implementations, when the vent-stop mechanism 661 is in the open position such as to allow airflow from the inside of the interior chamber 612 to the outside of the container body 611, the device 610 facilitates venting of the fluid in the chamber 612. When the vent-stop mechanism 661 is in the closed position such as to block or seal the venting hole 662, the access to the outside of the device 610 is cut off, and therefore neither liquid or air is able to enter or leave.

In some embodiments, the portable brewing device 610 can include a mechanism to open and close the drinking channel 666 between the chamber 612 and mouthpiece 669. In the example shown in FIG. 6A, the portable brewing device 610 includes a button 668 (e.g., push button) coupled to the open/close mechanism to allow the user to actuate a block-stop 667 to open the drinking channel 666. For example, the block-stop 667 can be positioned in a closed position by default, and the user can activate (e.g. push) the button 668 to clear the block-stop 667 away from the drinking channel 666 and allow fluid to flow out of the device 610.

Figure 6B:
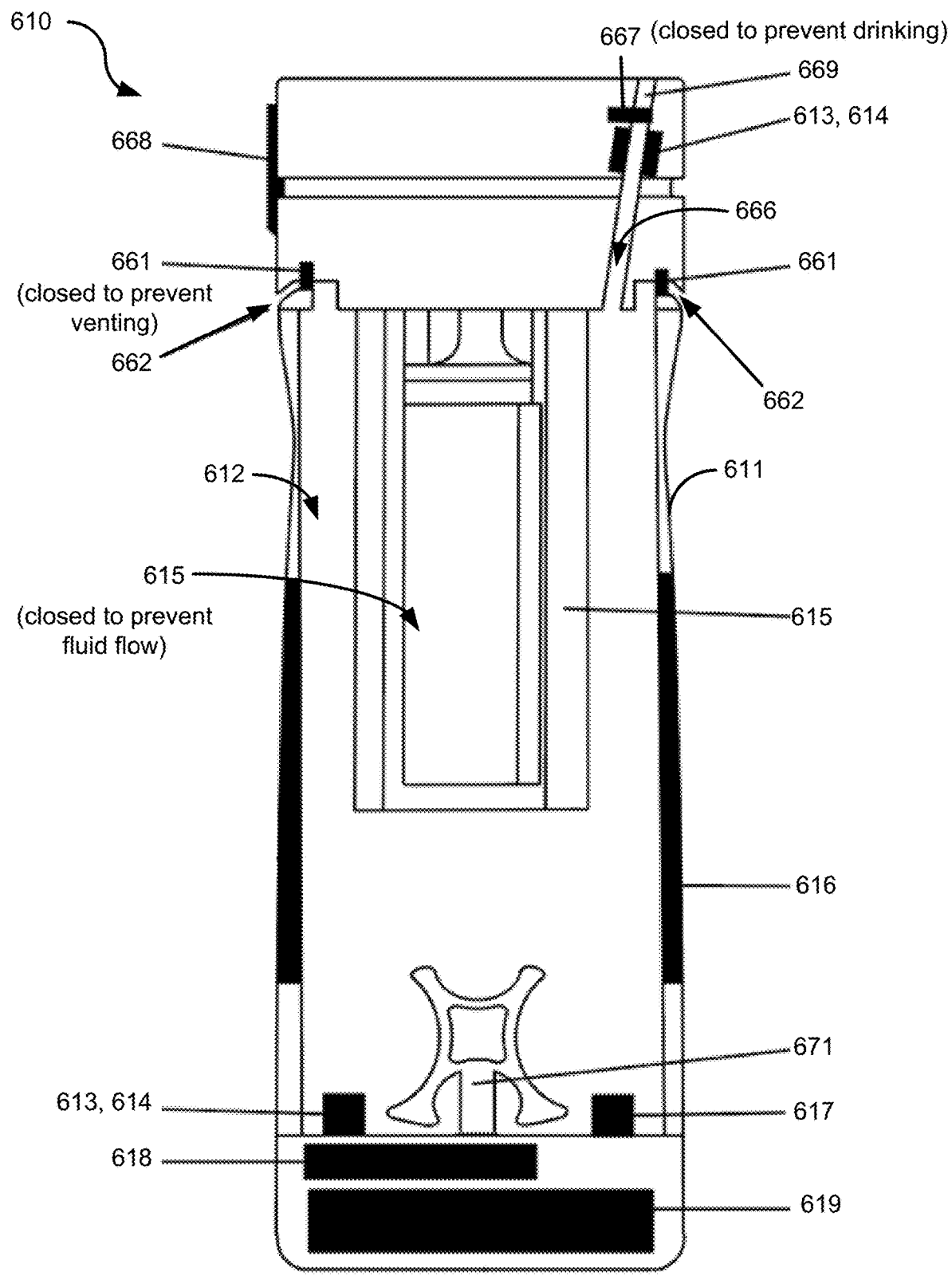

FIG. 6B shows a diagram of the example embodiment of the portable brewing device 610 from FIG. 6A, but with the brewing canister assembly 615 configured in the closed position, the block-stop 167 positioned in the closed position, and the vent-stop mechanism 661 closed.

Figure 7A:
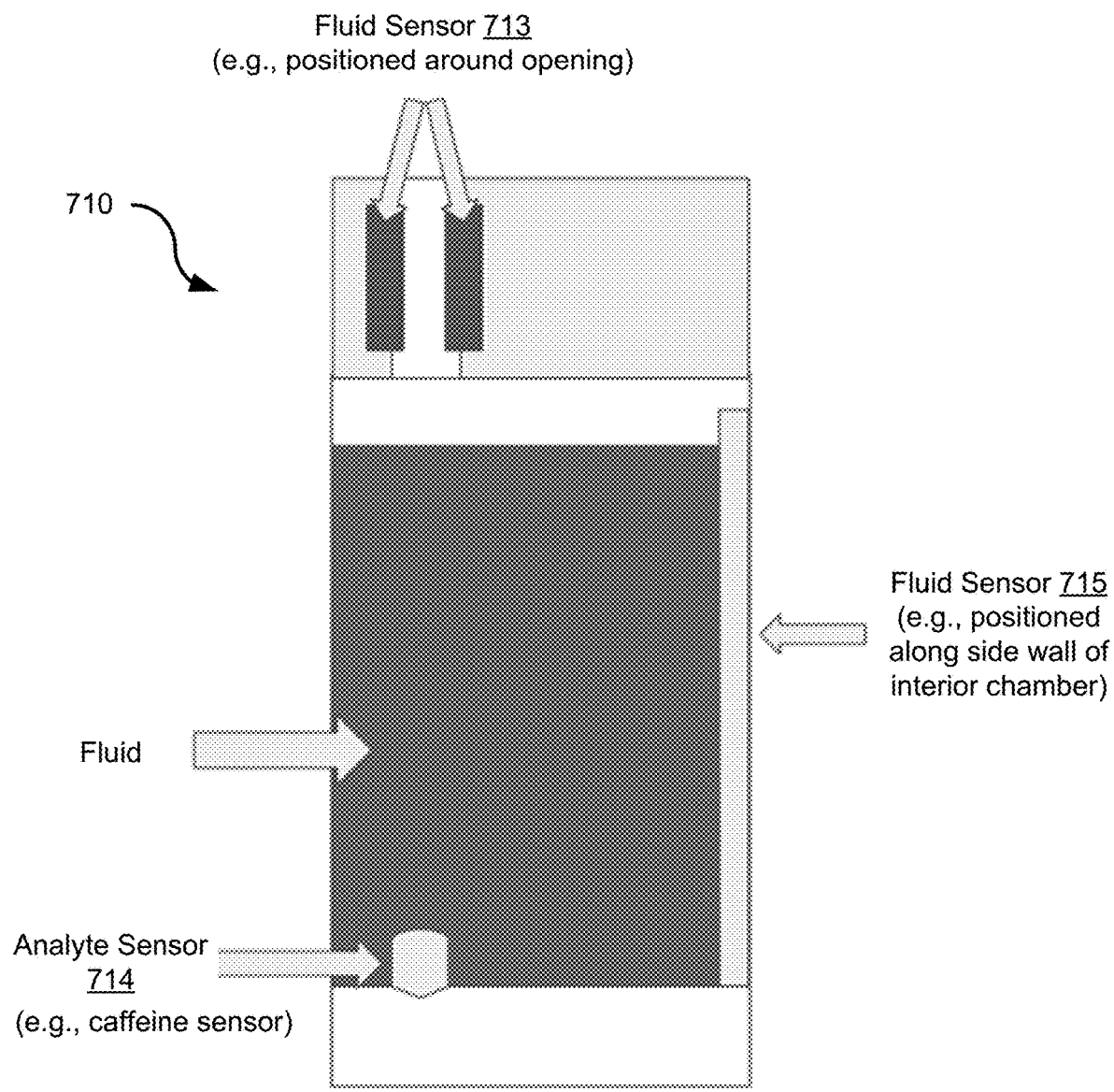
FIG. 7A shows a diagram of an example embodiment of modular features including one or more sensors of the portable brewing device of FIGS. 6A and 6B.

FIG. 7A shows a diagram of an example embodiment of the portable brewing device 110 of the system 100, labeled as portable brewing device 710. The portable brewing device 710 includes one or more fluid sensors 713 positioned along or proximate a fluid dispensing channel (e.g., near the mouthpiece opening where a user drinks the beverage) and operable to detect fluid flow from the portable brewing device 710. The one or more fluid sensors 713 are in communication with the data processing unit (not shown) of the portable brewing device 710. The portable brewing device 710 includes one or more analyte sensors 714 operable to detect one or more parameters of a particular analyte (e.g., compound or substance) in a brewed beverage, such as caffeine. In the example shown in FIG. 7A, the analyte sensor 714 is positioned in the interior chamber of the portable brewing device 710, e.g., such as at the bottom or along a side wall. In some implementations, the analyte sensor 714 can be positioned along or proximate the fluid dispensing channel, e.g., in addition or alternative to in the interior chamber.

Figure 7B:
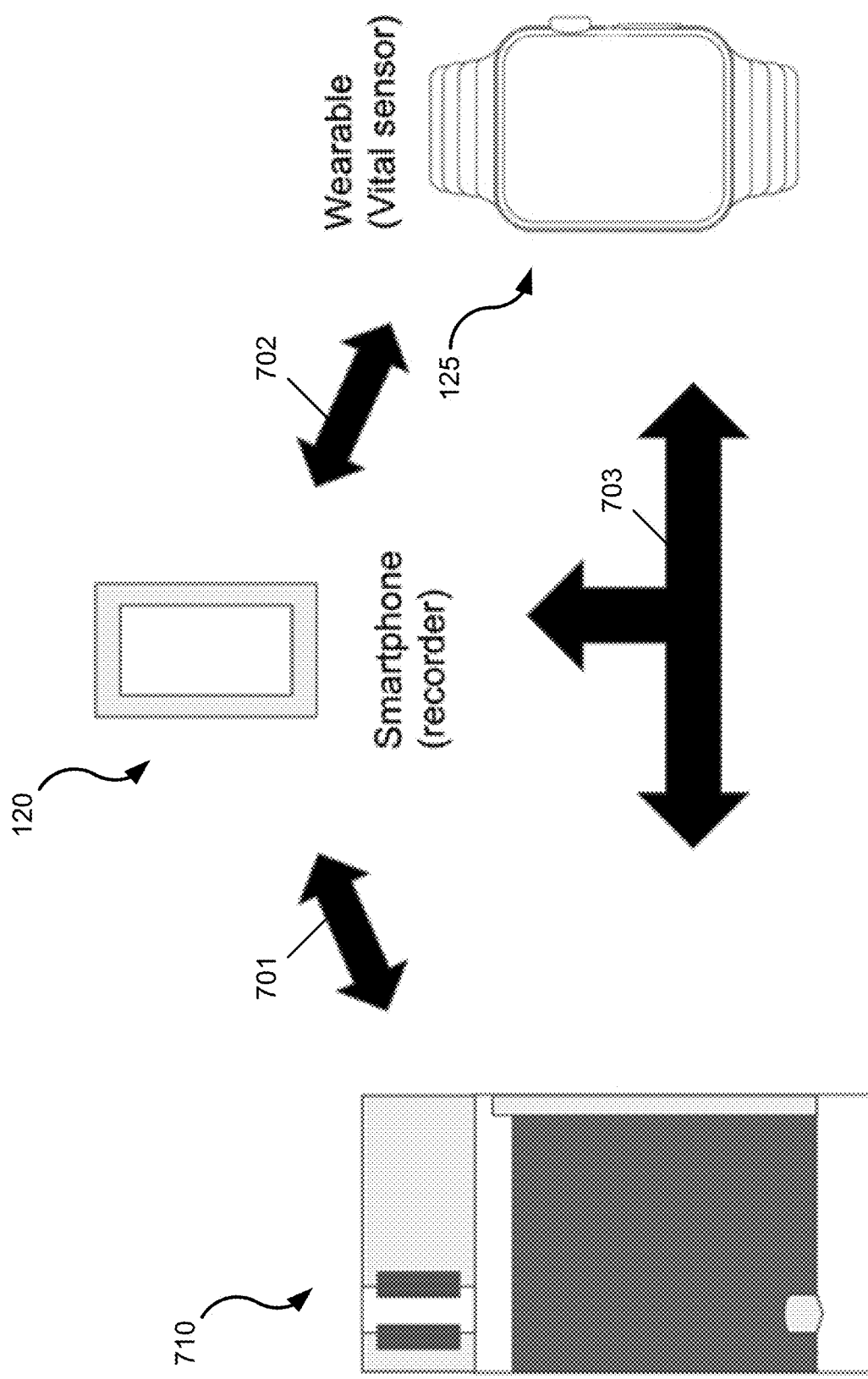
FIG. 7B shows a diagram of an example implementation in which the one or more sensors of a portable brewing device communicate detected data with a user's mobile devices.

FIG. 7B shows a diagram of an example implementation of the system 100 in which the one or more fluid sensors 713 and/or one or more analyte sensors 714 communicate the detected data, e.g., via the data processing unit of the portable brewing device 710, with an example embodiment of the mobile device 120, e.g., smartphone, and/or with an example embodiment of the wearable device 125, e.g., smartwatch. The data communication between the devices can be two-way, in which data is transferred and received between devices. The diagram shows two example data pathways for the sensors of the portable brewing device 710 to provide the detected data to the mobile device 120, including data path 701 between the portable brewing device 710 and the example smartphone 120 (which can re-transmit the data and/or process and transmit processed data to the wearable device 225, via data path 702), and data path 703 that provides the detected data between the portable brewing device 710 and the example smartphone 120 and the example wearable device 125.

Figure 8A:
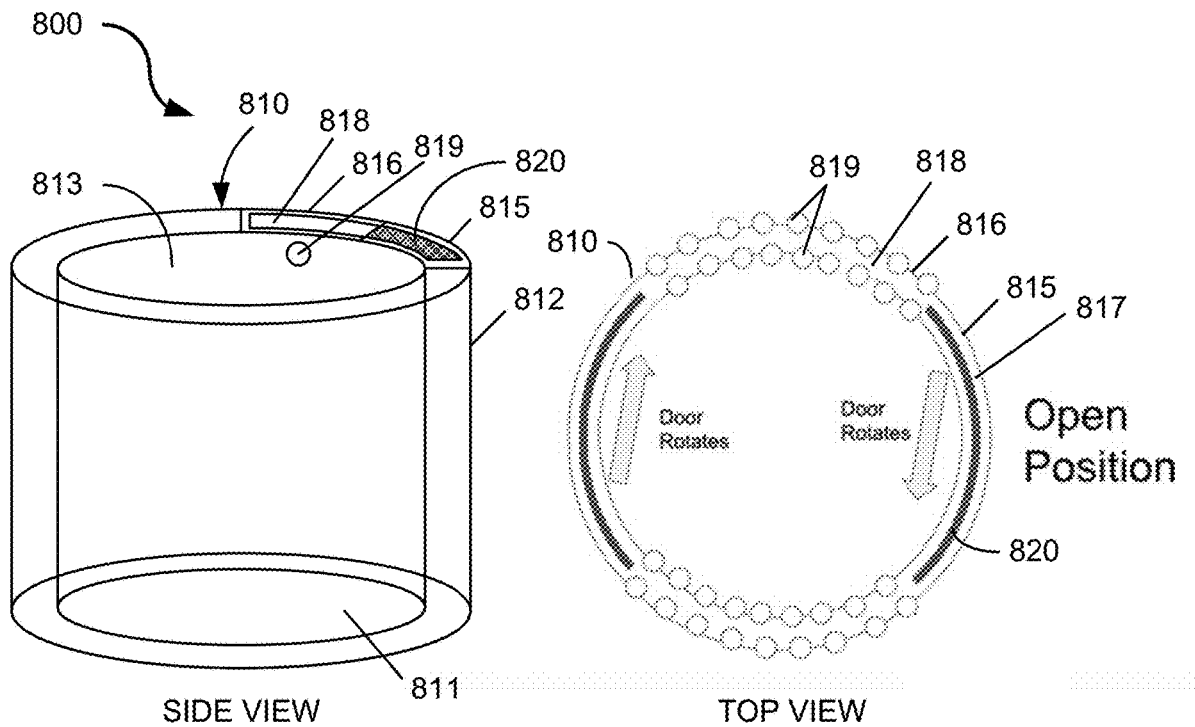
FIGS. 8A and 8B show an example embodiment of a brewing canister assembly in accordance with the present technology.
Figure 8B:
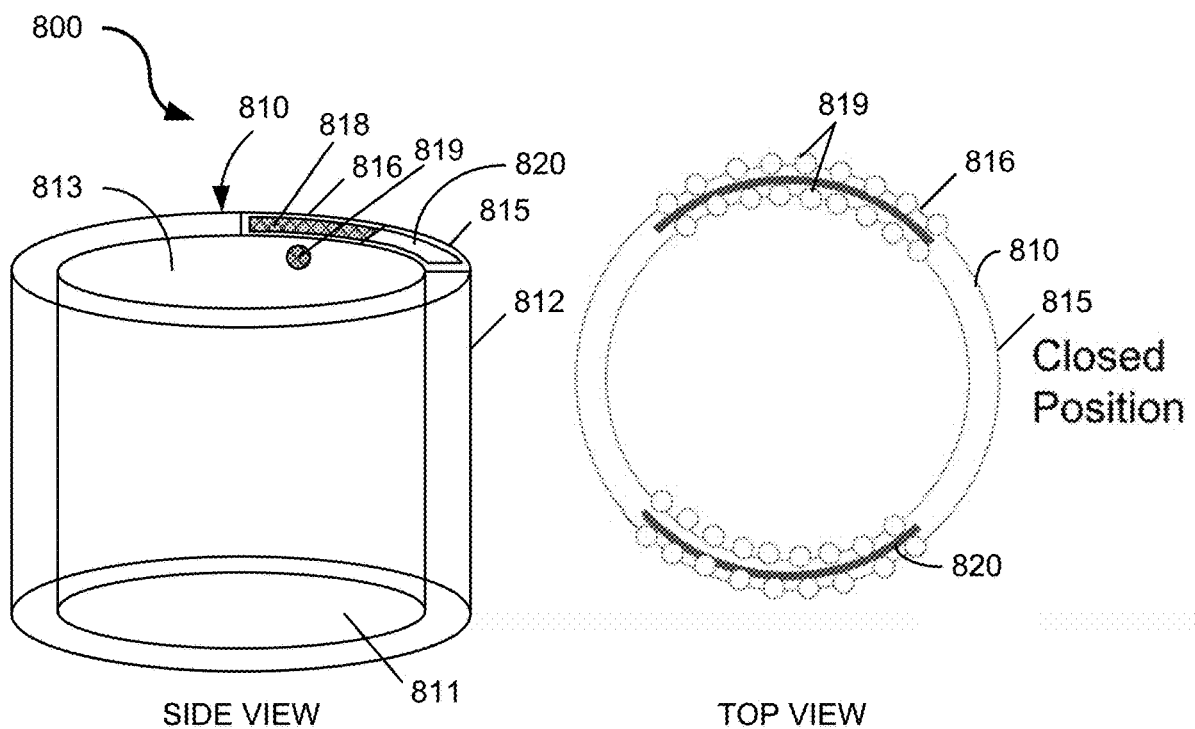

FIGS. 8A and 8B show an example embodiment of a brewing canister assembly 800 in accordance with the present technology, e.g., an example embodiment of the brewing canister assembly 115. In some implementations, the brewing canister assembly 800 can be implemented in the portable brewing device 110. Whereas, in some implementations, the brewing canister assembly 800 can be implemented in a stand-alone device, such as in a container for manual control of the brewing canister assembly 800, or as in a table-top beverage brewing machine, which can employ manual or automatic controls.

The brewing canister assembly 800 includes a canister frame 810 including a base 811 coupled to a wall 812. The wall 812 includes a first wall region 816 and a second wall region 815 adjoining the first wall region 816. The base 811 and the wall 812 form an interior region 813 providing a brewing chamber. The first wall region 816 is structured to include an interior cavity 818 and one or more openings 819, e.g., hole(s), that passes through the first wall region 816 and the interior cavity 818. The second wall region 815 is structured to include an internal cavity 817 positionally aligned with the interior cavity 818 of the first wall region 816. The brewing canister assembly 800 includes a component 820 operable to move between an open position and a closed position of the brewing canister assembly 800, e.g., between a first position associated with the second wall region 815 and a second position associated with the first wall region 816. In the example shown in FIG. 8A, the component 820 incudes a barricade structure, e.g., a door, configured to move between the internal cavity 817 of the second wall region 815 and the interior cavity 818 of the first wall region 816, in which the barricade structure 820 is able to obstruct the one or more openings 819 of the first wall region 816 when positioned in the interior cavity 818. The brewing canister assembly 800 includes an actuator operable to modulate movement of the canister frame 810 and/or the component 820 (e.g., door) between an open position that exposes the one or more openings 819 (shown in FIG. 8A) and a closed position that blocks the one or more openings 819 (shown in FIG. 8B), such that fluid located outside the brewing canister assembly 800 is able to flow in and out of the brewing chamber (interior region 813) when in the open position and is unable to flow in and out of the brewing chamber when in the closed position. Examples of the actuator include a lever or protruding component to allow manual movement of the component 820 and/or the canister frame 810; a motor in communication with a data processing unit to automatically control the movement of the component 820 and/or the canister frame 810; and/or an electromagnetic system in communication with a data processing unit to automatically control the movement of the component 820 and/or the canister frame 810. In implementations, for example, the brewing canister assembly 800 is operable to contain a brewing material in the brewing chamber and regulate fluid flow in and out of the canister frame to brew the brewing material.

In some embodiments, the portable brewing device 110 includes a container body having an interior chamber to contain a fluid, and the brewing canister assembly 800 positioned in the interior chamber. The brewing canister assembly 800 can be to include the component 820 operable to move between a closed position and an open position, the open position providing one or more holes between an exterior and an interior of the canister frame 810 of the brewing canister assembly. The brewing canister assembly 800 includes the actuator configured to modulate movement of the component 820 between the open position and the closed position, such that the fluid is able to flow in and out of the brewing canister assembly 800 when in the open position and is unable to flow in and out of the brewing canister assembly 800 when in the closed position.

The example embodiments of the brewing canister assembly 800 shown in FIGS. 8A and 8B comprises a 'one canister assembly', in which the canister frame 810 and/or the component 820 are able to rotationally or translationally move such that at least one of the canister frame 810 or component 820 changes position in order to open and close the access from the inside, e.g., where the brewing material is kept, to the outside where the fluid is kept. The example of the brewing canister assembly 800 shown in FIGS. 8A and 8B can include several holes (e.g., circular holes) that act as passage ways from the outside to the brewing material. Some embodiments of the brewing canister assembly 800 include having one large hole from both sides of the canister in which the component 820 is able to cover the entire hole, and prevent flow in the closed position, or at least a portion of the entire hole to modulate the fluid flowing in and out. The example embodiments of the brewing canister assembly 800 can include different hole designs, hole amounts, different shapes, different number of components, and placement of components and materials. In some embodiments, the one canister assembly is configured such that one of the canister frame 810 or component 820 at least partially encompasses the other.

The example embodiments of the brewing canister assembly 800 in accordance with the present technology can include rounded three dimensional shapes, such as cylinders, cones and the like, such as the example shown in FIG. 8A. For example, the component 820 and one or more openings 819 can be configured along any vertical position of the second wall region 815 and first wall region 816, respectively, for the brewing canister assembly 800. Similarly, the brewing canister assembly 800 can include non-rounded three dimensional shapes, such as 3D octagons, hexagons, rectangles and the like. In some embodiments, the component 820 is structured to move translationally between the first and second wall regions 816 and 815, in which the wall regions may be vertically adjacent. In some embodiments, the component 820 is structured to rotate inwards into the interior region 813 of the canister frame 810 via a hinge, thereby moving between the first and second wall regions 816 and 815.

Figure 8C:
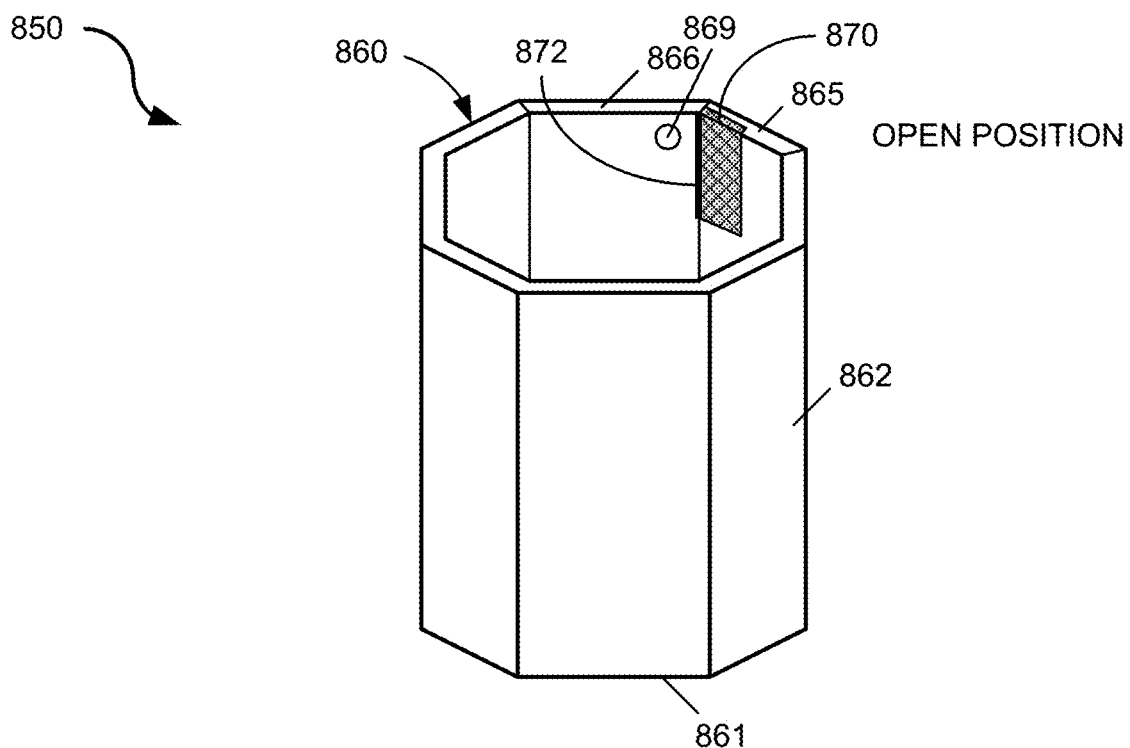
FIGS. 8C and 8D show an example embodiment of a brewing canister assembly in accordance with the present technology.
Figure 8D:
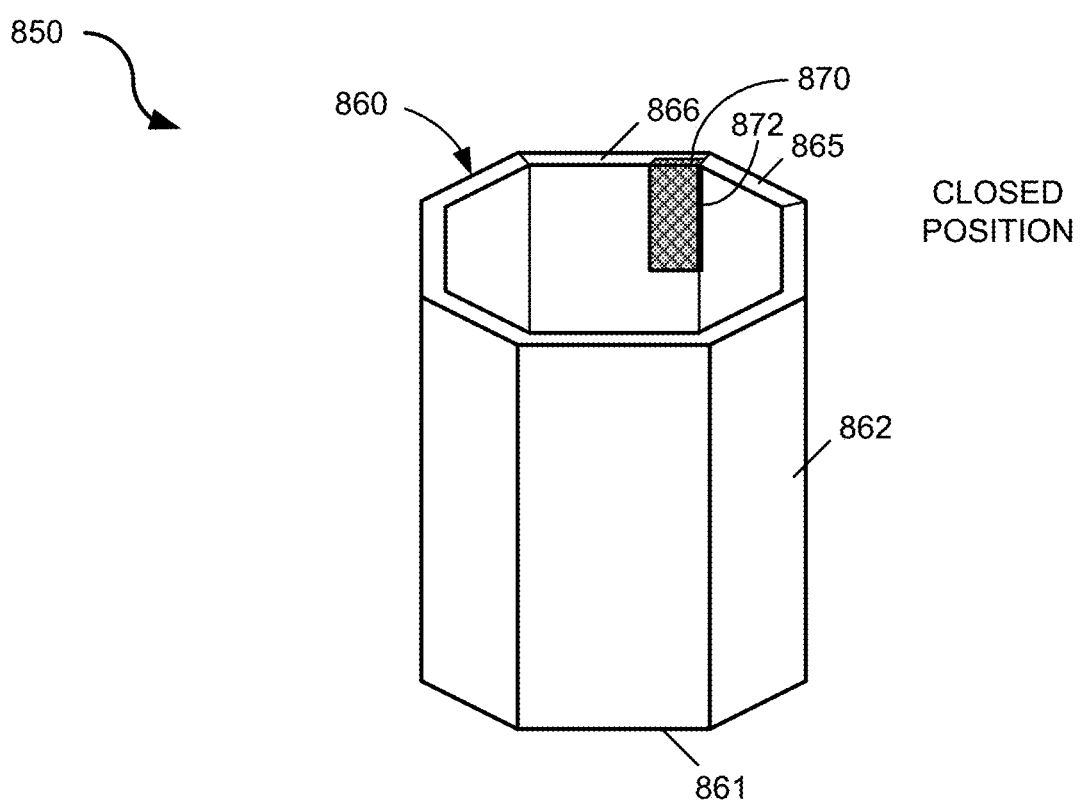

FIGS. 8C and 8D show an example embodiment of a brewing canister assembly 850 in accordance with the present technology. The brewing canister assembly 850 includes a canister frame 860 including a base 861 coupled to walls 862 that span off and surround the base 861. The base 861 and the walls 862 form an interior region 863 providing a brewing chamber. One or more of the walls 862 includes a first wall region 866 and a second wall region 865 adjoining the first wall region 866. The first wall region 866 is structured to include one or more openings 869, e.g., hole(s), that passes through the first wall region 866 between the exterior of the canister and the interior region 863. In some implementations, the first wall region 866 can include an indent or recession on the portion of the first wall region 866 that presents the one or more openings 869. The brewing canister assembly 800 includes a door component 870 and a hinge 872 that couples the door component 870 at the interface between the first and second wall regions 866 and 865, and that allows the door component 870 to move (e.g., rotate) between an open position and a closed position of the brewing canister assembly 850. For example, the door component 870 is configured to move between the second wall region 865 (in the open position) and the first wall region 866 (the open position), in which the door component 870 is able to obstruct the one or more openings 869 of the first wall region 866 when positioned against the first wall region 866. For example, the door component 870 and one or more openings 869 can be configured along any vertical position of the second wall region 865 and first wall region 866, respectively. The brewing canister assembly 850 includes an actuator operable to modulate movement of the door component 870 between an open position that exposes the one or more openings 869 (shown in FIG. 8C) and a closed position that blocks the one or more openings 869 (shown in FIG. 8D), such that fluid located outside the brewing canister assembly 850 is able to flow in and out of the brewing chamber (interior region 863) when in the open position and is unable to flow in and out of the brewing chamber when in the closed position. In implementations, for example, the brewing canister assembly 850 is operable to contain a brewing material in the brewing chamber and regulate fluid flow in and out of the canister frame to brew the brewing material.

Figure 9A:
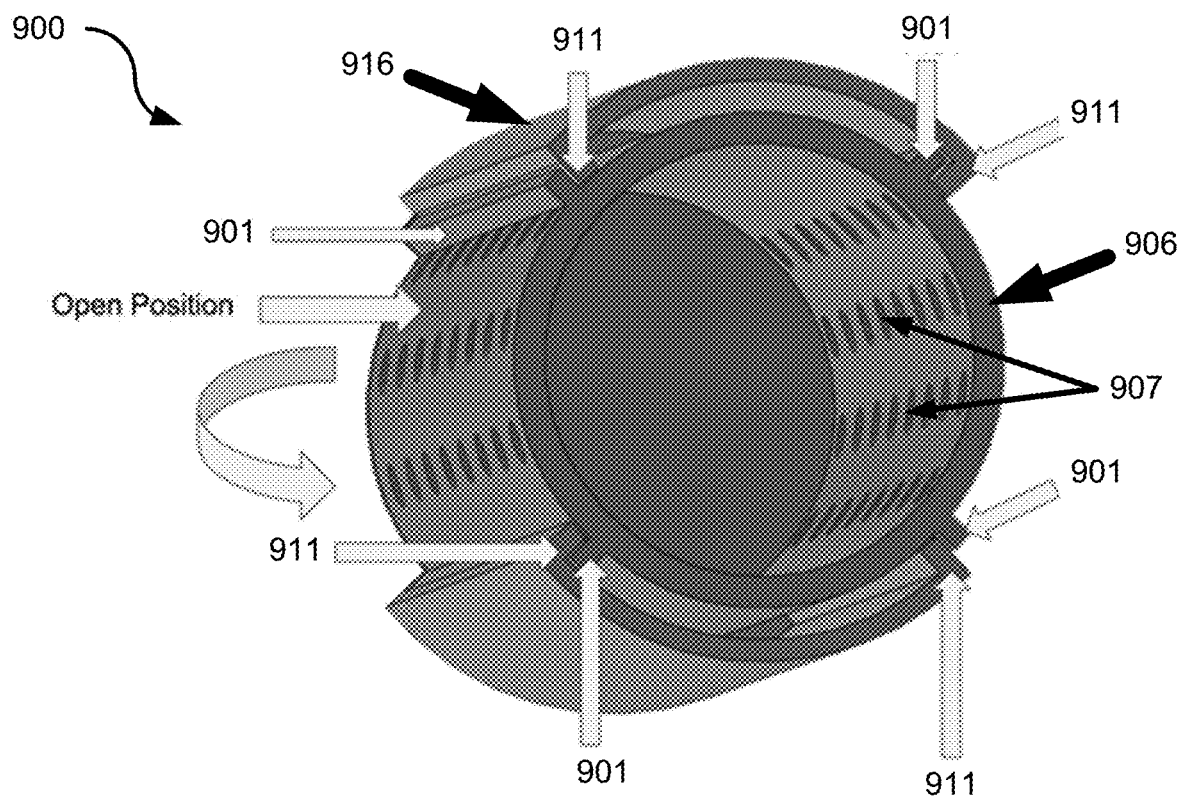
FIGS. 9A-9C show an example embodiment of a brewing canister assembly in accordance with the present technology that is controllable with an electromagnetic system as the actuator.
Figure 9B:
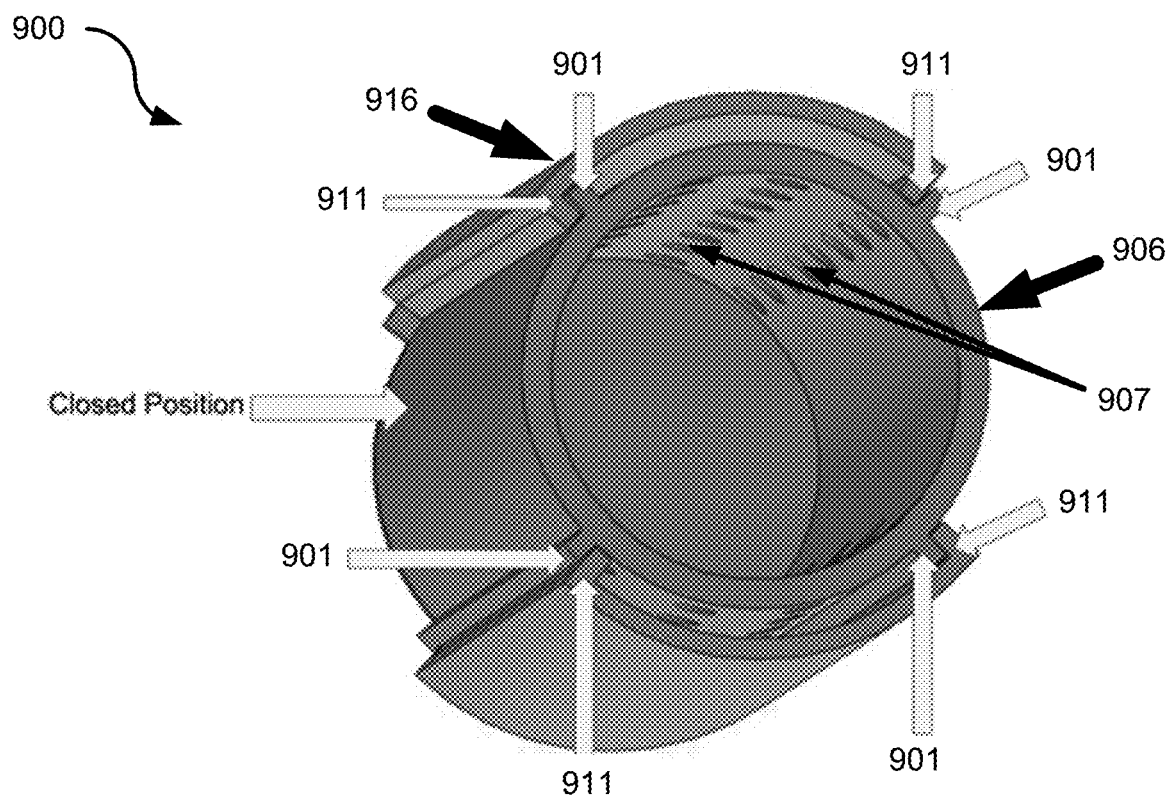
Figure 9C:
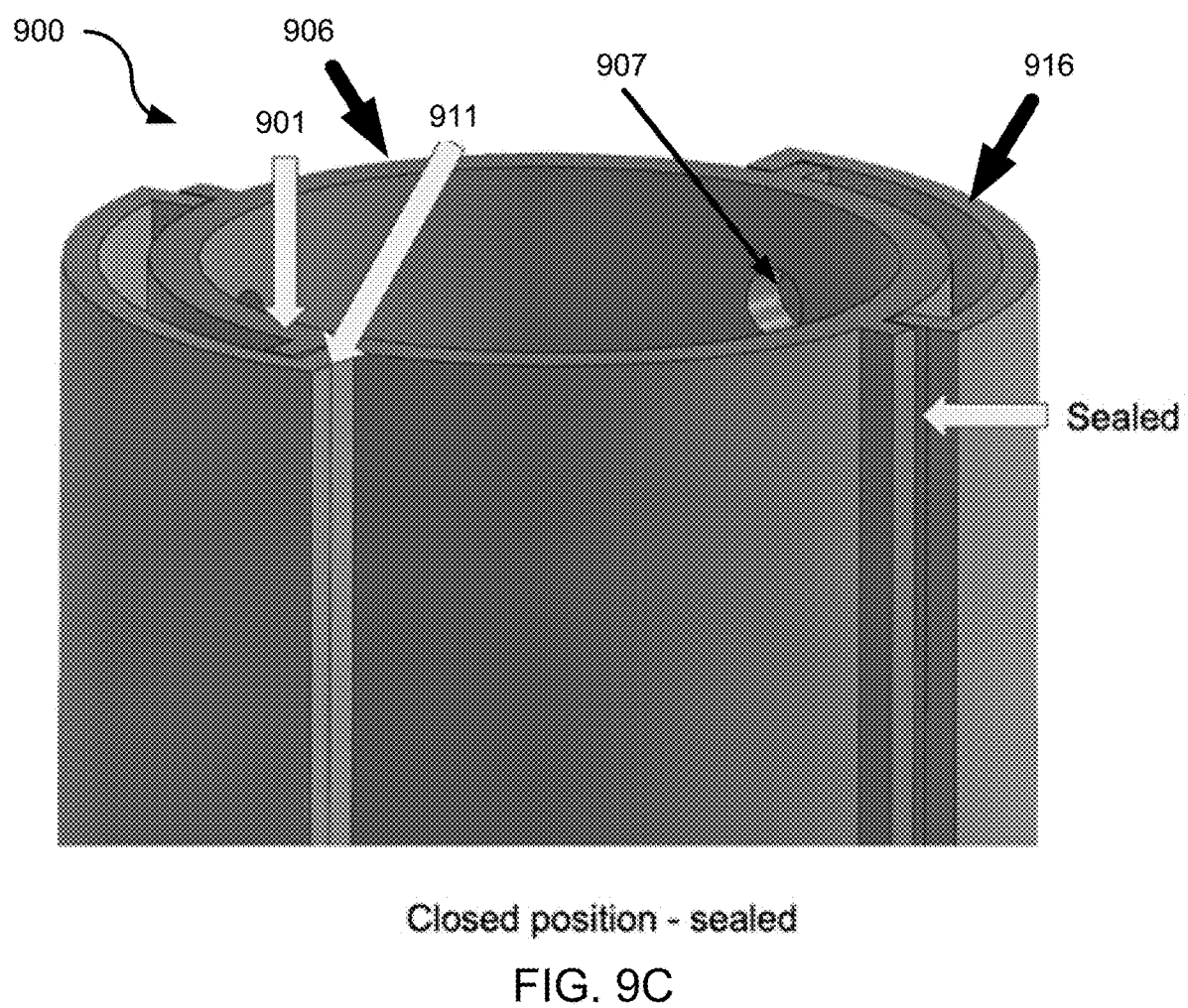

FIGS. 9A-9C show an example embodiment of a brewing canister assembly 900 in accordance with the present technology that is controllable with an electromagnetic system as the actuator. The brewing canister assembly 900 includes a canister 906 including at least two protruding parts 901 that comprise magnets. In the example shown in FIGS. 9A-9C, the canister 906 includes four protruding parts 901 that comprise the magnets that are magnetized. These protruding parts 901 of the canister 906 are positioned to be able to fit with an outside wall 916 that includes at least two protruding parts 911 comprising magnets. The outside wall 916 is able to rotate along the exterior of the canister 906 to a point in which the protruding parts 911 on the outside wall, which can be made up of electromagnets, can meet with the magnets of the protruding parts 901, e.g., preventing the canister 906 from moving further in that one direction. The canister 906 can then be positioned in the opposite rotation in order for the protruding parts 901 to meet the other side of the protruding parts 911 of the outside wall 906. For example, by having both the protruding parts 901 and 911 meet, the canister 906 and outside wall 916 can press up against one another in order to seal holes 907 along the canister. For example, in some embodiments, both sides of the canister 906 and wall 916 can have a material such as silicon or Teflon® in order to help with the seal.

With this example electromagnetic system, the position of the canister 906 can be controlled such that an electrical signal can change to cause the electromagnetic system to turn on and off the magnetization. With this type of system, one side of the magnet can be turned on such that the magnet on the canister 906 inside the two protruding parts 911 of the outside wall 916 will be attracted to one side and rotate to that position. Additionally, for example, the same magnet turned on, which could be in the closed position, could then be turned off and the opposite sides could be turned on such that it will rotate to the open position. In some embodiments, for example, instead of the magnets in the protruding parts 911 of the outside wall 916, the magnets could be positioned along an array in the wall and the electrical signals could be applied to change the positions from open and closed by turning on and off the sections in the wall in a pattern that will pull it to the opposite side. This type of example electromagnetic system to actuate modulate between open and closed positions provides a variety of benefits, for example, including but not limited to tailoring the magnetic strength in order to overcome any friction without proportionally increase the space needed to actuate, having a strong and constant force between the magnets that will aid in sealing, and ability to implement different designs with additional benefits. As shown in FIG. 9B, the brewing canister assembly 900 in the closed position, whereas the brewing canister assembly 900 is the open position in FIG. 9A. FIG. 9C illustrates the direct connection between the protruding parts 901 and 911 that form the seal.

Figure 9D:
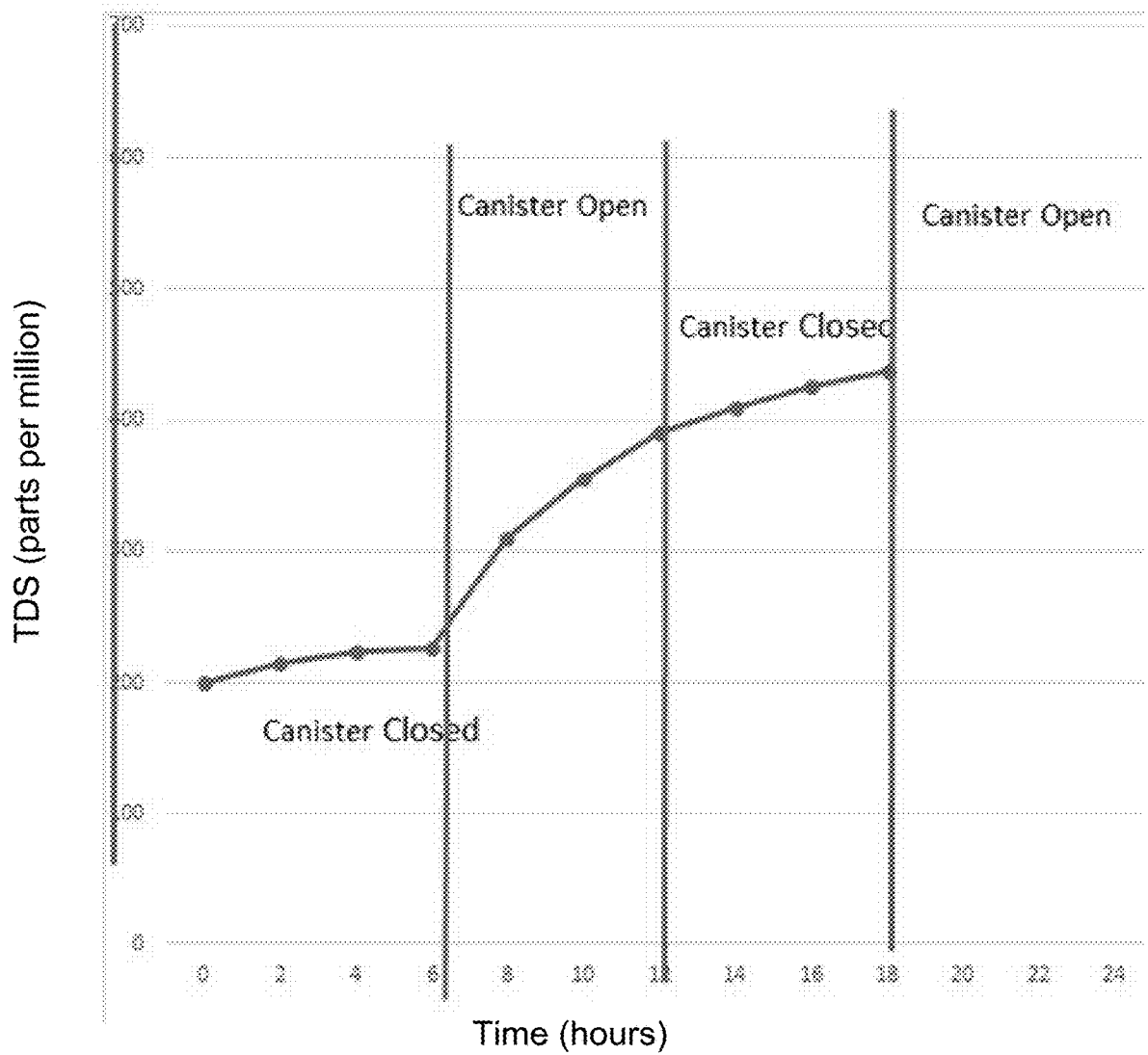
FIG. 9D shows a data plot for an example implementation using the example brewing canister assembly to measure brewing parameters over time.

FIG. 9D shows a data plot for an example implementation using the example brewing canister assembly 900 to measure brewing parameters over time. The data plot shows a brewing parameter TDS (total dissolved solids) associated with extraction of coffee, tea, etc. for an example coffee brewing material placed in the brewing canister assembly 900, with water poured to the chamber outside of the canister, in which TDS was measured for the fluid. The example data plot demonstrates that the example brewing canister assembly 900 was effective at keeping the TDS relatively constant over several hours (e.g., ~6 hr) when the canister was closed, and allowing brewing over a period when the canister was open (e.g., b/w ~6 hr to ~12 hr), and preventing further brewing upon closing (e.g., b/w ~12 hr to ~18 hr).

Example Embodiments of Brewing Pod Systems

In some embodiments of the portable brewing device 110, the brewing canister includes a specialized pod holding system in accordance with the present technology, e.g., for coffee pods, tea pods, or pods for other brewing materials.

Brewing beverages such as coffee or tea can be a cumbersome process due to the small size of the brewing material as well as the wetting of the material. As such, it can be beneficial to provide an article or mechanism in which the brewing material can be easily removed, such as a pod system described herein.

For example, current pods for coffee and/or tea are designed for a fast flow of fluid running through the beverage material. Typical pods are not designed for a French press style of brewing. In a small brewing system, where space is limited, the beverage material and fluid should be close to one another and not require the need for funnel of fluid from one place to another. The example portable brewing devices include a brewing canister that resides next to the fluid and have control over when water can flow in and out. For this type of system, the way in which coffee brews is similar to the French press style where coffee grinds will be submerged in water and slowly brew, but with control of fluid flow and brewing parameters. For example, to produce a high quality brew from a slow brew style, the coffee should be consistency diffused within entire fluid or more importantly, brewed slowly by controlled fluid movement. This prevents the typical pod design from doing a French press style brewing properly. In a portable system, like disclosed herein, the grinds are limited to the area of the canister and therefore, the need to control the movement of water becomes crucial as fluid will need to pass through the grinds to extract the compounds for the entire fluid but not quickly. Essentially, it is important to account for maximizing the time fluid stays in the coffee grinds but is immediately removed. With current cylindrical pod designs, the fluid may move quickly in and out of the grinds since it is symmetrical and there are no passageways that reduce the flow on one side. In some multi-canister designs, the canisters are cylindrical in order to rotate to properly open and seal it for the intended benefit. Therefore, in order to provide further control of the brewing, a unique pod design is disclosed.

In some example embodiments, a pod system for a portable beverage brewing platform includes a mechanism in which a pod is inserted into a removable canister that is then inserted into an outer container, such that the beverage material held in the pod will be controllably exposed and sealed from fluid in the environment outside the brewing canister. In other brewing canister assembly embodiments, for example, such as a one canister design, the pod is inserted into the canister such that the beverage material held in the pod will be controllably exposed and sealed from fluid in the environment outside the brewing canister with ideal extraction mechanisms. This pod can be shaped and designed with materials including but not limited to biodegradable mesh filters from plant material or bamboo, to synthetic materials such as food grade space bioplastics. The example pod systems disclosed allow a canister assembly's available space to be tailored to the desired flow which can be tailored for each specific type of beverage without sacrificing the canister assembly's ability to controllably and reliably open and seal from the surrounding fluid.

Figure 10:
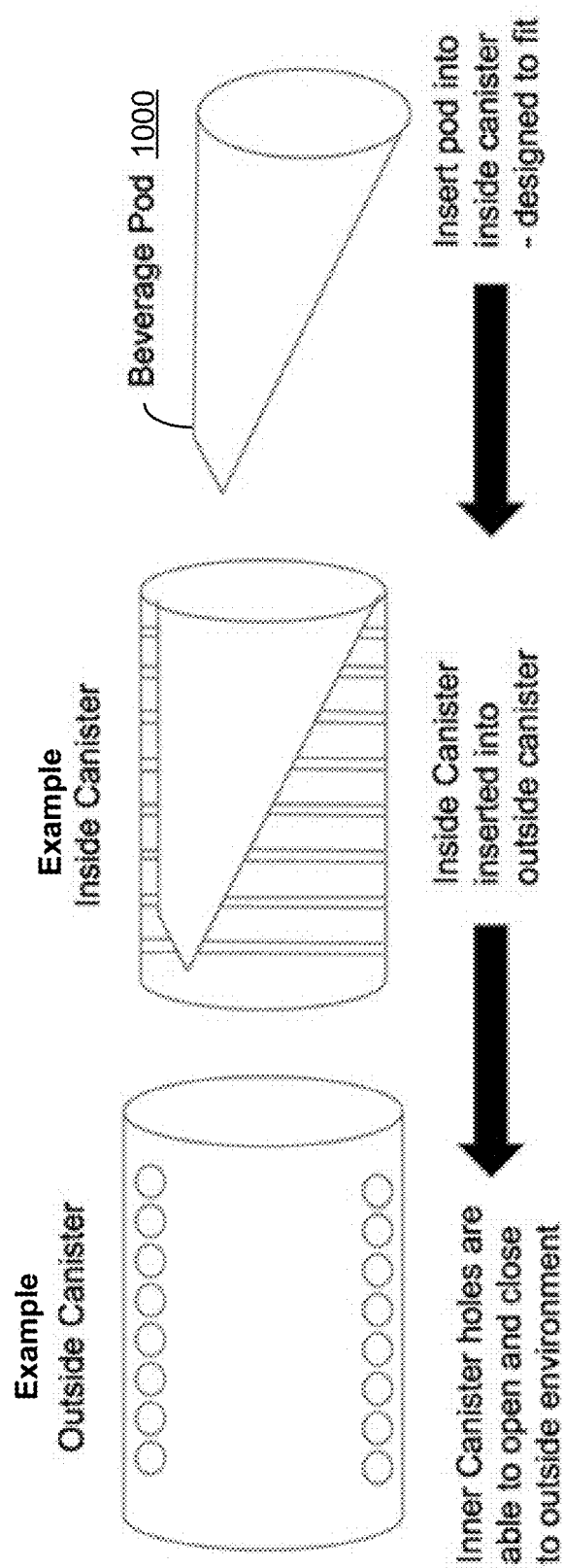
FIG. 10 shows a diagram of an example beverage pod holding system in accordance with the present technology.

FIG. 10 shows a diagram of an example beverage pod holding system in accordance with the present technology. The beverage pod holding system includes a pod 1000 to contain a brewable material during a brewing process, e.g., in a brewing canister such as in the portable brewing device 100 or other brewing devices. The pod 1000 includes a pod structure to contain the brewing material and having a shape to fit into an interior region of a brewing canister. The pod structure of the pod 1000 includes a porous material allowing fluid to contact the brewing material and extract constituents of the brewing material for a brewed beverage. In some implementations of the pod 1000, the pod structure includes an interior region that facilitates expansion of the brewing material upon exposure to the fluid during brewing.

In some implementations of the pod 1000, for example, pod 1000 is shaped in a cone style fashion in order to properly hold the material, which, due to the shape the pod, the holes in the canister are extended to the space as it increases in height. Having an inward reduction in width, for example, the cone shape of the pod allows the beverage brewing material to have higher surface area exposure due to the walls not allowing the material to fall lower due to gravity compared to a cylindrical design which would have even width throughout.

One of the pre-brewing parameters, the shape of the pod and the shape of the brewing canister assembly is one example of a way to develop benefits for the consumers that has interactions mentioned above with retailers. For example, the shape of the pod in connection with the shape of the available space in the canister (which can be removable) provides various benefits, e.g., including being able to shape it to apply an appropriate amount of pressure and leave the proper open space for the particular type of beverage material. For instance, without a pod that fits properly in the canister well, it may change the flow of water, and thereby altering the brewing process, which can ultimately change the concentration of compounds and expected flavors to be tasted and enjoyed by the user. For example, for tea, because it is dried and expands when exposed to hot fluid, tea material needs room between the dried leaves in order to expand. If one were to place a pod that does not fit properly into the canister, it may have to be reoriented such that it would change the available space and pack the material denser. As an example, if a cylindrical pod were placed in a cone shaped canister, it would have to be jammed into the thinner areas of the cone shape which would put pressure on the material and possibly not fit at all. The pod 1000 can be designed such that it holds the integrity of the pod shape during the brewing process in the canister.

As depicted in FIG. 10, the pod 1000 is placed in the available space in the brewing canister (e.g., which can be closed with a bottom lid not shown). In the example shown in FIG. 10, the brewing canister includes an inner canister and an outer canister. The inner canister, having the pod 10000 placed therein, is inserted into the outer canister to create a complete brewing canister assembly. This example design in which the available space in the inner canister is not the same shape as the outer most shape of the inner canister allows more time for the fluid to extract as it sits in the beverage material and moves to the opposite side where the natural flow helps it be released to the side that has smaller hole passageways. This example can affect a specific type of fluid mechanics that can be ideal for specific types of beverages, which is realized based on tailoring the shape and/or other attributes of the pod 1000 to affect the fluid mechanics for brewing beverages to desired conditions, such as flavor.

Example Embodiments of Brewing Pod Maker Systems

In some example implementations of the system 100, a brewing material vendor and/or a user can utilize various example embodiments of a pod maker in accordance with the present technology for making pods of the brewable material, and which is modular to adapt to their needs.

In some embodiments, a beverage pod maker includes a first container to hold a beverage material; a beverage pod material attachable to a bottom region of the first container and structured to include an opening aligned with the first container to allow the beverage material to enter therein; and a pod closure mechanism configured to seal the opening of the beverage pod material after the beverage material enters the beverage pod material from the first container. In some embodiments, a beverage pod maker includes a beverage material chamber; a pod material holder; and a pod closure mechanism configured to seal the pod material together after the beverage material in the beverage material chamber is placed in the pod material. In some embodiments, a beverage pod maker includes a beverage material chamber; a beverage material grinder positioned in the beverage material chamber; a pod material holder; and a pod closure mechanism configured to seal the pod material together after the beverage material in the beverage material chamber is ground and placed in the pod material.

Figure 11A:
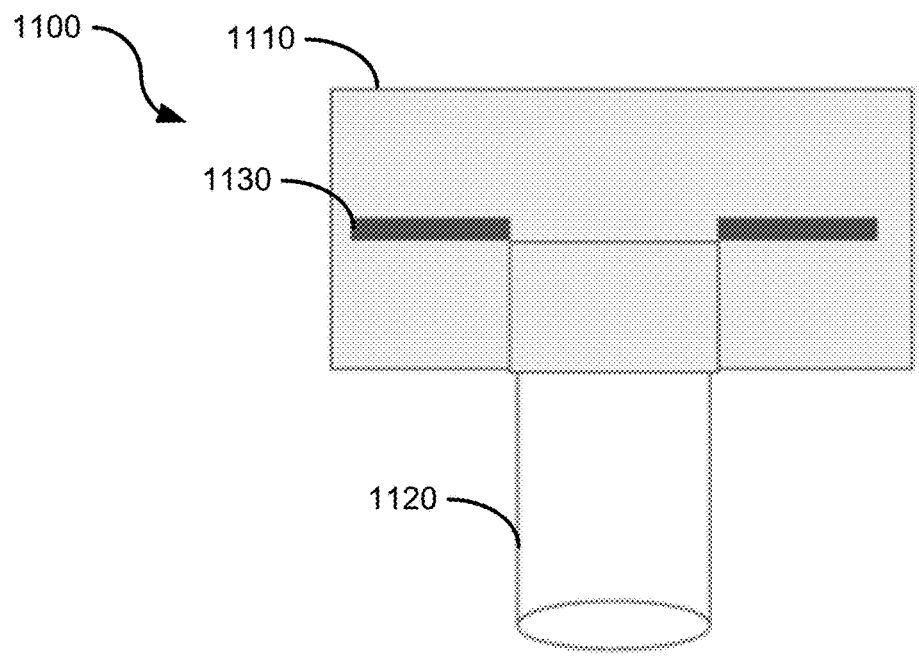
FIGS. 11A and 11B show diagrams of an example embodiment of a beverage pod maker in accordance with the present technology.
Figure 11B:
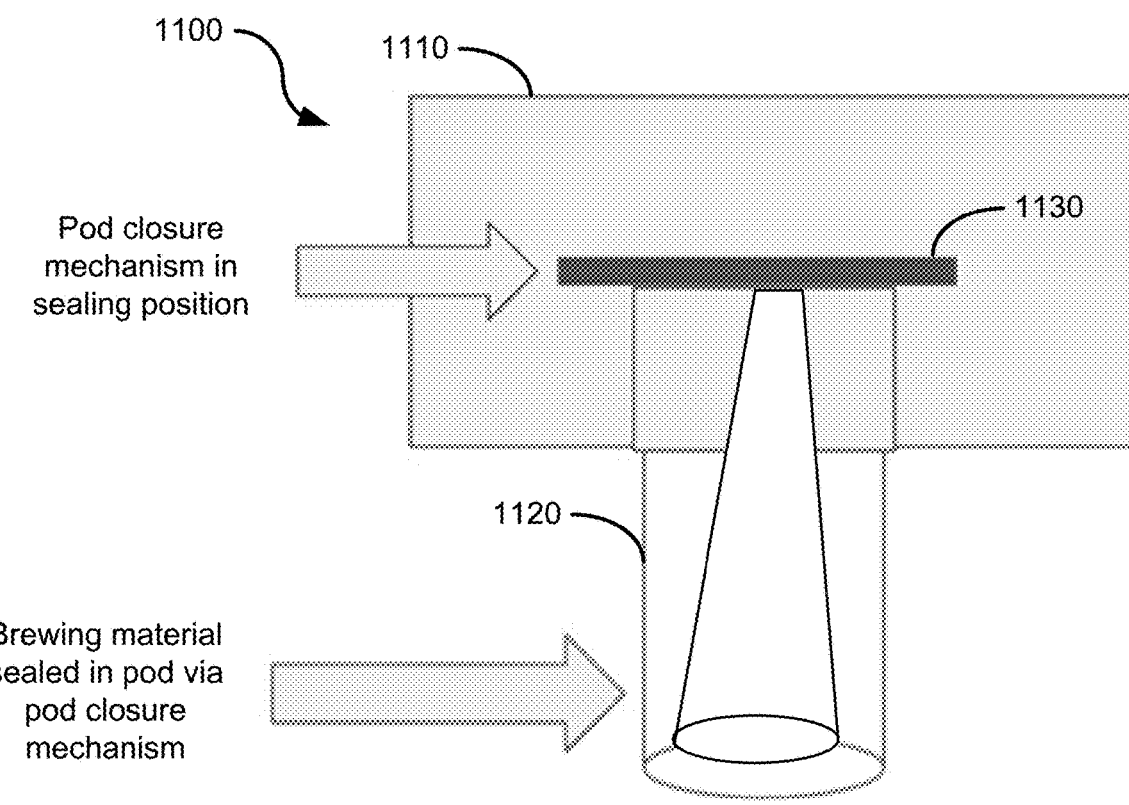

FIGS. 11A and 11B show diagrams of an example embodiment of a beverage pod maker 1100. The diagrams of FIGS. 11A and 11B also depict how a pod can be inserted and held into the pod maker and the pod closures in the open position, and how the pod closures come together in order to press the top of the pod material together, which can then be sealed through the touching of binding material on the pod edges (e.g., food grade safe epoxies), through heat, or other sealing mechanisms. As shown in FIG. 11A, the beverage pod maker 1100 includes a beverage material chamber 1110 configured to hold beverage material (e.g., coffee grinds, tea leaves, etc.), temporarily, prior to loading into a pod. The beverage pod maker 1100 includes a pod material holder 1120 configured to hold a pod structure (e.g., pod structure of pod 1000), temporarily, prior to loading the beverage material stored in the beverage material chamber 1110 into the pod. The beverage pod maker 1100 includes a pod closure mechanism 1130 attached to the beverage material chamber 1110 and configured to seal the pod material of the pod structure together after the beverage material in the beverage material chamber 1110 is loaded in the pod. In some embodiments, the beverage pod maker 1100 includes a data processing unit, e.g., including a communication unit, operable to control features and functionality of the beverage pod maker 1100 and facilitate communication with other devices, such as the vendor client computer 140 and/or the mobile device 120, providing interfaces via the respective apps.

Figure 12:
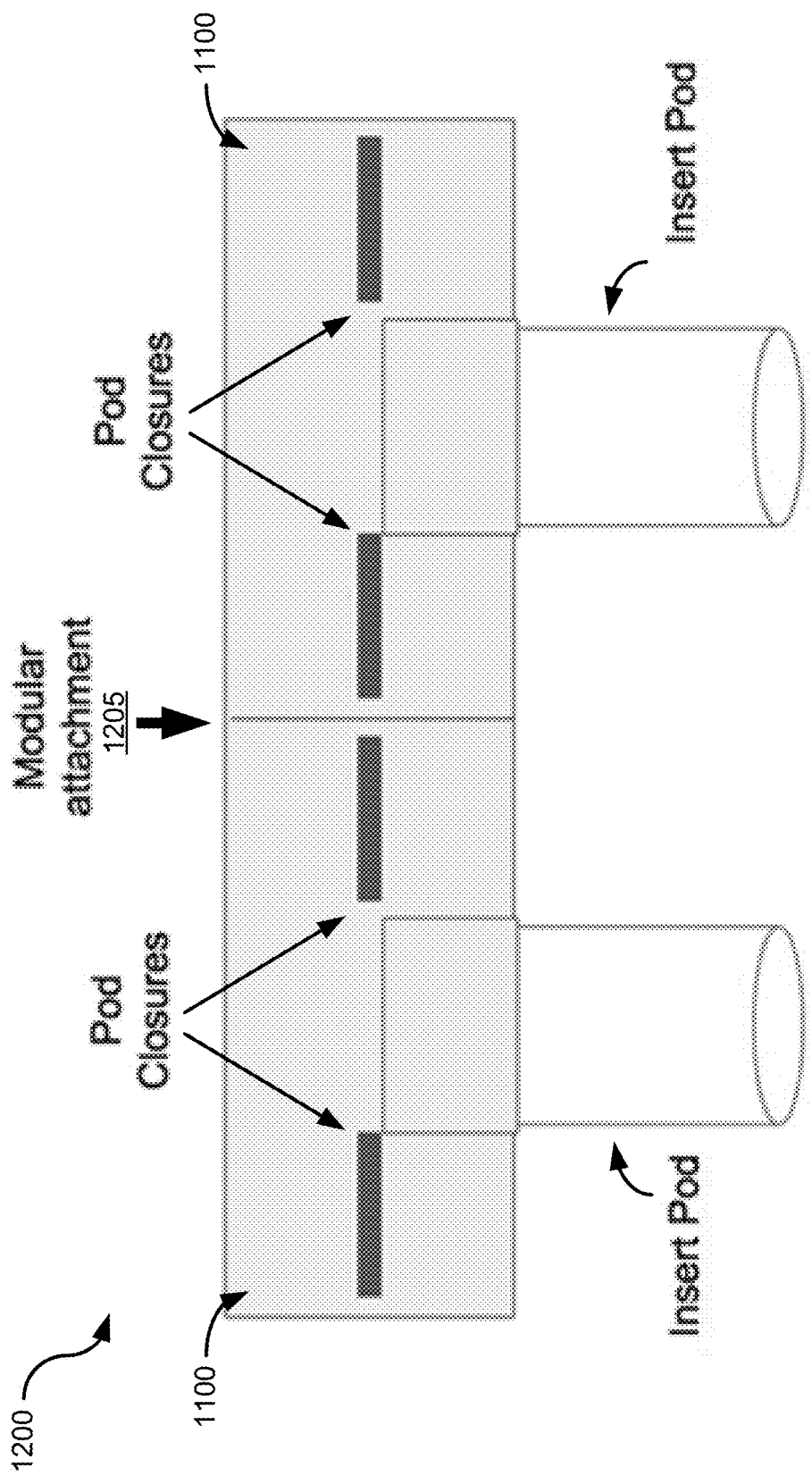
FIG. 12 shows a diagram of an example embodiment of a scalable pod maker in accordance with the present technology.

FIG. 12 shows a diagram of an example embodiment of a scalable pod maker 1200 including multiple beverage podmakers, such as the pod maker 1100, connected via a modular attachment 1205. FIG. 12 illustrates an example implementation in which multiple pod makers are modular to allow more than one pod maker to be attached in order to create a plurality of pods at the same time. The example pod makers can be used by the user of the portable brewing device 110, and by the beverage material vendors operating a beverage material manufacturing system 142 in communication with the vendor client computer 140.

Example implementations of the beverage pod maker 1100 and/or scalable pod maker 1200 are described. A beverage material vendor is able to use the pod maker 1100 that is modular to adapt to their needs, e.g., combining them to form the scalable pod maker 1200, allowing the pod maker 1200 to manage multiple beverage material production packaging of various beverage products in parallel. The scalable pod maker 1200 is connected to a shared cloud network, including the network of the system 100, which can update the vendor side of the user's product inventory (e.g., via communication from the user app on the mobile device 120 through the cloud system 130 to the vendor app on the computer 140), which can reflect available inventory which the user can interact with to order from the vendor The vendor is able to receive the order through the cloud and satisfy the order using the pod maker delivering to the user. Also, in various implementations, the beverage pod maker 1100 and/or scalable pod maker 1200 can be owned and operated by the user in their home, e.g., to package loose leaf tea and coffee grinds to customize their own pods. Various examples of benefits provided by the beverage pod maker 1100 and/or scalable pod maker 1200 are described.

For example, in an extreme case where a user only orders a one day supply, usage of the supply would trigger an automatic reorder of the supply and could be delivered in order to arrive before the next time it would be used. This type of circumstance, where the user is constantly getting shipped a new supply everyday could be satisfied with conventional subscription services, however, that is assuming that the consumption is consistent. For example, the same user may use their one pod on Monday and the device reorders immediately to get it to the user before the end of the day so they can have the next order for Tuesday. However, if the user does not use it on Tuesday but instead on Wednesday, a conventional subscription service would have provided extra product, costing the user. In contrast, the system 100 is able to know that the user used the one-day product order on Wednesday, and therefore modifies the ordering, packaging and delivery of the next order so that the user can receive enjoy a fresh supply on Thursday. Current subscription services would have delivered it every day, they would have received another pod on Wednesday therefore having two pods, a fresh one and an old one. Therefore, in a normal subscription service, the user is forced to consume in a consistent manner in order to prevent unintended consequences such as a buildup of pods that are not fresh.

This type of example can additionally be illustrated for a monthly subscription services which illustrates more in depth the additional problem of undersupply. In these batch systems, if a user were to use all of the pods before the next subscription in the normal subscription service, they would have to wait until the next shipment. Whereas, with a real time and just-in-time inventory system that can be provided by the intelligent beverage management system 100, the system 100 can monitor the number of pods used for beverage material and could reorder so the user would never go without pods and would also receive and use the freshest pods. Additionally, this type of real-time and just-in-time ordering system is important because coffee, certain teas, powders, and add-in materials can go bad very quickly and result in a decrease in quality. The interaction with the user and the retailer can allow for customization of the delivered pods include how strong the user want a specific beverage to be, where the retailer would receive this order information from the cloud and put more or less material into the pod, additionally allowing the retailer to properly charge. Additionally, due to the customization of the beverage brewing device to change the brew temperature, time, and other factors, the retailer can provide the data or protocol accessible to the user for how the retailer believes the specific beverage material should be brewed. Currently, retailers do not have this type of control for their preferences; for example, existing single serve pod brewing machines are one size fits all models that do not allow customization primarily due to their inability to significantly alter their protocols to make a difference in the brewed flavors and concentrations.

Beverages such as coffee and tea can have unique flavor profiles depending on many factors including growth conditions and the source of the beans. For example, coffee can have different acidity levels, different fruit accents, such as peach or strawberries, and other flavors, such as chocolate and earthy. Due to the variety in flavor profiles, different individuals have different flavor accents that they prefer and therefore by collecting data on their favorite beverages along with the flavor profiles as well as questions about their accent flavors, a smart experience can be created by the system 100 that learns from this data and sorts through the available inventory profiles for beverages the user has a high probability of appreciating. The system 100 can interact with the consumer and the retailer in order provide them with a set of different retailers and beverages that have that taste profile as well as allow the retailers to find and advertise to their ideal customers based on these beverages.

Additionally, in some implementations, the system 100 can provide a blind taste test system and method to evaluate various aspects of the user's preferences as well as provide feedback to the product vendors that they may use to improve products and services. The example blind taste test system can include a specialized product management, managed by the system 100, in which the user would not be given the name of the company or the flavor profiles until after they have rated the beverages associated with provided beverage products. This type of ordering system can allow the user to pick their favorite beverage without introducing bias about the quality or flavors due to the limited data. The user would be able to know information that could identify the beverage such as a number that can be input into the app on their smartphone or other device to send the brewing instructions that the retailers prefers to brew at. Then, the user would be able to rate the different kinds, and if they really enjoyed one, they can ask the system to give them the type of beverage, brand, how much it is, and other relevant information. For example, in this way, the user is able to find new kinds beverages from retailers that they may not have typically found because the user has been able to try these beverages without any bias information, such as brand name or other information that could alter the way they perceive the beverage. Implementations of the blind taste test can provide an opportunity for the retailers to be connected with their ideal customers and given a better opportunity to get their beverage chosen when compared to other retailers that could introduce these bias. Additionally, this interaction could be further gamified by the system 100, such that the user would not know the flavors of the beverage and given opportunities to guess them to receive a reward such as points that can be redeemed for benefits including discounts. Additionally, for example, this blind taste test allows small retailers to bid to include their beverage in the packages where they believe they find a loyal customer which increases their customer lifetime value and reduces their cost of acquisition which may not have been possible to attain through typical channels.

Various implementations using the example user interface of the user app, users can optionally interact with others through social integration where they can share beverages, brewing protocols, and reviews with a network which could consist of friends and celebrities. This creates additional benefits where users can see reviews from their social connections and explore new retailers and beverages.

Implementations of the system 100 creates an ecosystem where a new standard of beverage brewing and consumption and product production, packaging, distribution and sharing can emerge. Such an ecosystem can maximize benefits for both consumers and retailers, but requires facilitated and reliable interactions between consumer's and vendor's devices, media, and individuals/organizations. With these combined interactions, new experiences and benefits are able to be achieve that would not have otherwise been able to achieve.

Figure 13:
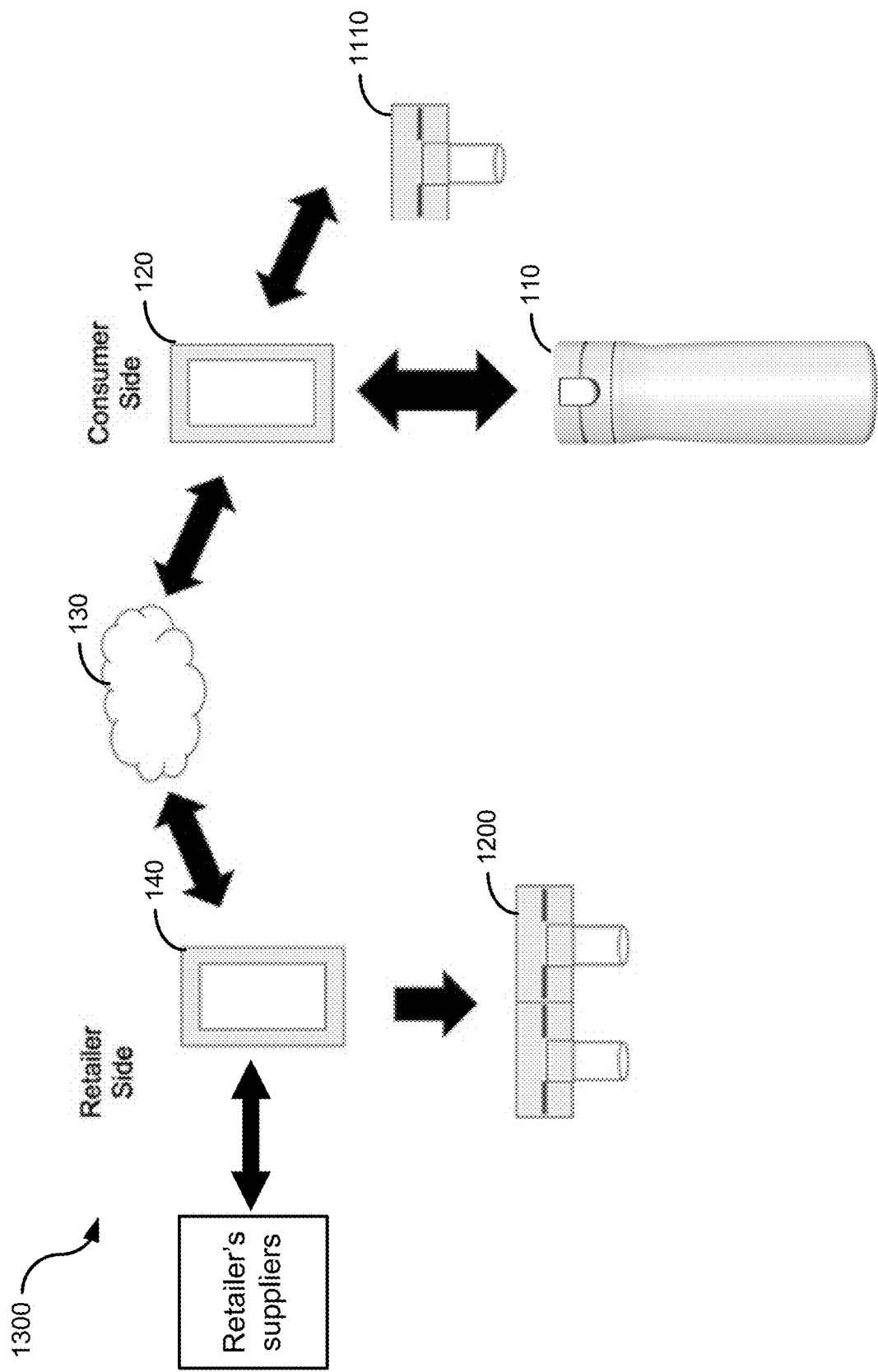
FIG. 13 shows a diagram of an example ecosystem facilitated by an intelligent beverage management system in accordance with the present technology.

FIG. 13 shows a diagram of an example ecosystem 1300 facilitated by the intelligent beverage management system 100 in accordance with the present technology. The diagram of the ecosystem 1300 depicts various interactions between the different devices, media, and individuals/organizations for beverage production and consumption that enable otherwise unattainable experiences and relationships. FIG. 13 illustrates how any sized beverage material retailer can adopt the scalable pod maker 1200 to make their own pods of beverage materials. For example, the retailers are they able to connect to the cloud system 130 that effectively enables an interaction to the consumer/user through the use of the app on the mobile device 120 which is in communication with the portable brewing device 110. For example, the portable brewing device 110 is able to be controlled via the app of the mobile device 120 which can then pass along instructions and information to all aspects of the interface. Similarly, the vendor client computer 140 includes a vendor app that is able to receive and send instructions and information with the cloud system 130, which can be produced via information provided from the consumer (app of mobile device 120 and/or portable brewing device 110). The vendor client computer 140 can thereby automatically modify production parameters of the scalable pod maker 1200, which can be generated and/or recommended by the cloud system 130. For example, a user is able to explore the beverages from various retailers to order the coffee, tea, or other beverage through the store user interface of the app. This can be used for on demand purchases to be delivered directly to the user, or for subscription services. The consumer is able to save data including payment information on their profile in order to be able to seamlessly purchase from the retailers as well as their preferences which can then interact with the portable brewing device 110. These types of interactions provide various benefits, e.g., including but not limited to real-time inventory system, collecting data on consumer preferences and offering smart and tailored suggestions, smart subscription service, blind taste test ordering systems, beverage and retailer specific brewing instructions, social interactions, and smart notifications.

Example Embodiments of Portable Brewing Devices

Some example embodiments of the portable brewing device 110, including the modular brewing subsystems and components of the portable brewing device 110, in accordance with the present technology are described below.

Figure 14A:
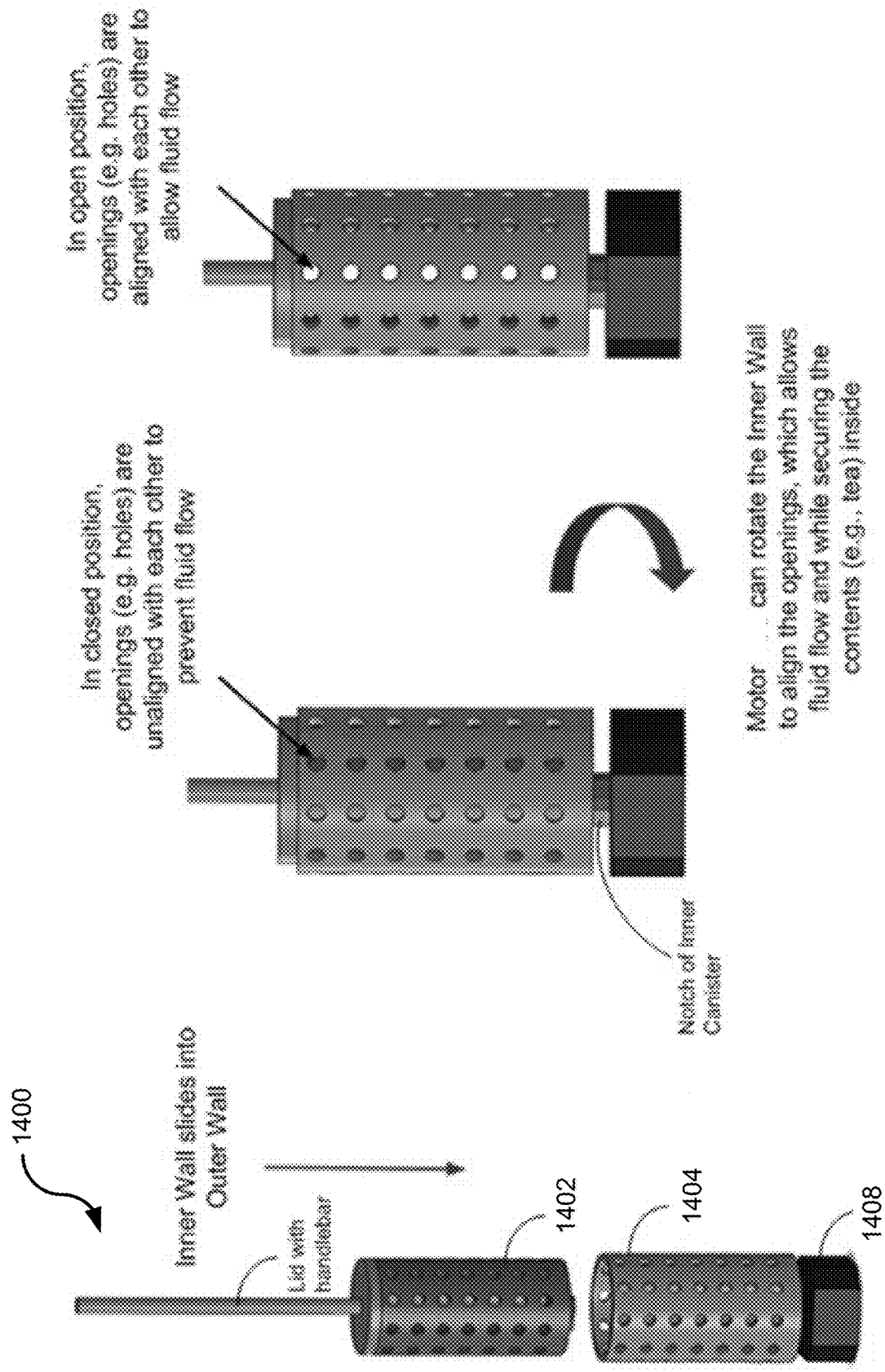
FIGS. 14A-14E show diagrams of example embodiments of a brewing canister assembly in accordance with the disclosed technology.

FIG. 14A shows a diagram of an example embodiment of a brewing canister assembly 1400 in accordance with the disclosed technology, e.g., an example embodiment of the brewing canister assembly 115. The brewing canister assembly 1400 includes an inner canister 1402 and an outer canister 1404, and an actuator 1408 (e.g., a motor) to cause movement of one or both of the inner canister 1402 and the outer canister 1404. The example of FIG. 14A shows an optional lid, e.g., with an optional handle bar, that can couple to the inner canister 1402. The inner canister 1402 can fit inside the outer canister 1404, e.g., which can be removed and inserted via the optional lid of the inner canister 1402 by the optional handlebar that can be attached and detached from the lid (e.g., screwed/unscrewed, magnet, etc.). In some examples, the bottom of the inner chamber includes a protruding notch that passes through a hole at the bottom of the outer chamber, where the bottoms of both chambers contact each other and prevent fluid and/or the contents of the brewing canister assembly 1400 from escaping. The protruding notch of the inner canister 1402 is coupled with the actuator 1408, e.g., motor, such that the motor can rotate the inner canister 1402 with respect to the outer canister 1404. For example, the motor can include a coupling that leads into the interior chamber of the portable brewing device 110 and couples with the protruding notch of the inner canister 1402, e.g., such that the interface of the interior chamber and the coupling of the motor are fluidically sealed to prevent fluid from leaking out. As shown in the diagram of FIG. 14A, when the brewing canister assembly 1400 is in the closed position, the openings (e.g., holes) are unaligned with each other to prevent fluid flow; and when the brewing canister assembly 1400 is in the open position, the openings (e.g., holes) are aligned with each other to allow fluid to flow. In some implementations, for example, the brewing canister assembly 1400 can include an interior membrane with pores that fits into the inner canister wall to allow the fluid to pass while preventing solid objects (e.g., loose tea leaves or coffee grinds) to pass through. In some implementations of the brewing canister assembly 1400, for example, the inner canister 1402 may include a clip or inner compartment or shelf to secure a pod of the beverage material.

Figure 14B:
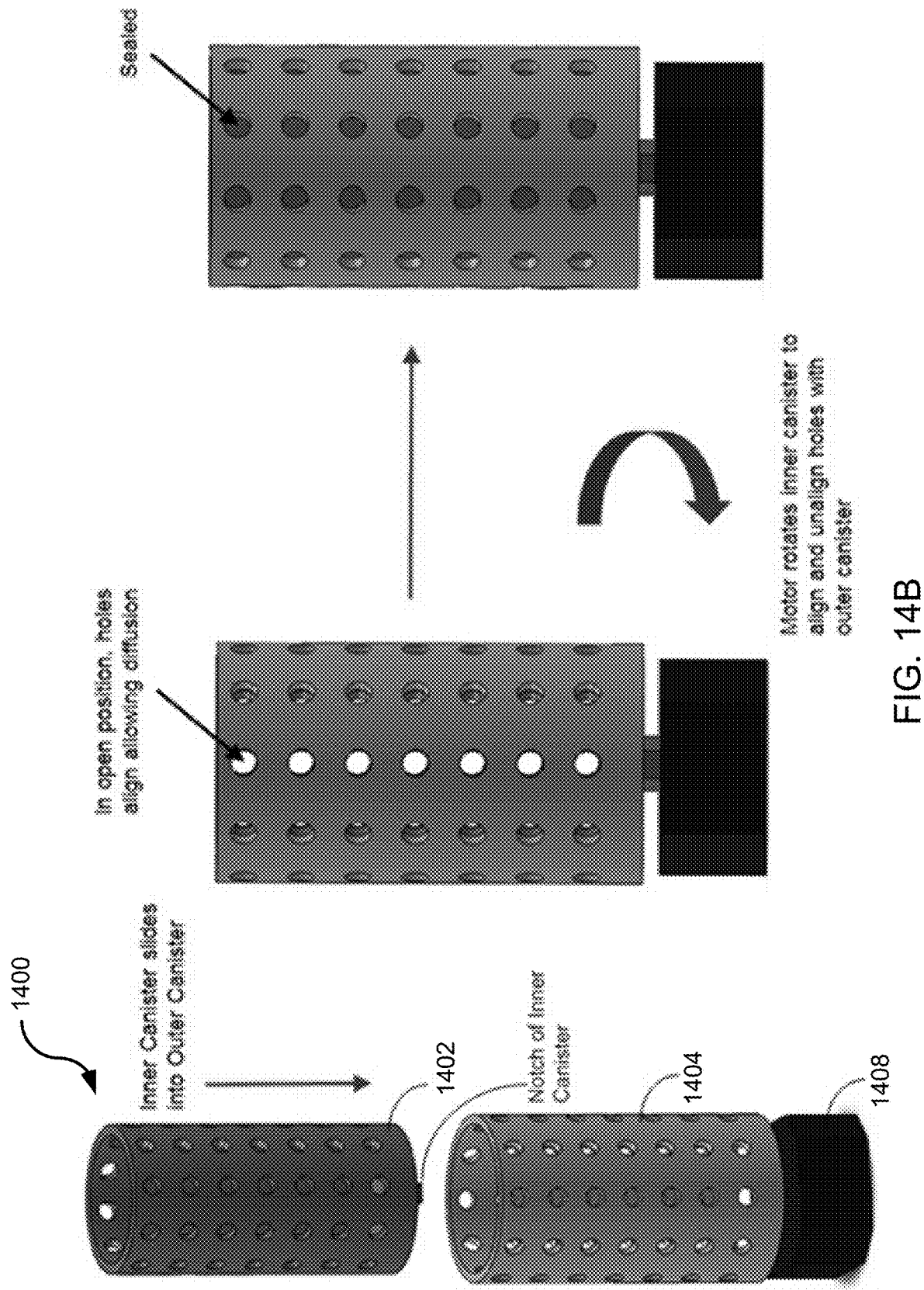

FIG. 14B shows a diagram of the example brewing canister assembly 1400, which shown the brewing canister assembly 1400 without the optional lid and optional handlebar.

Figure 14C:
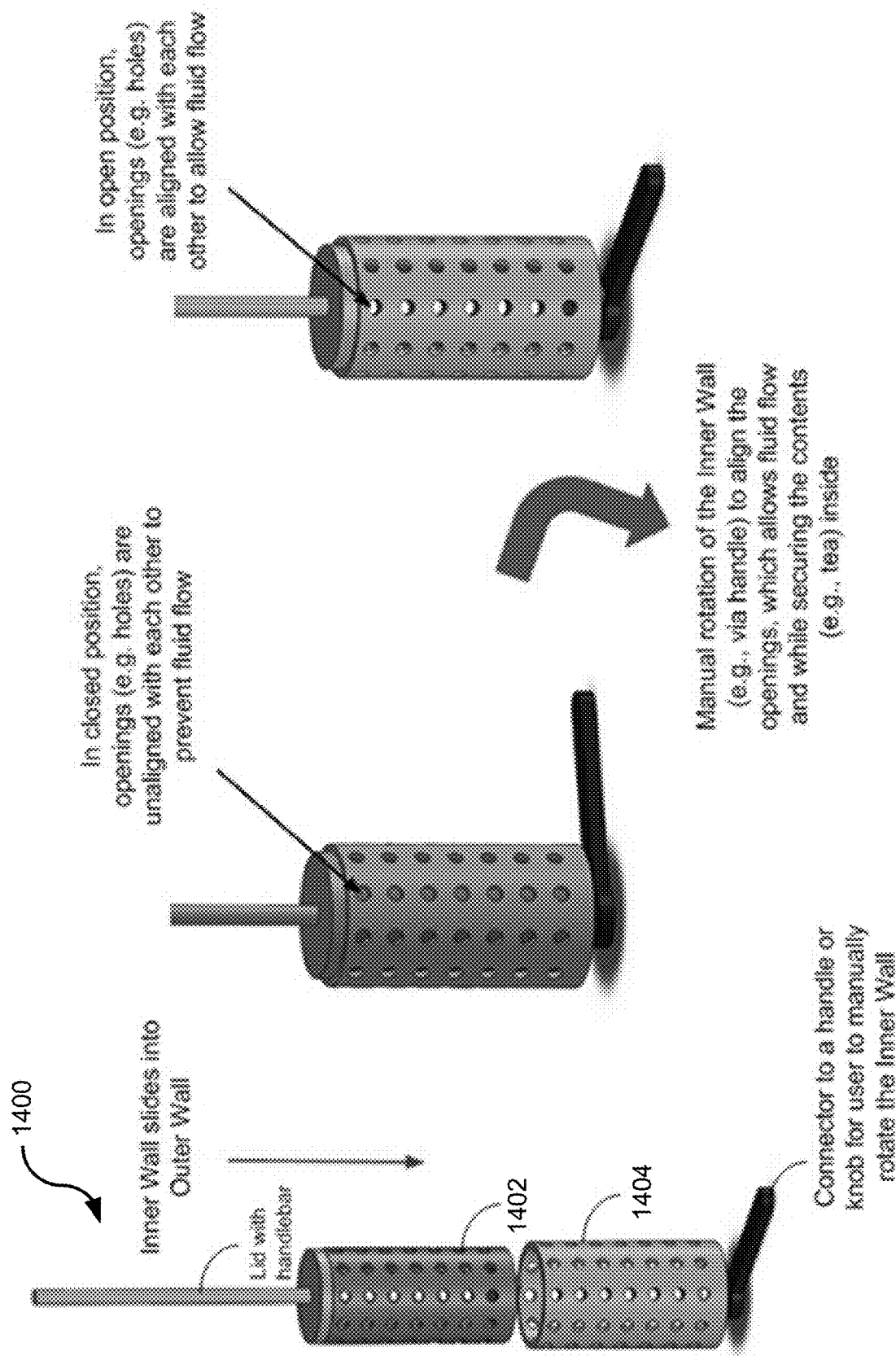

FIG. 14C shows a diagram of the example brewing canister assembly 1400, which shows how the inner and outer canisters 1402 and 1404 can be configured for opening or closing by manually using a handle, lever, knob or other component to manually actuate the brewing canister assembly 1400, e.g., rotate the inner canister.

Figure 14D:
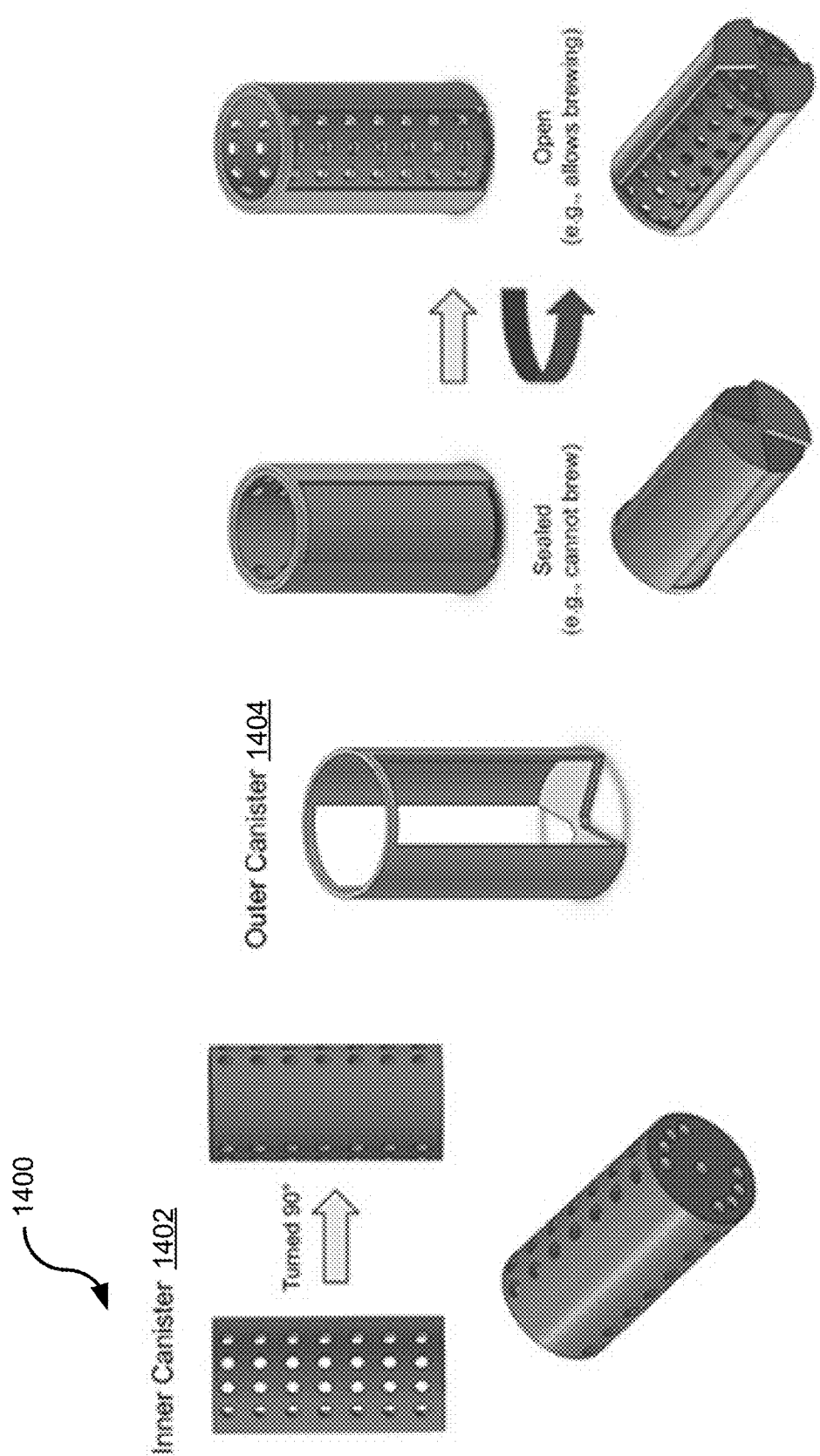

FIG. 14D shows a diagram of the example brewing canister assembly 1400 depicting various embodiments of the inner canister 1402 and 1404. For example, the inner canister 1402 is perforated with holes on two sides and is insertable into the outer canister 1404 that includes large openings or slots. The inner canister 1402 can turn, and the holes can be positioned to the solid sides of the outer canister 1404, thereby allowing closing to fluid. The inner canister 1402 can turn, and the holes can be positioned to the open slots of the outer canister 1404, thereby allowing opening to the fluid. This example of the canisters of the brewing canister assembly 1400 can be operated to control starting and stopping of brewing, which can be performed with the attachment of a motor or manual lever to turn the inner and/or outer canisters 1402, 1404. In some implementations, the inner canister can also have an interior membrane with small pores to allow fluid to pass while preventing solid objects to pass through instead of the two sides that are perforated with holes, e.g., thereby leaving the inner canister with two sides that are solid and the other two having large openings similar to the outer canister. In some embodiments for the brewing canister assembly 1400, the inner canister 1402 can be removable so that it may be substituted for a disposable canister that will allow for a single serving of tea, coffee, etc.

Figure 14E:
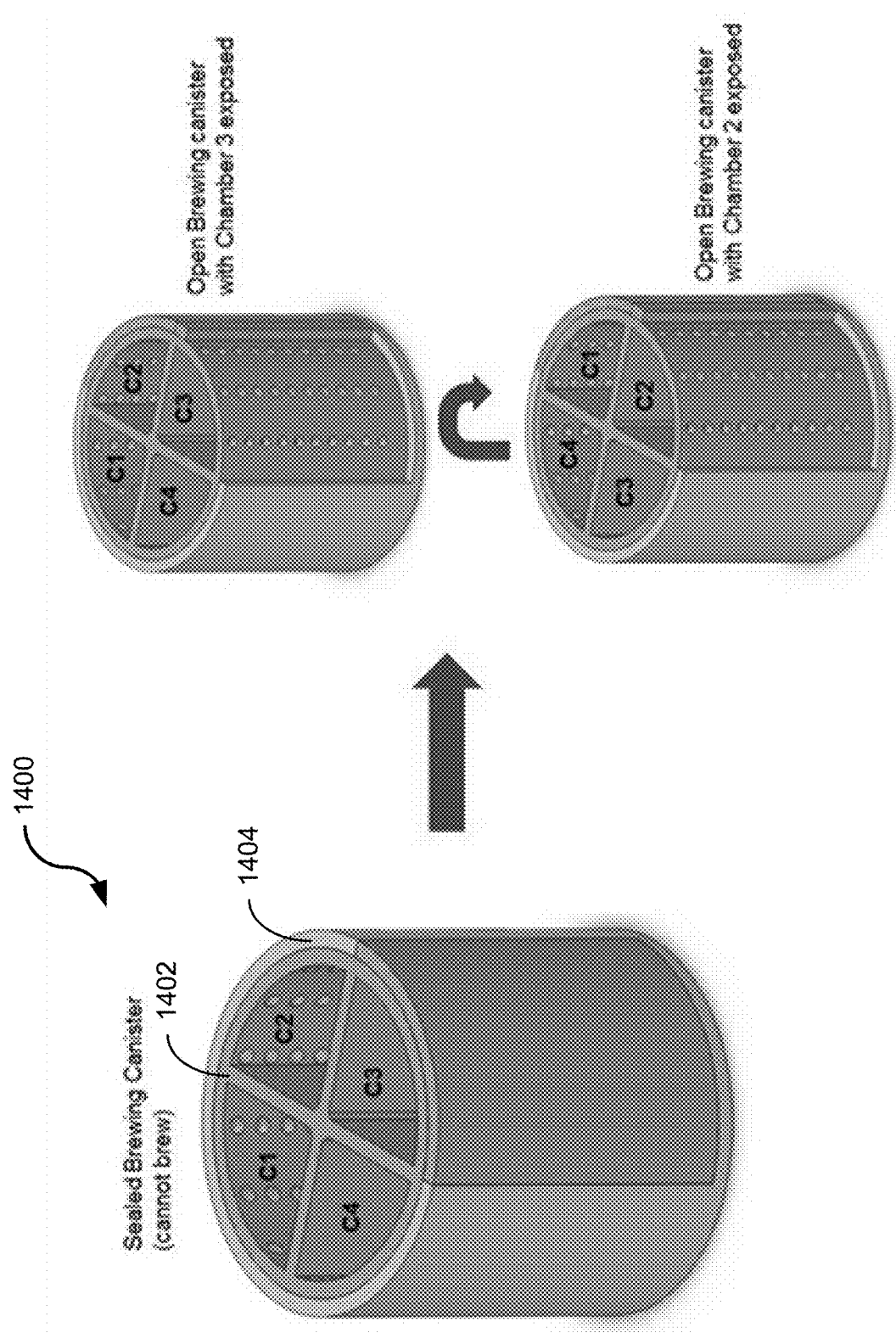

FIG. 14E shows a diagram of the example brewing canister assembly 1400 depicting various embodiments of the inner canister 1402 and 1404, in which the inner canister 1402 has multiple compartments (e.g., two or more) to allow multiple servings to be brewed without requiring a user to clean out the canister and reload with new tea, coffee, etc. This canister embodiment, similar to the other embodiments of the brewing canister, can be attached to a lid or anywhere in the inner chamber 612. As shown in the example of FIG. 14E, the outer canister 1404 of the brewing canister has an opening on one side, which allows exposure of one serving to the fluid and remains fixed in position while the inner canister rotates about its center axis thereby positioning the desired chamber in the exposed position. A door slides along the outer canister 1404 and seals the exposed chamber thereby inhibiting fluid from entering the chamber. For example, this allows controlled brewing of each specific chamber one at a time. This is illustrated in FIG. 14E where the inner canister can be rotated to expose the different chambers in the open position (e.g., C1, C2, C3, C4). Other embodiments of the brewing canister are contemplated to achieve a separated multi-chambered brewing canister.

Many configurations are suitable for the inner canister 1402 with multiple compartments. For example, in various non-limiting embodiments, the inner canister 1402 comprises 2, 3, 4, 5, 6, 7, 8, or more compartments. Such multi-compartment configurations are useful for a variety of applications, including, for example, wherein a user desires to brew multiple servings of a beverage without having to empty or clean the brewing canister in-between, wherein the user desires to brew more than one distinct beverage, and wherein the user desires to brew a beverage under more than one brewing protocol. These scenarios allow the user to accommodate the preferences of multiple individuals or the preferences of one individual over the course of time, such as over the course of a day. In some embodiments the size, number, configuration, and geometry of the openings (in some cases holes or perforations) vary in the different compartments of a multi-compartment brewing canister to, for example, accommodate different brewing materials.

FIGS. 15A-15D show diagrams of an example embodiment of a lid of the portable brewing device 110 that can store substances, e.g., like sugar and milk or other, and which is attachable to various embodiments of the portable brewing device 110 in accordance with the present technology. FIG. 15A shows an example embodiment of the lid including a cap assembly with one or more cap cutouts (e.g., openings or holes) aligned to a solid part of an underlying lid portion such that the lid is closed so no fluid can dispense through the lid. The cap assembly can be turned clockwise to a position, shown in FIG. 15B, such that the one or more cap cutouts in the cap assembly becomes aligned with opening to interior reservoir(s) in the lid. The reservoirs are provided, for example, to store substances such as milk and sugar and the like, which the user of the portable brewing device 110 can add to the brewed beverage when desired, e.g., directly from the reservoir(s). The cap assembly shown in FIG. 15B can be turned clockwise to another position shown in FIG. 15C, such that the one or more cap cutouts in the cap assembly become aligned with the drinking and/or venting holes in the underlying lid portion, e.g., which can act as a mouth piece or dispenser for the fluid to pass through the lid. FIG. 15D shows a controlled dispenser for the reservoir (e.g., solenoid, valve, etc.) which is located at the bottom of the reservoir such that it can control the release of the substance held in the reservoir, e.g., into the fluid contained in the interior chamber of the device 110 when the lid is attached. The controlled dispenser can be configured to be in communication with the data processing unit 118 of the portable brewing device 110 to operate the dispensing of the substance(s) as part of the brewing protocol. For example, this can allow for automatic dispensing of a precise amount of milk and sugar to mix with the beverage, which can be controlled through the user's device, via the app, and programmed by the user as a setting using the app.

FIGS. 16A and 16B show an example of a linking assembly in accordance with the disclosed technology for attaching an example brewing canister, such as the brewing canister of the brewing canister assembly 1400, to a rotating mechanism 1620 that interacts with a motor to cause the canister to move. The linking assembly includes a shaft 1602 coupled to the canister (e.g., the inner canister 1402), in which the shaft 1602 provides a connector component or feature at the distal end of the shaft to interface with the rotating mechanism 1620. The rotating mechanism 1620 of the linking assembly is operably attached to the motor, such that the motor causes the rotating mechanism 1620 to rotate in a manner controlled by the motor. As shown in FIG. 16A, the brewing canister has the shaft 1602 presently detached from the rotating mechanism 1620, where the connector component is proximate an opening of the rotating mechanism 1620 structured to receive the connector component. Once the connector component is inserted within the rotating mechanism 1620, it can be set in a locked position, such that the shaft 1602 is reversibly, but lockably, inserted into the rotating mechanism 1620. In FIG. 16B, the canister connector is shown as inserted and placed into the locked position such that the brewing canister will not fall out or move unless pushed out. In this example embodiment, the canister is removed from the rotating mechanism 1620 by pushing it up into the free space and rotating it 90 degrees. When the canister is placed into the locked position, it allows for precise control of the rotation of the canister as the rotating mechanism 1620 is moveable by a motor or manual operation. The locked position allows for this precise control of the rotation because the canister will rotate directly with the rotating mechanism 1620 since the canister is unable to move within the rotating mechanism 1620, e.g., there is little free-play in the mechanism. This allows a motor or manual operation to control the rotation of the canister to regulate when the device is in the open (e.g., unsealed) or closed (e.g., sealed) position.

Figure 17:
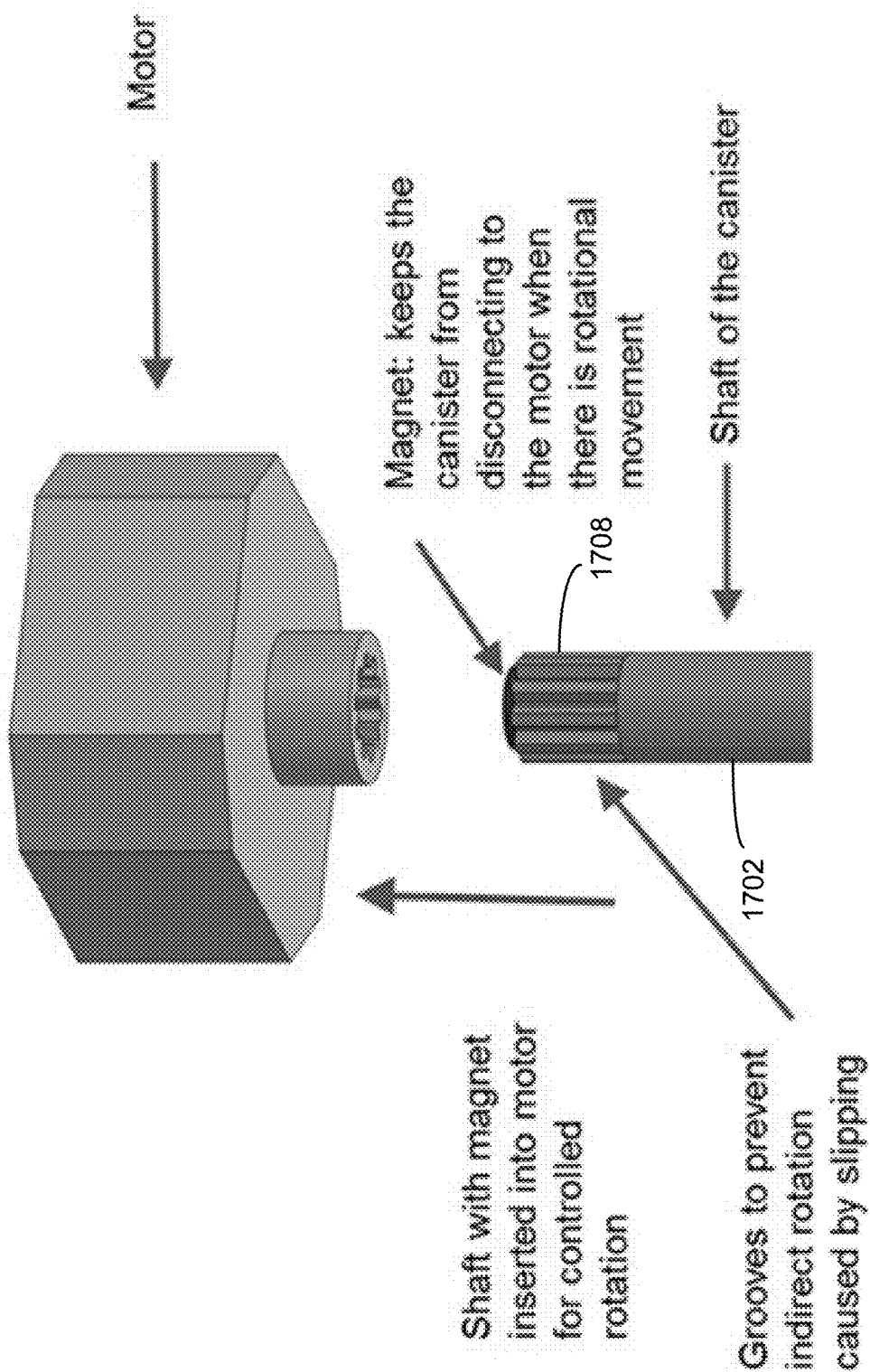
FIG. 17 shows a diagram of an example embodiment for connecting an example brewing canister to a motor.

FIG. 17 shows another example embodiment of a linking assembly in accordance with the disclosed technology for attaching the brewing canister directly, but reversibly, to a motor or manual operation mechanism. In this example embodiment of the linking mechanism, a shaft 1702 of the canister optionally comprises grooves 1708 to prevent indirect rotation caused by slipping. For example, in some embodiments, the linking mechanism includes an attached magnet at the end of the shaft 1702 that magnetically interacts with a magnet disposed to the motor to securely connect the shaft 1702 to the motor and keep the canister from undesirably disconnecting. In some implementations, for example, once the shaft 1702 is inserted into the motor, the magnets keep these two parts together and allow the motor to directly rotate the canister with precision. This is an example embodiment of the way the shaft 1702 of the canister is optionally connected to a motor or mechanism for manual operation in order to precisely control the rotation of the canister to control when the canister is in the open (e.g., unsealed) or closed (e.g., sealed) position.

Figure 18A:
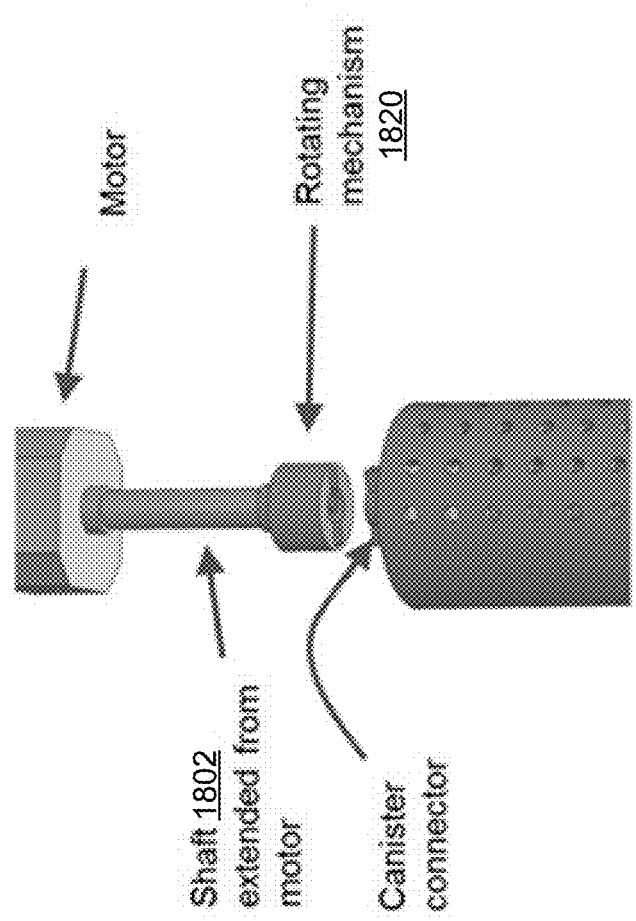
FIGS. 18A and 18B show diagrams of an example embodiment for connecting an example brewing canister to a rotating mechanism.
Figure 18B:
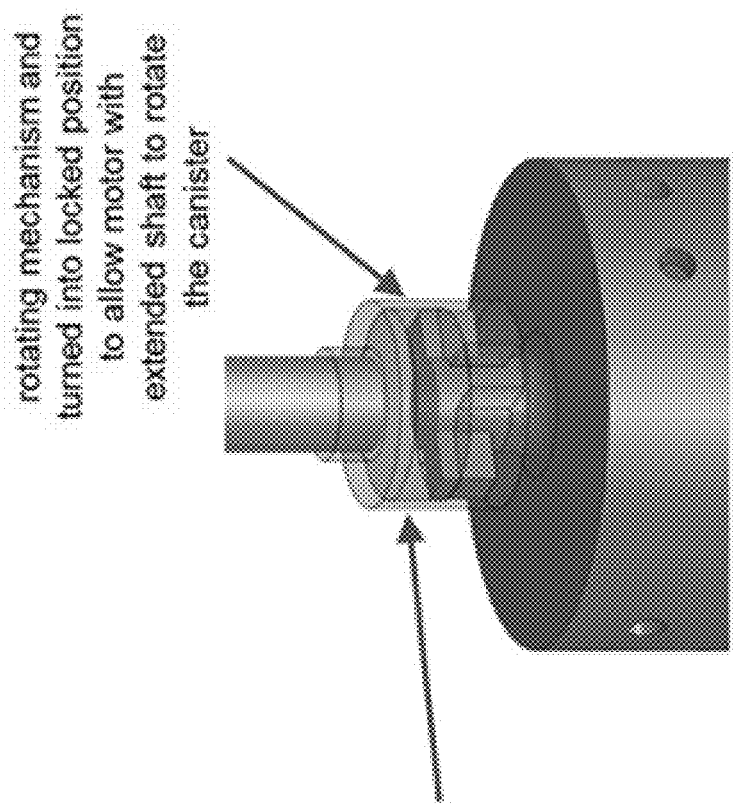

FIGS. 18A and 18B show another example of an option for attaching an example brewing canister to a rotating mechanism, which interacts with a motor or other means of rotation. In the example of FIG. 18A, a shaft 1802 is extended from the motor to the canister and providing the rotating mechanism 1820 at the end of the shaft 1802 to reversibly attach to a connector component coupled to the canister. The connector is extended from the brewing canister. In FIG. 18B, the connector is shown to be inserted into the rotating mechanism 1820 and turned into the locked position, e.g., similar to FIG. 18B. For example, this can accomplish the same result as FIG. 18B, where the canister is locked to the rotating mechanism 1820 and allows the motor to precisely control the rotation of the rotating mechanism 1820 which directly controls the rotation of the canister. For example, this controls when the canister is in the open (e.g., unsealed) or closed (e.g., sealed) position. For example, an example advantage of this embodiment over FIGS. 18A and 18B is that the shaft 1802 remains in the device and the canister is removed without the long shaft. This example embodiment allows the canister to be smaller in height, easier to handle, and easier to store.

FIG. 19 shows another example of an option for attaching an example brewing canister to a motor or manual means of rotation without having a shaft connected to the canister. In this embodiment, the brewing canister optionally includes grooves 1908 preventing indirect rotation, which can be caused by slipping, as well as a magnet 1928 that the keeps the canister from disconnecting from the shaft 1902, which is connected to the motor. In this embodiment, the canister is inserted into the shaft 1902 where the magnets will interact, keep the two parts connected, and allow the motor to directly rotate the canister with precision to control when the canister is in the open (e.g., unsealed) or closed (e.g., sealed) position, e.g., similar to FIG. 17. For example, an example advantage of this embodiment is that the shaft 1902 remains in the device and the canister is inserted and removed more easily than using a rotating mechanism since it is one step that requires force applied in a single direction to insert and remove it. This embodiment also allows the canister to be smaller in height, easier to handle, and easier to store.

Figure 20A:
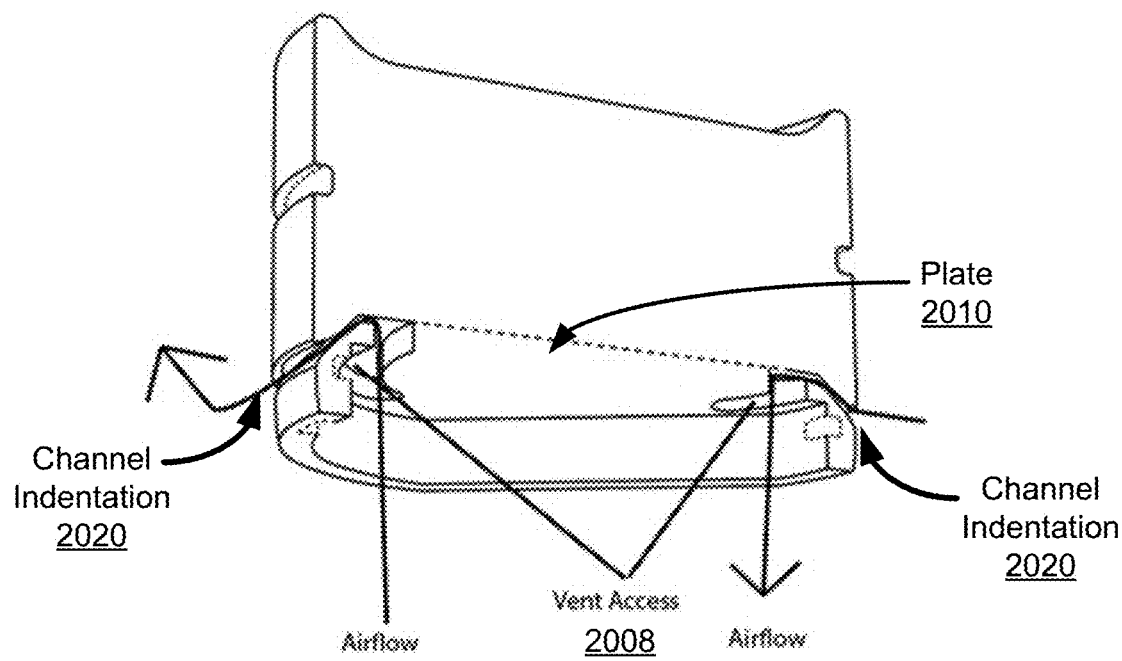
FIGS. 20A and 20B show cross illustrative schematic diagrams of an example embodiment of a venting mechanism of a portable brewing device in accordance with the present technology.
Figure 20B:
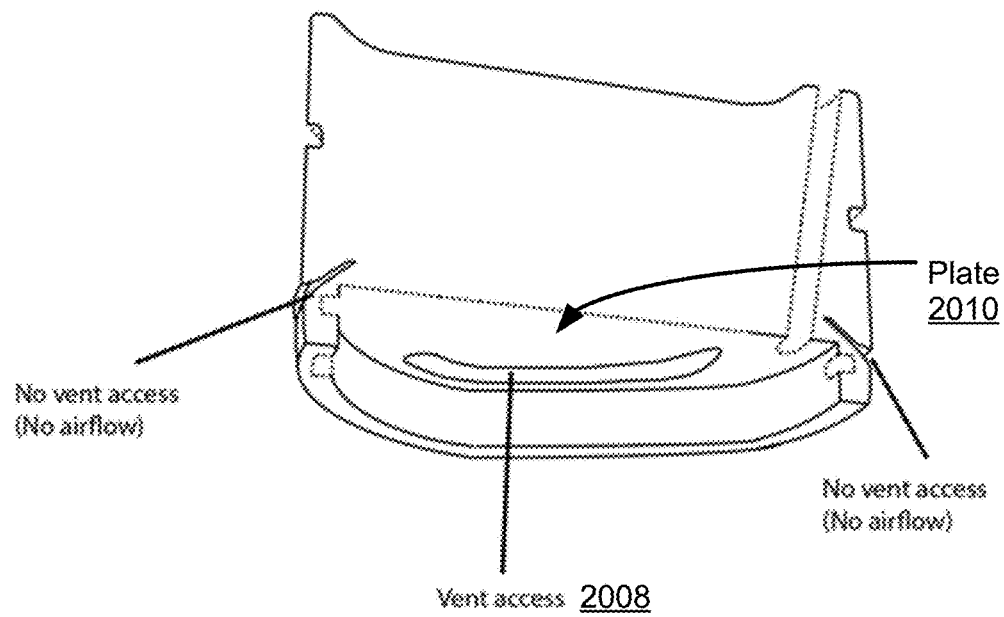

FIGS. 20A and 20B show a cross sectional view of an example embodiment of a venting mechanism for various embodiments of the portable brewing device 110, e.g., such as the venting unit 109 and/or the venting system of the portable device 610. As depicted in FIG. 20A, the venting mechanism includes a plate 2010 and a vent access 2008 (e.g., an opening in a plate or bottom portion of a lid) that allows airflow in and out of the interior chamber of the portable brewing device for embodiments of the portable brewing device that provide a channel indentation 2020 on the side of the container body and/or lid that continues into the interior chamber until the vent access reaches it. In some embodiments, the channel indentation 2020 can include a 360 degree channel that spans along the outside of the portable brewing device, whereas in other embodiments there are one or more channel indentations 2020 that span a limited degree long the exterior of the device. In some embodiments, the plate 2010 is part of the bottom of the container lid, and the vent access 2008 provides an opening at the bottom of the container lid and therefore, on any side where there is alignment of the vent access with the channel indentation 2020, airflow is enabled from the outside to the inside as well, and vice versa, through the available channel when the stop venting mechanism is in the open position.

FIG. 20B shows a cross sectional view where the interface of the vent access 2008 and the channel of the channel indentation 2020 is blocked, e.g., based on a rotation of the plate 2010 (e.g., at the bottom of the lid) that misaligns the vent access opening from the channel. In these areas, it connects the bottom half to the top because there is no vent access and therefore in those areas, there will be no airflow, only in the areas with vent access all of the way through the channel.

Figure 20C:
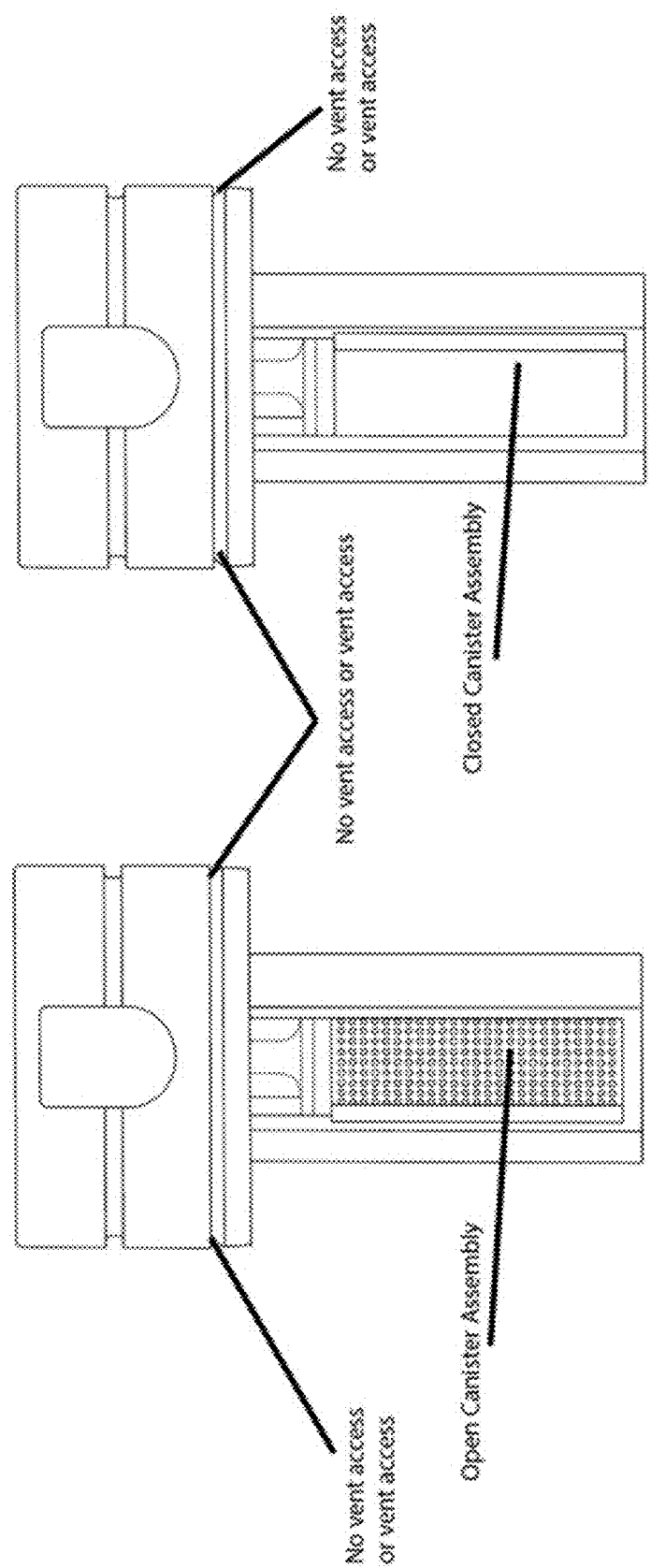
FIG. 20C shows an illustrative diagram of the example venting mechanism with an example attached brewing canister assembly in the open and closed positions.

FIG. 20C shows an example embodiment of a portable brewing device depicting the outside of the lid with an attached brewing canister assembly in the open and closed position. The areas labeled "no vent access or vent access" illustrates an example embodiment of a 360 degree channel indentation 2020. As shown in FIGS. 20A and 20B, the channels are parallel in their direction at a certain degree such that from the outside, a user is unable to tell where the vent access is and where the vent access is not by simply looking directly at it. This embodiment provides a functional and aesthetically pleasing design that provides a vent for the portable brewing device in which the consumer may only recognize as an exterior design but truly provides a functional attribute for improved surface area for better airflow and proper circulation where one side is able to bring in the cool air outside of the device and the other side will push out the heated air in the container.

Figure 20D:
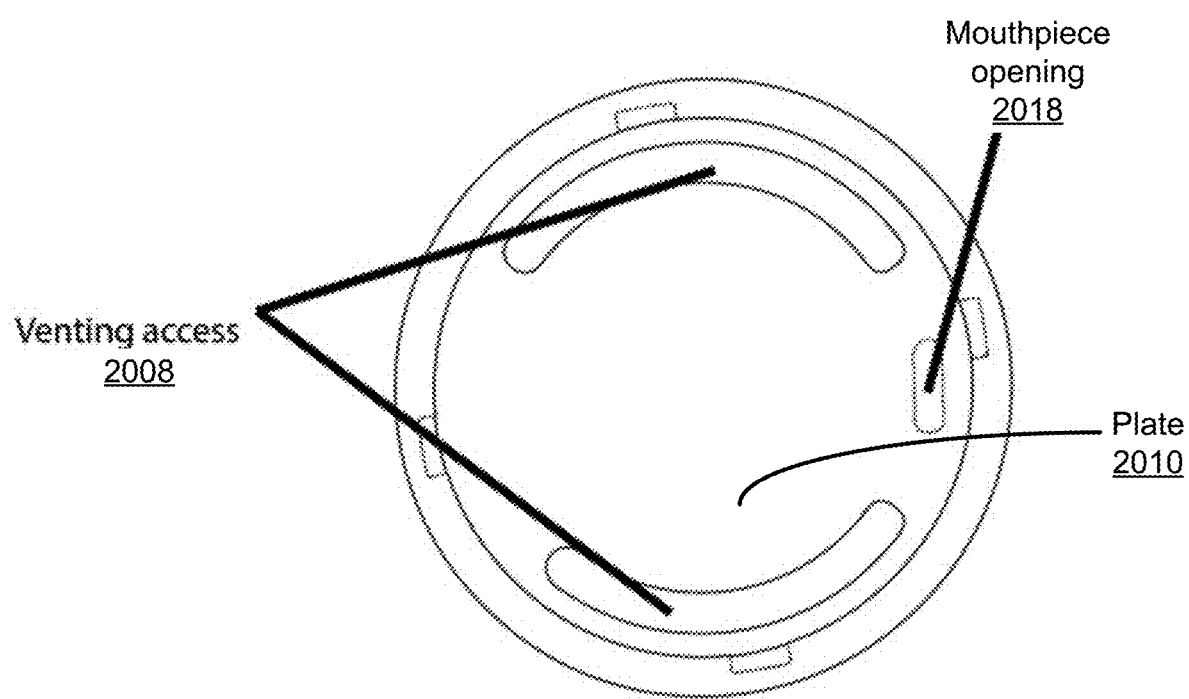
FIG. 20D shows an illustrative diagram of the example venting mechanism from the bottom of the lid without the example brewing canister assembly.

FIG. 20D shows a top view of the example embodiment of the venting system for a portable brewing device having a mouthpiece opening disposed on the plate 2010 that is separated from the venting access 2008 (e.g., in this example, two venting access openings) where the venting access 2008 are on opposite sides of one another on the plate 2010 (e.g., which can be the bottom of the lid of the portable brewing device).

Some example embodiments of the portable brewing device 110 are described that include a removable lid for controlled venting of the brewing chamber and container. For example, current lid technology for beverage containers creates a disconnect for when the user would like to cool a beverage in the container that is too hot to consume since the design of the closed system reduces the loss of heat. As such, the lid would therefore have to be removed to allow exposure to the cooler air in the surrounding environment to speed up the cooling process since they do not have a combined cooling system. The example embodiments of a removable lid in accordance with the present technology provide several benefits to users to control drinking temperatures and avoid unnecessary spilling.

In some aspects, a removable lid includes sections that can be opened and closed via mechanism to allow exposure of air in the environment outside of container to the air inside of the container. The mechanisms can be controlled in a manual or automatic fashion in which an actuator will move in a direction that allows it to open and close. The actuator movement can include but is not limited to up and down movements, rotational movements, side movements, and a combination thereof. The actuator could be in response to certain media or methods such as a signal from a data processing unit (e.g., microprocessor) which can be triggered from events including but not limited to a change in orientation from an accelerometer reading to prevent unwanted spilling, a temperature threshold to start or stop venting, a user inputted signal, or part of an overall process including a brewing cycle. The example microprocessor can be triggered by a predetermined software or can receive the signal based on its connection to another device which can be paired wired or wirelessly through standards including but not limited to Bluetooth, Wi-Fi, and near field communication (NFC). The systems described and disclosed enables a platform in which the removable lid can be suited for several different containers to enable controlled venting that can be used for different functionalities and benefits including but not limited to cooling to an ideal drinking temperature for the portable brewing device 110.

Figure 21A:
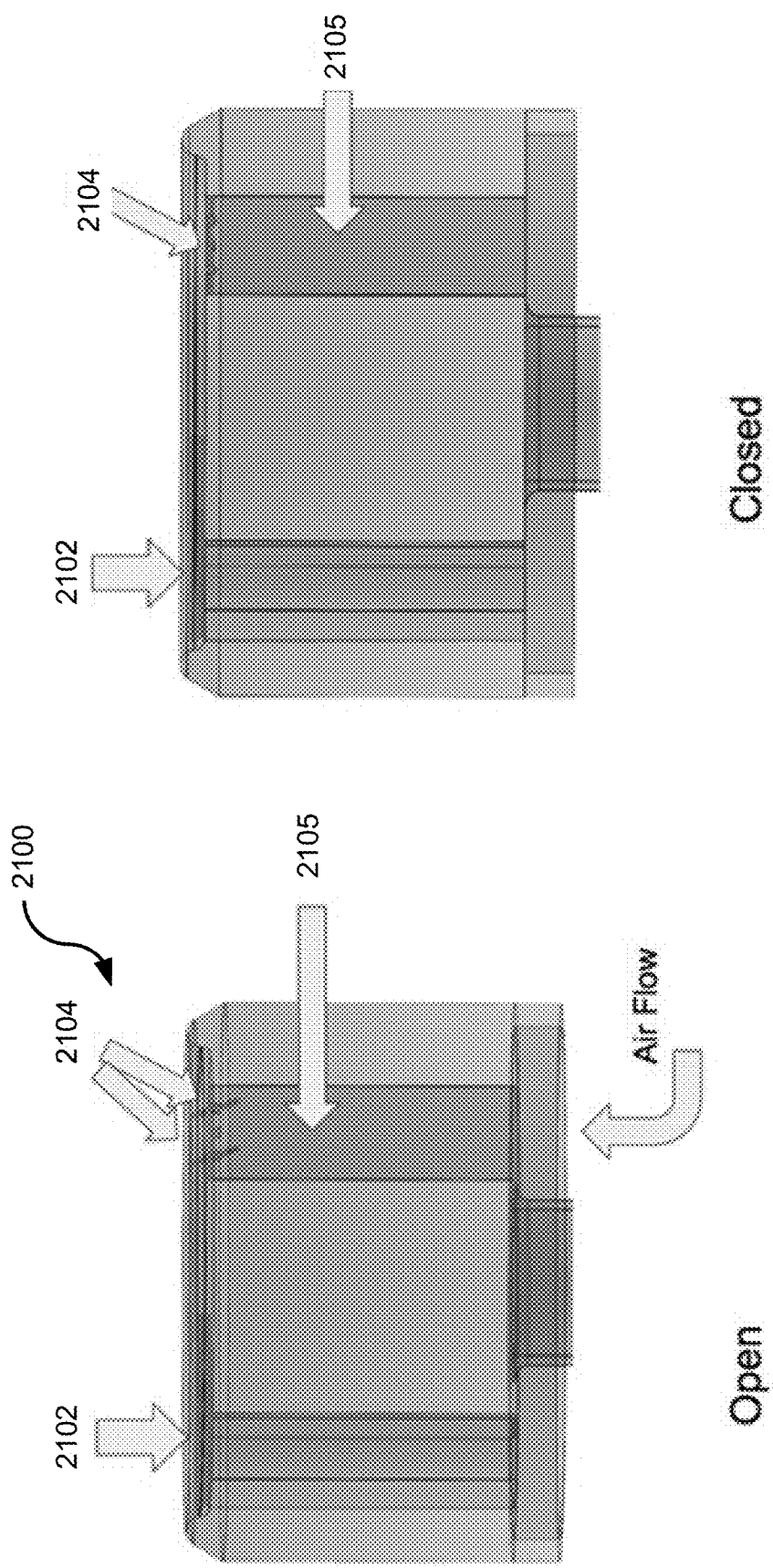
FIGS. 21A-21C shows diagrams of an example embodiment of a venting system in accordance with the disclosed technology.

FIG. 21A shows an illustrative schematic diagram of an exemplary venting device 2100 in accordance with the disclosed technology. The lid body 2102 can be configured to have a variety of shapes and sizes, and to include any of various materials to provide sufficient strength, support, electrical insulation, insulation and/or dissipation of heat, and grip for a user to hold, carry, and store the device as well fit onto a variety of different container bodies through various attachment mechanisms. The device 2100 can include a mouthpiece 2120 separate from a section 2101 that can be placed anywhere (top, bottom, or sides) in the lid body 2102 where the section is designed to have areas, generalized as being called a rudder 2104 which is the movement of an area in any direction, that can move to cover and uncover the exposed area 2105 which has access to the environment in the container body that would be attached to the device. This is an example embodiment with multiple areas that can move to cover and uncover by moving up and down to the exposed area 2105 that has access to the container body environment however other embodiments include one or more areas in various patterns and shapes that can move in different directions in order to cover and uncover the exposed area 2105. For example, the areas that move to uncover the exposed area can be controlled by a connected rotational axis in which a motor, electromagnet, servo, or manual force mechanism can rotate to move it to uncover the exposed areas. The rudders 2104 in the covered position can be positioned such that fluid is unable to exit the lid and can be combined with additional materials, e.g., such as silicon or Teflon which can aid in sealing each part where water could penetrate.

Figure 21B:
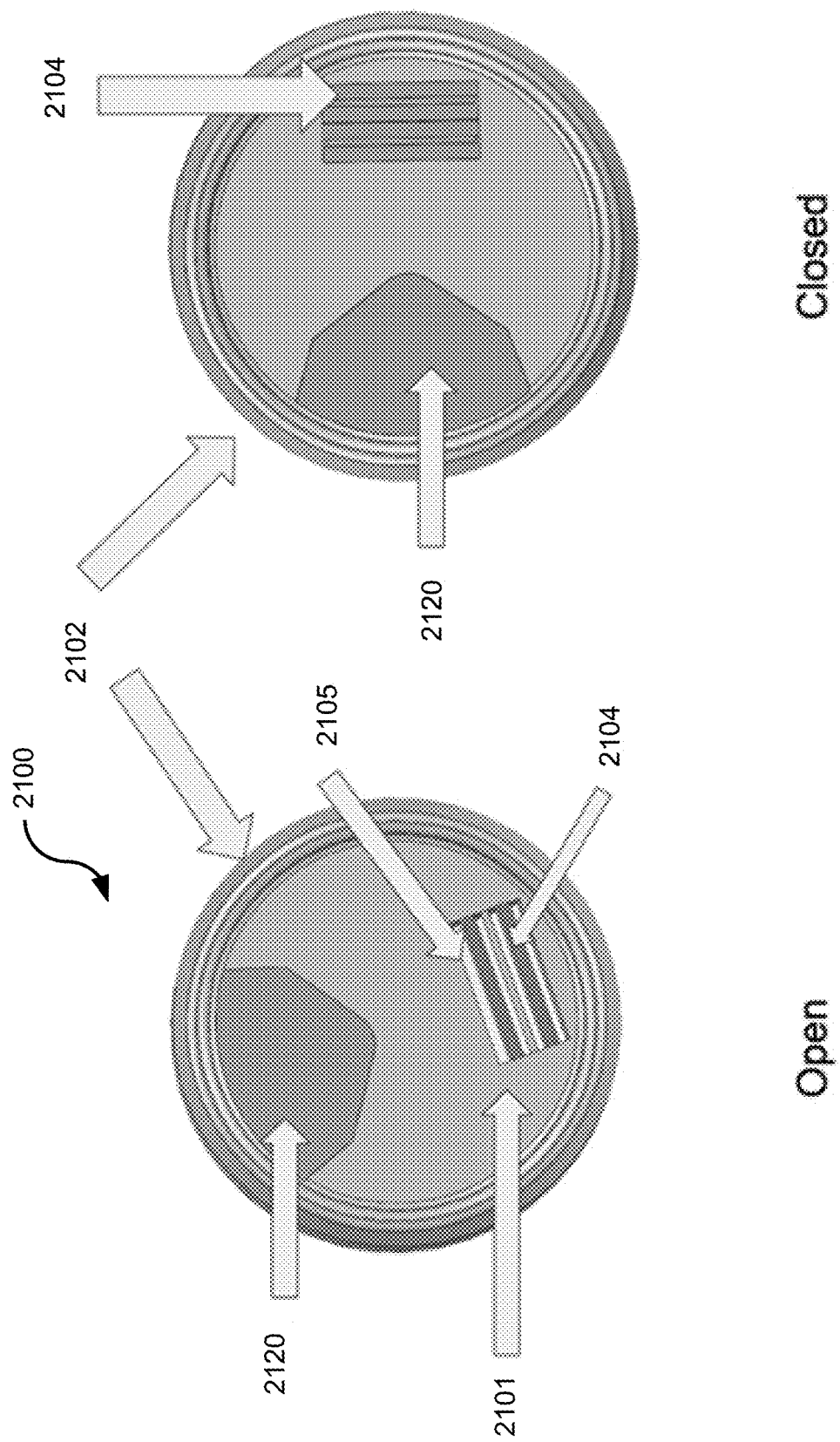

FIG. 21B shows a top down view of the lid such that the rudders 2104 are covering the exposed area 2105 and are flush with the top of the lid as well as the rudders 2104 are not covering the exposed area 2105 with the movement of the actuator connected to the rudders 2104.

Figure 21C:
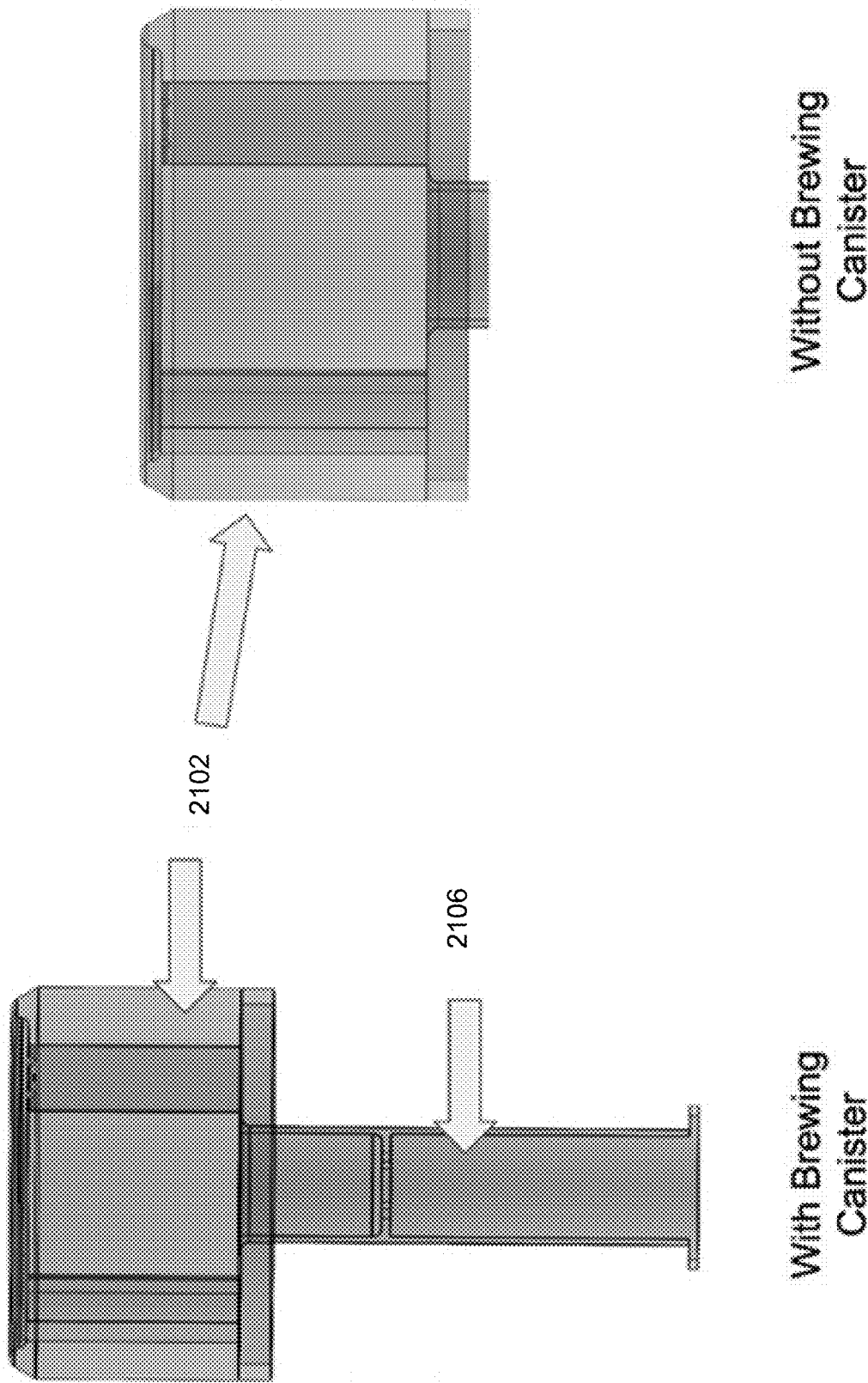

FIG. 21C is an example embodiment of the removable lid with and without an attached brewing mechanism 2106 to illustrate the different ways the lid body 2102 can be combined with other features to the venting system. Additional example embodiments include a rudder design 2104 that is in the bottom of lid body 2102 that acts in a similar manner as the design in FIG. 21A with the addition of a section at the top of the lid body 2102 that acts to cover and uncover the exposed area with a side moving mechanism. This example embodiment can operate with the same functionality as FIG. 21A with two mechanisms to prevent air and fluid flow. Both rudders 2104 must be positioned in the open position to allow air flow.

For example, the rudder designs 2104 in FIG. 21A allow for a large surface area in which each individual section does not need to move far which allows rapid movement. For example, with the rudder design 2104 in the bottom could react faster to prevent fluid from exiting the lid body 2102 while the rudder design 2104 in the top could move slower and therefore be designed to fit the users design preferences as the rudder design 2104 in the top will be viewable by the user when the container is closed.

In FIG. 21A, the rudder 2104 could react to a signal from a data processing unit (e.g., microprocessor) in which it senses a tipping movement through an accelerometer to close the exposed area 2105 to prevent unwanted spilling in case the device would orient itself to a degree in which spilling could occur. This example embodiment where the rudder 2104 is at the bottom of the lid body 2102 has advantages including its ability to react quickly to a signal sent to the actuator to close it off from fluid in order to prevent any unwanted spilling.

The types of venting systems in FIGS. 21A-21B can be controlled to open and close the exposed area to allow airflow from the container environment to the outside environment that has a connection to an external device such as a smartphone that is connected to wireless technologies including Bluetooth or Wi-Fi in order to trigger based on user preferences stored on the external device including but not limited to temperature, which can be detected through a combined temperature sensor connected to the device, time, type of beverage, and other settings. Additionally, rudder design 104 in FIGS. 21A-21C can have additional embodiments beyond motor and manual mechanisms where it is controlled through spring mechanisms, magnetic mechanisms, or other mechanisms which can provide features including speed, increased sealing, space efficiency, and spatially and geometrically optimized.

Figure 22A:
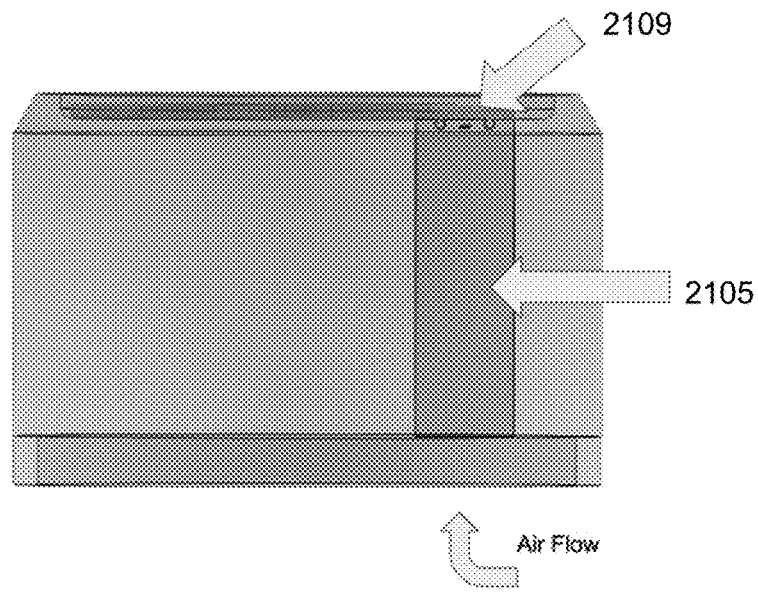
FIGS. 22A-22B show diagrams of an example embodiment of a venting device in accordance with the disclosed technology.

FIG. 22A shows a diagram of an example embodiment of a venting device in accordance with the disclosed technology to show additional ways in which the lid can be configured in order to control flow of air and prevention of unwanted exiting of fluid similar to FIGS. 21A-21C functionality and benefits. FIG. 22A illustrates the use of a material 2109 that is able to be connected to the exposed area 2105 in combination with a covering mechanism 2119 that is able to cover the material 2109 such that the material properties will allow the flow of air between the container environment and the outside environment but prevent the flow of fluid through its chemical makeup and design. Example material 2109 which can allow flow of air but prevent flow of fluid includes but is not limited to a mesh network of polytetrafluoroethylene fibers set to specific densities and porosities and can be combined with other materials to provide additional benefits including but not limited to increased air flow speed, increased food safety, as well as heat and corrosive resistance.

Figure 22B:
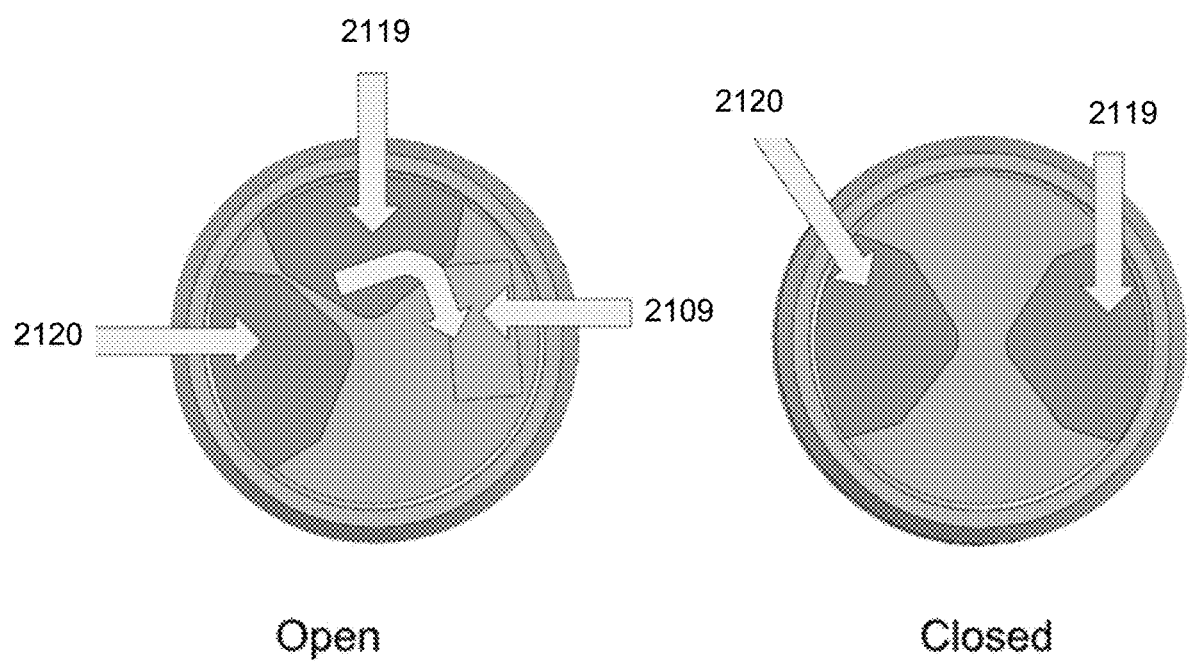

FIG. 22B illustrates a side view of the lid body 2102 in which the covering mechanism 2119 can be positioned on top of the material 2109 to cover it and prevent air flow as well as positioned away from the material 2109 to uncover it and allow air flow. Using a material 2109 allows the lid to prevent any unwanted spills even in an event where the covering mechanism 2119 is in the uncovered position due to its hydrophobic properties. Additionally, it does not require the covering mechanism 2119 to seal as well as react quickly to orientation changes.

Figure 23B:
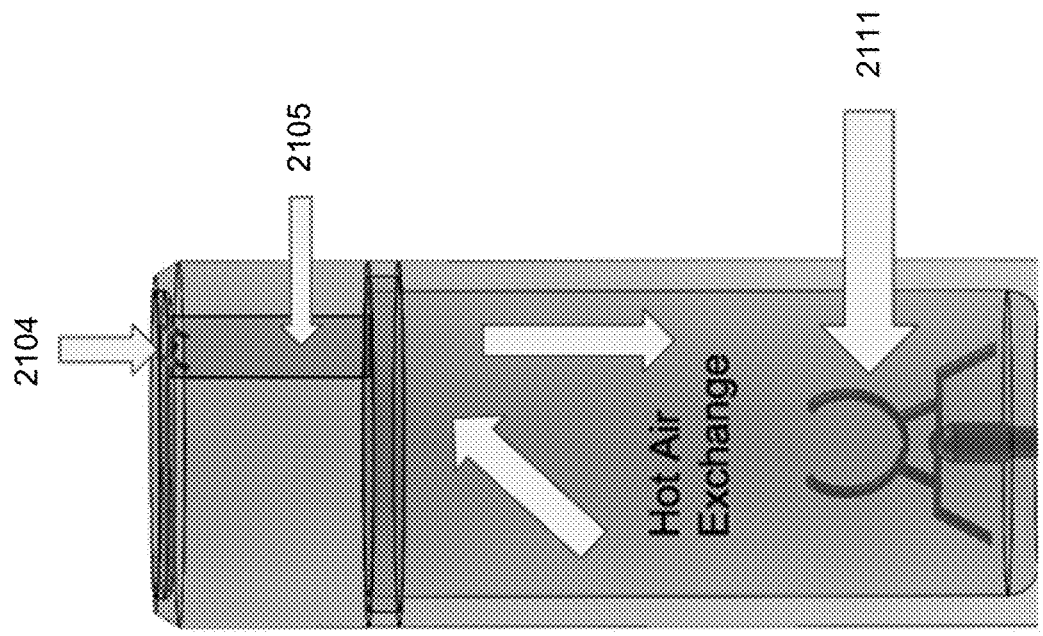
FIGS. 23A-23B show diagrams of example embodiments of a venting device in accordance with the disclosed technology, which can be combined with devices that aid in the flow of air between the container environment and the outside environment.
Figure 23A:
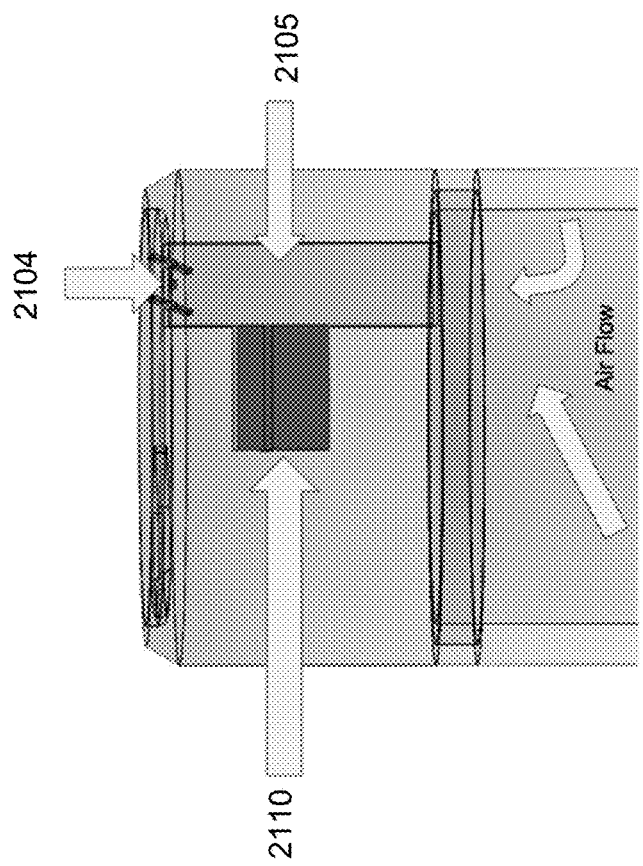

FIG. 23A shows a diagram of an example venting device in accordance with the disclosed technology. The example venting device of FIG. 23 can be combined with devices that aid in the flow of air between the container environment and the outside environment. FIG. 23A shows the additional of a fan 2110 within the lid body 2102 for other example venting device embodiments including but not limited to FIGS. 21A-1C and FIGS. 22A-22B such that the fan 2110 can aid in cooling the beverage by increasing the flow rate of air between the container environment and the outside environment. Fan 2110 can be designed to simultaneously force air in and out for increased heat exchange as well as combined to force air that is first cooled into the container environment to increase the temperature gradient between the liquid and the surrounding air for greater convection.

FIG. 23B shows an additional diagram of an exemplary venting device combined with a device that aids in the flow of air between the container environment and the outside environment. FIG. 23B shows the additional of a spinning apparatus 2111 submerged and connected to the attached container that can rotate in order to agitate the fluid which will agitate the air above the fluid and expose the hot fluid to more air which will in turn rise and cause a natural air flow of hot air rising to the outside environment and cool air down to the fluid. This type of spinning apparatus 2111 can be combined with additional cooling mechanisms such as fan 2110 as well as Peltier's that are in connection to the fluid.

Figure 24:
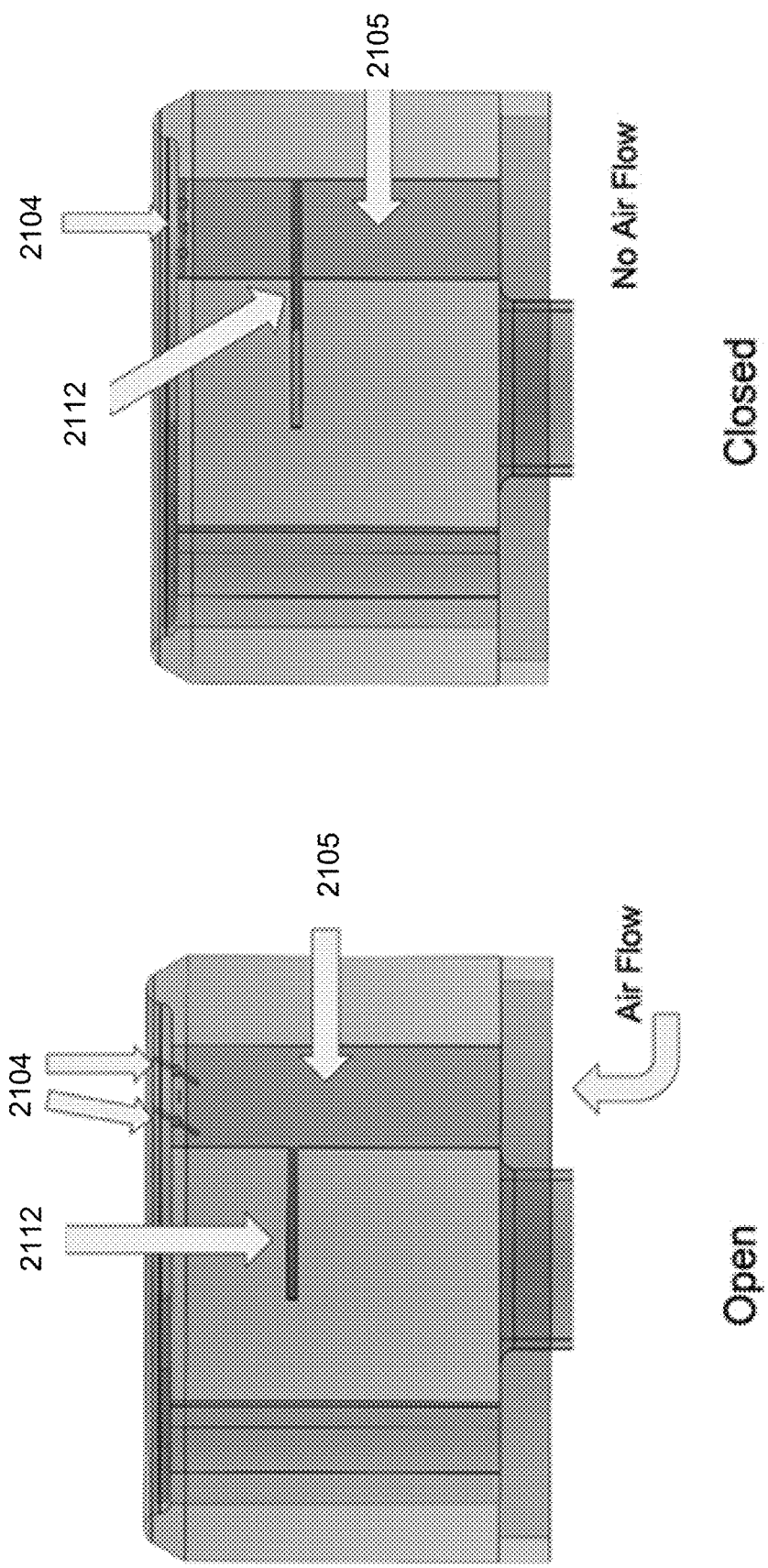
FIG. 24 shows a diagram of an example venting device in accordance with the disclosed technology.

FIG. 24 shows a diagram of an example venting device in accordance with the disclosed technology. FIG. 24 is an additional example embodiment in which a sealing mechanisms within the lid can operate to control the flow of air and fluid through a manual or automatic manner. The plug 2112 can be any geometry, material, and size such as a rectangle as illustrated in FIG. 24 or an elongated sphere in which the two ends are different widths. Different geometries allow for different ways to seal. For example, the elongated sphere could be position sideways such that it can protrude into the exposed lid space 2105 and inserted into a circular hole where the width of the whole is smaller than the width or the widest part of the sphere thereby creating force against the whole and the elongated sphere to prevent any fluid and air from passing through. Additionally, certain geometries such as the elongated sphere can be created to fit into the exposed lid space 2105 in a vertical fashion to control flow of air and fluid. Embodiments in FIG. 24 can have openings at the top that can cover and uncover the holes similar to the covering mechanism 2119 in FIG. 22A. Example embodiments in FIG. 24 can be controlled through mechanisms including but not limited to springs, magnets, and motors to increase sealing, increase speed, space efficiency, to spatially optimize.

Figure 25A:
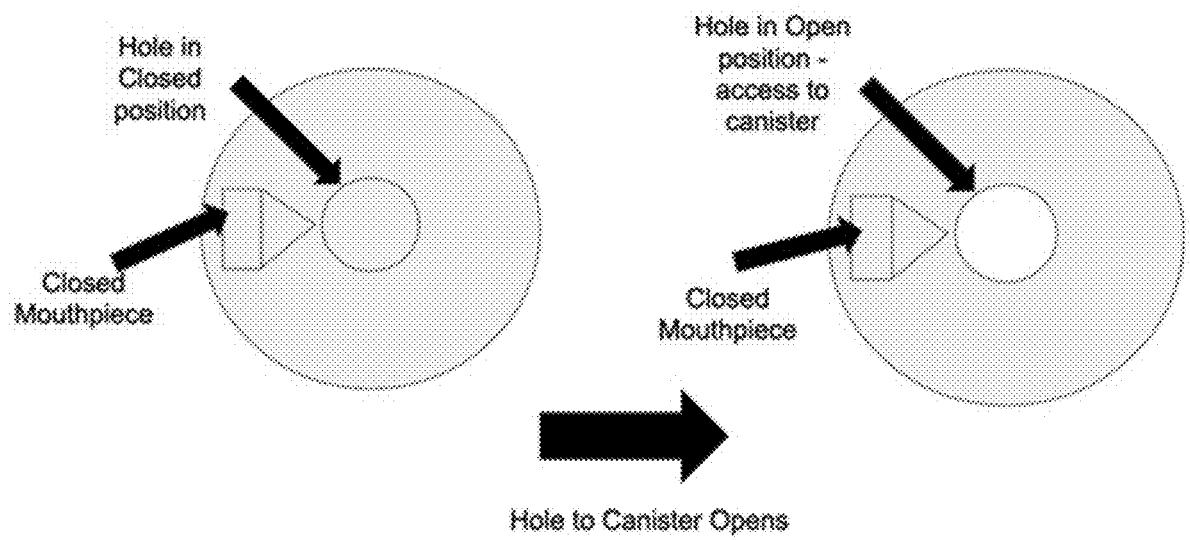
FIGS. 25A and 25B show diagrams of an example embodiment of a lid and brewing canister in accordance with the disclosed technology.
Figure 25B:
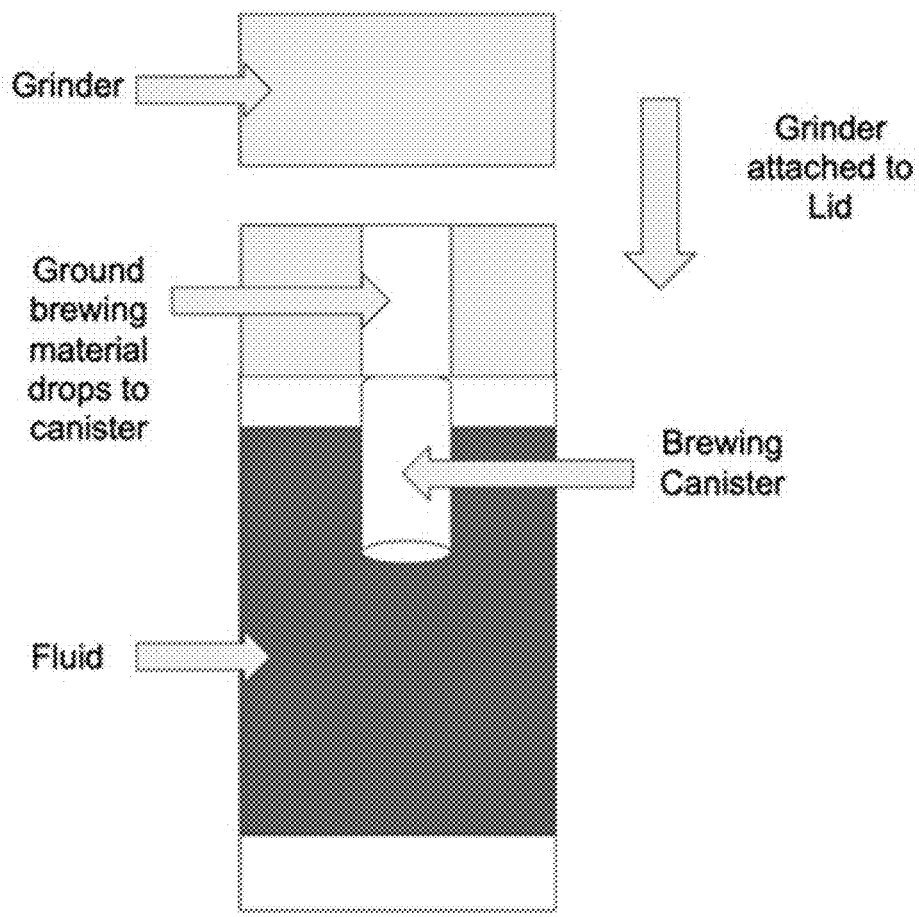

FIGS. 25A and 25B show diagrams of an embodiment in which the lid that has the attached brewing canister that is attached to the container is modified to have a hole in the center that provides access directly into the brewing canister. As shown in FIG. 25A, the hole can be in the closed and open position, which can be controlled automatically or manually or through the attachment of an external device to the lid such as a portable brewing material grinder. For example, the hole to the canister can be closed and then opened when the portable beverage material grinder is attached to the lid in order for a beverage material such as coffee can be inserted to the top of the grinder, in a whole bean form, and ground into smaller pieces and be dropped directly into the brewing canister. Once the grinder or other accessory device is removed from the lid, the hole to the canister can be closed. FIG. 25B shows a view in which the grinder or other accessory is attached to the lid where the hole is able to access the brewing canister.

Figure 26A:
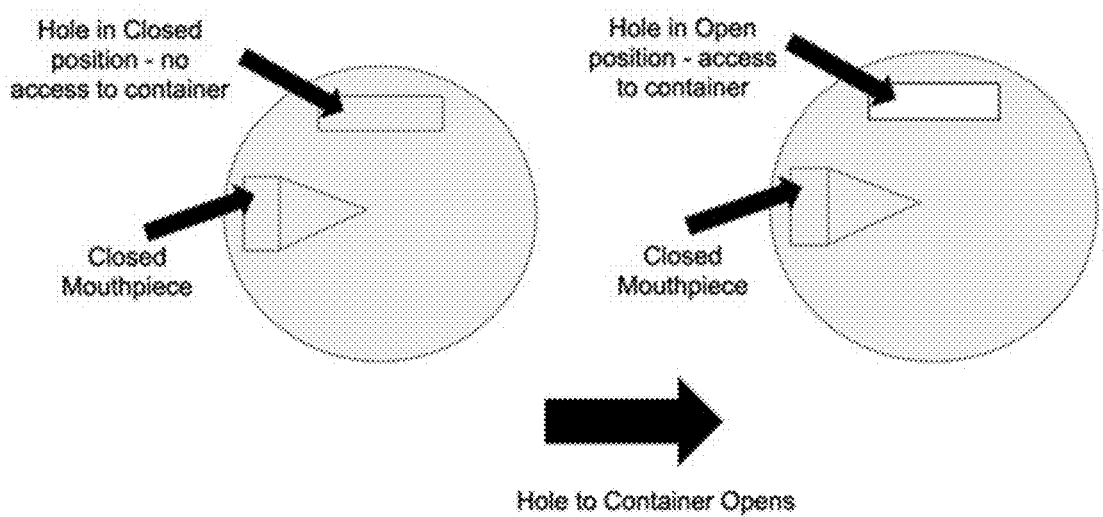
FIGS. 26A and 26B show diagrams of an example embodiment of a lid and brewing canister in accordance with the disclosed technology.
Figure 26B:
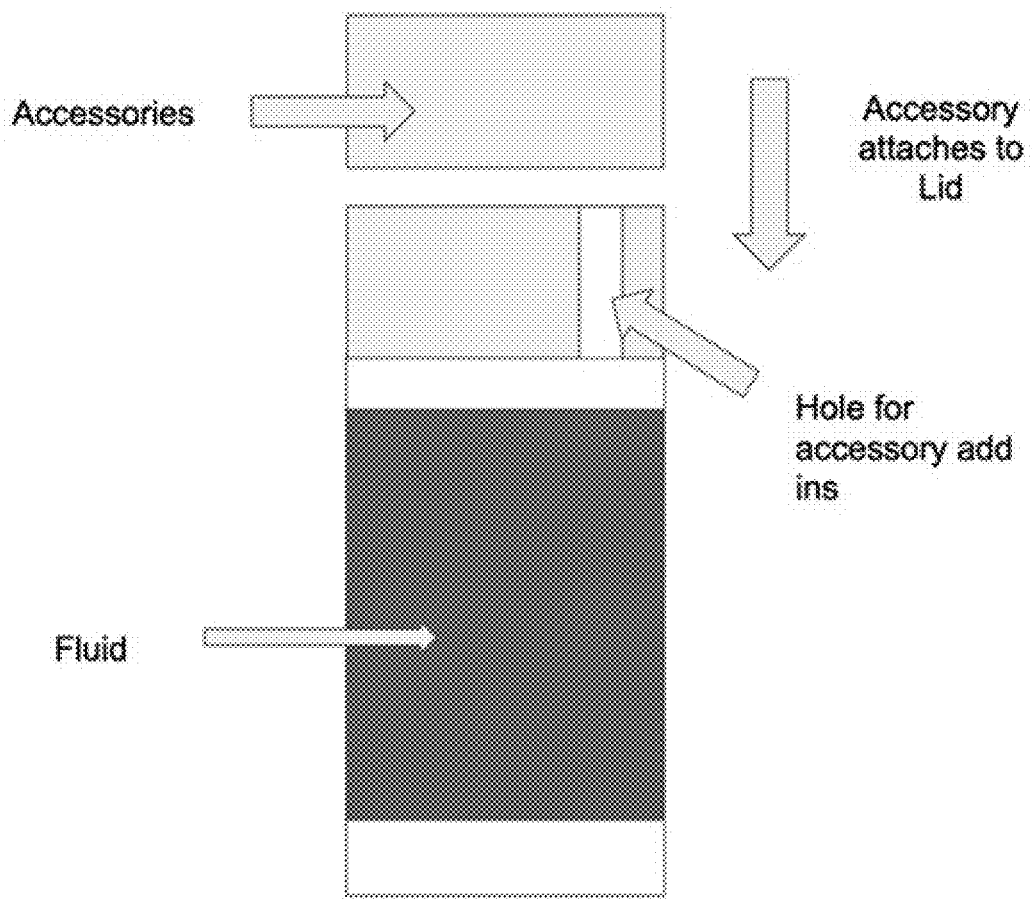

FIGS. 26A and 26B show diagrams of an example embodiment in which the lid that is attached to the container is modified to have a hole somewhere on the lid that provides access directly down to the fluid in the container. This hole can be in the closed and open position which can be controlled automatically or manually or through the attachment of an external device to the lid such as a material dispenser which can hold various materials including but not limited to cocoa nibs, coconut oil, milk, sugar, concentrates, etc. in order to make certain beverages or to automatically drop these materials into the beverage at the right time. The connection to the lid to open the hole can be direct through electrical, manual, or through a mechanical design. Release of the material can be done manually, automatic, or through a signals received from a third device, such as a smartphone. This will allow the user to customize the beverage without having to open the lid to introduce materials. For example, in such embodiments, a user can add such materials before the beverage gets to the ideal drinking temperature, in between, or after it gets there, so they can add it at the right time including on demand when they please to have those additives introduced. Examples include adding in coconut oil and cocoa nibs when a beverage like coffee is still brewing or immediately after brewing in order to brew or ideally mix the additives to make specialty coffee. FIG. 23B illustrates a view from the side in which the accessory is added to the top to allow dropping of the material into the fluid.

Example embodiments of digital processing devices, non-transitory computer readable storage media, computer programs, mobile applications, software modules and databases described herein can include the following.

Digital Processing Device

In some embodiments, the platforms, systems, media, and methods described herein include a digital processing device, or use of the same. In further embodiments, the digital processing device includes one or more hardware central processing units (CPUs) or general purpose graphics processing units (GPGPUs) that carry out the device's functions. In still further embodiments, the digital processing device further comprises an operating system configured to perform executable instructions. In some embodiments, the digital processing device is optionally connected a computer network. In further embodiments, the digital processing device is optionally connected to the Internet such that it accesses the World Wide Web. In still further embodiments, the digital processing device is optionally connected to a cloud computing infrastructure. In other embodiments, the digital processing device is optionally connected to an intranet. In other embodiments, the digital processing device is optionally connected to a data storage device.

In accordance with the description herein, suitable digital processing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, video game consoles, and vehicles. Those of skill in the art will recognize that many smartphones are suitable for use in the system described herein. Those of skill in the art will also recognize that select televisions, video players, and digital music players with optional computer network connectivity are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®. Those of skill in the art will also recognize that suitable media streaming device operating systems include, by way of non-limiting examples, Apple TV®, Roku®, Boxee®, Google TV®, Google Chromecast®, Amazon Fire®, and Samsung® HomeSync®. Those of skill in the art will also recognize that suitable video game console operating systems include, by way of non-limiting examples, Sony® PS3®, Sony® PS4®, Microsoft Xbox 360®, Microsoft Xbox One, Nintendo® Wii®, Nintendo® Wii U®, and Ouya®.

In some embodiments, the device includes a storage and/or memory device. The storage and/or memory device is one or more physical apparatuses used to store data or programs on a temporary or permanent basis. In some embodiments, the device is volatile memory and requires power to maintain stored information. In some embodiments, the device is non-volatile memory and retains stored information when the digital processing device is not powered. In further embodiments, the non-volatile memory comprises flash memory. In some embodiments, the non-volatile memory comprises dynamic random-access memory (DRAM). In some embodiments, the non-volatile memory comprises ferroelectric random access memory (FRAM). In some embodiments, the non-volatile memory comprises phase-change random access memory (PRAM). In other embodiments, the device is a storage device including, by way of non-limiting examples, CD-ROMs, DVDs, flash memory devices, magnetic disk drives, magnetic tapes drives, optical disk drives, and cloud computing based storage. In further embodiments, the storage and/or memory device is a combination of devices such as those disclosed herein.

In some embodiments, the digital processing device includes a display to send visual information to a user. In some embodiments, the display is a liquid crystal display (LCD). In further embodiments, the display is a thin film transistor liquid crystal display (TFT-LCD). In some embodiments, the display is an organic light emitting diode (OLED) display. In various further embodiments, on OLED display is a passive-matrix OLED (PMOLED) or active-matrix OLED (AMOLED) display. In some embodiments, the display is a plasma display. In other embodiments, the display is a video projector. In yet other embodiments, the display is a head-mounted display in communication with the digital processing device, such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In some embodiments, the digital processing device includes an input device to receive information from a user. In some embodiments, the input device is a keyboard. In some embodiments, the input device is a pointing device including, by way of non-limiting examples, a mouse, trackball, track pad, joystick, game controller, or stylus. In some embodiments, the input device is a touch screen or a multi-touch screen. In other embodiments, the input device is a microphone to capture voice or other sound input. In other embodiments, the input device is a video camera or other sensor to capture motion or visual input. In further embodiments, the input device is a Kinect, Leap Motion, or the like. In still further embodiments, the input device is a combination of devices such as those disclosed herein.

Non-Transitory Computer Readable Storage Medium

In some embodiments, the platforms, systems, media, and methods disclosed herein include one or more non-transitory computer readable storage media encoded with a program including instructions executable by the operating system of an optionally networked digital processing device. In further embodiments, a computer readable storage medium is a tangible component of a digital processing device. In still further embodiments, a computer readable storage medium is optionally removable from a digital processing device. In some embodiments, a computer readable storage medium includes, by way of non-limiting examples, CD-ROMs, DVDs, flash memory devices, solid state memory, magnetic disk drives, magnetic tape drives, optical disk drives, cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable in the digital processing device's CPU, written to perform a specified task. Computer readable instructions may be implemented as program modules, such as functions, objects, Application Programming Interfaces (APIs), data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Mobile Application

In some embodiments, a computer program includes a mobile application provided to a mobile digital processing device. In some embodiments, the mobile application is provided to a mobile digital processing device at the time it is manufactured. In other embodiments, the mobile application is provided to a mobile digital processing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, Javascript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Those of skill in the art will recognize that several commercial forums are available for distribution of mobile applications including, by way of non-limiting examples, Apple® App Store, Google® Play, Chrome Web Store, BlackBerry® App World, App Store for Palm devices, App Catalog for webOS, Windows® Marketplace for Mobile, Ovi Store for Nokia® devices, Samsung® Apps, and Nintendo® DSi Shop.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, or combinations thereof. In further various embodiments, a software module comprises a plurality of files, a plurality of sections of code, a plurality of programming objects, a plurality of programming structures, or combinations thereof. In various embodiments, the one or more software modules comprise, by way of non-limiting examples, a web application, a mobile application, and a standalone application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on cloud computing platforms. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of user information, pre-configured brewing protocols, and consumer-configured custom brewing protocols. In various embodiments, suitable databases include, by way of non-limiting examples, relational databases, non-relational databases, object oriented databases, object databases, entity-relationship model databases, associative databases, and XML databases. Further non-limiting examples include SQL, PostgreSQL, MySQL, Oracle, DB2, and Sybase. In some embodiments, a database is internet-based. In further embodiments, a database is web-based. In still further embodiments, a database is cloud computing-based. In other embodiments, a database is based on one or more local computer storage devices.

Examples

The following examples are illustrative of several embodiments in accordance with the present technology. Other exemplary embodiments of the present technology may be presented prior to the following listed examples, or after the following listed examples.

In some embodiments in accordance with the present technology (example 1), a brewing canister assembly, includes a canister frame including a base coupled to a wall including a first wall region and a second wall region adjoining the first wall region, the base and the wall forming an interior region providing a brewing chamber, wherein the first wall region is structured to include an interior cavity and at least one opening through the first wall region and the interior cavity, and the second wall region is structured to include an internal cavity positionally aligned with the interior cavity of the first wall region; a barricade structure configured to move between the internal cavity of the second wall region and the interior cavity of the first wall region, wherein the barricade structure obstructs the at least one opening of the first wall region when positioned in the interior cavity; and an actuator operable to modulate movement of one or both of the canister frame and the barricade structure between an open position that exposes the at least one opening and a closed position blocks the at least one opening, such that fluid located outside the brewing canister assembly is able to flow in and out of the brewing chamber when in the open position and is unable to flow in and out of the brewing chamber when in the closed position, wherein the brewing canister assembly is operable to contain a brewing material in the brewing chamber and regulate fluid flow in and out of the canister frame to brew the brewing material.

In some embodiments in accordance with the present technology (example 2), a portable beverage brewing device includes a container body having an interior chamber to contain a fluid; and a brewing canister assembly positioned in the interior chamber and structured to include (i) at least one component operable to move between a closed position and an open position, the open position providing at least one hole between an exterior and an interior of the brewing canister assembly, and (ii) an actuator configured to modulate movement of the at least one component between the open position and the closed position, such that the fluid is able to flow in and out of the brewing canister assembly when in the open position and is unable to flow in and out of the brewing canister assembly when in the closed position.

In some embodiments in accordance with the present technology (example 3), a portable beverage brewing device includes a container body having an interior chamber to contain a fluid; a brewing canister assembly positioned in the interior chamber and structured to include (i) at least one component operable to move between a closed position and an open position, the open position providing at least one hole between an exterior and an interior of the brewing canister assembly, and (ii) an actuator configured to modulate movement of the at least one component between the open position and the closed position, such that the fluid is able to flow in and out of the brewing canister assembly when in the open position and is unable to flow in and out of the brewing canister assembly when in the closed position, wherein the brewing canister assembly is operable to contain a brewing material in the interior chamber and regulate fluid flow in and out of the brewing canister assembly to brew the brewing material; one or more modular units configured to function based on a received command to regulate one or more parameters associated with a beverage to be brewed by the portable beverage brewing device, wherein the one or more modular units includes a heating unit to heat the fluid; and a data processing unit including a processor and a memory and configured to process data and command the brewing canister assembly and the one or more modular units of the portable beverage brewing device.

Example 4 includes the portable beverage brewing device of example 3, wherein the one or more modular units further includes a temperature sensor to detect a temperature of the fluid.

Example 5 includes the portable beverage brewing device of any of examples 3-4, wherein the one or more modular units further includes a cooling unit to cool the fluid.

Example 6 includes the portable beverage brewing device of any of examples 3-5, wherein the one or more modular units further includes a display on an exterior of the container body and in communication with the data processing unit, wherein the display is configured to display information pertaining to the parameter.

Example 7 includes the portable beverage brewing device of any of examples 3-6, wherein the one or more modular units further includes a reversibly attachable lid to cover an opening of the container body, the lid including an aperture and an aperture cover to allow the fluid to flow out of the interior chamber when the lid is attached to the container body.

Example 8 includes the portable beverage brewing device of any of examples 3-7, wherein the one or more modular units further includes a venting system including one or more venting holes in one or both of the container body and a lid reversibly attachable to the container body, the venting system including a vent-stop mechanism coupled to the one or more venting holes accessible to the interior chamber and passing through the one or both of the container body and the lid to access an exterior of the portable beverage brewing device.

Example 9 includes the portable beverage brewing device of example 8, wherein the venting system allows outside air to access the fluid in the interior chamber.

Example 10 includes the portable beverage brewing device of any of examples 3-9, wherein the one or more modular units further includes a spinning apparatus in the interior chamber configured to rotate and agitate the fluid in the interior chamber.

Example 11 includes the portable beverage brewing device of example 10, wherein agitation of the fluid aids in flow of the outside air to expose the fluid to more air and cool the fluid.

Example 12 includes the portable beverage brewing device of example 10, wherein the spinning apparatus is configured to clean one or both of the interior chamber and the brewing canister assembly.

Example 13 includes the portable beverage brewing device of any of examples 3-12, wherein the one or more modular units further includes a flow sensor to detect fluid flow of a brewed beverage from the device.

Example 14 includes the portable beverage brewing device of any of examples 3-13, wherein the one or more modular units further includes an analyte sensor to detect a constituent parameter associated with a constituent of the brewed beverage.

Example 15 includes the portable beverage brewing device of example 14, wherein the portable beverage brewing device includes a software application program product comprising a non-transitory computer-readable storage medium having instructions, which when executed by a processor, cause the data processing unit or a processing unit of a mobile device in communication with the beverage device to process data detected by one or both of the flow sensor and the analyte sensor to determine the parameter and generate a corresponding command.

Example 16 includes the portable beverage brewing device of any of examples 3-15, wherein the parameter includes at least one of a brewing temperature, a drinking temperature, a fluid flow rate, an amount of a brewed beverage, an extraction value associated with the brewed beverage, a brewing time, a spinning rate of a spinning mechanism, a spinning time of a spinning mechanism, or a venting time.

In some embodiments in accordance with the present technology (example 17), a system for portably brewing a beverage includes a portable beverage brewing device, comprising a container body having an interior chamber to contain a fluid; a brewing canister assembly positioned in the interior chamber and structured to include (i) one or more components that move upon a command between a closed position and an open position, the open position providing at least one hole between an exterior and an interior of the brewing canister assembly, and (ii) an actuator operable to modulate between the open position and the closed position, such that the fluid is able to flow in and out of the brewing canister assembly when in the open position and is unable to flow in and out of the brewing canister assembly when in the closed position; a flow sensor to detect fluid flow of a brewed beverage from the device; an analyte sensor to detect a parameter associated with a constituent of the brewed beverage; and a processing unit including a processor and a memory and configured to process data and command at least some modular units of the portable beverage brewing device including the brewing canister assembly; a mobile communication device in wireless communication with the portable beverage brewing device, the mobile communication device including a data processing unit including a processor and memory to receive and process data, wherein at least one of the portable beverage brewing device or the mobile communication device includes a software application program product comprising a non-transitory computer-readable storage medium having instructions, which when executed by the processor, cause the device to change a parameter associated with brewing a beverage using the portable beverage brewing device; and one or more computers in communication with the mobile communications device via a communication network or link, wherein the one or more computers include software modules configured to provide artificial intelligence analyzing and learning about substances consumed from the beverage and to control at least one functionality of the portable beverage brewing device in response to the artificial intelligence, wherein the one or more computers are configured to produce a command to be received by the portable beverage brewing device to adapt a beverage brewing protocol.

In some embodiments in accordance with the present technology (example 18), a system for portably brewing a beverage includes a portable beverage brewing device, comprising a container body having an interior chamber to contain a fluid; a brewing canister assembly positioned in the interior chamber and structured to include (i) one or more components that move upon a command between a closed position and an open position, the open position providing at least one hole between an exterior and an interior of the brewing canister assembly, and (ii) an actuator operable to modulate between the open position and the closed position, such that the fluid is able to flow in and out of the brewing canister assembly when in the open position and is unable to flow in and out of the brewing canister assembly when in the closed position; a flow sensor to detect fluid flow of a brewed beverage from the device; an analyte sensor to detect a parameter associated with a constituent of the brewed beverage; and a processing unit including a processor and a memory and configured to process data and command at least some modular units of the portable beverage brewing device including the brewing canister assembly; a mobile communication device in wireless communication with the portable beverage brewing device, the mobile communication device including a data processing unit including a processor and memory to receive and process data, wherein at least one of the portable beverage brewing device or the mobile communication device includes a software application program product comprising a non-transitory computer-readable storage medium having instructions, which when executed by the processor, cause the device to change a parameter associated with brewing a beverage using the portable beverage brewing device; one or more computers in communication with the mobile communications device via a communication network or link, wherein the one or more computers include software modules configured to provide artificial intelligence analyzing and learning about substances consumed from the beverage and to control at least one functionality of the portable beverage brewing device in response to the artificial intelligence, wherein the one or more computers are configured to produce a command to be received by the portable beverage brewing device to adapt a beverage brewing protocol; and a client computer of a beverage material vendor in communication with the one or more computers and operable to receive and process commands generated by the one or more computers, wherein the client computer includes a vendor software application program product comprising a non-transitory computer-readable storage medium having instructions, which when executed by a processor of the client computer, cause the client computer to determine a change to one or more of a production parameter associated with producing the brewing material, a packaging parameter associated with packaging a produced brewing material, a storage parameter associated with a packaged and produced brewing material, or a delivery parameter associated with a packaged and produced brewing material.

In some embodiments in accordance with the present technology (example 19), a beverage pod for brewing a beverage includes a pod structure to contain a brewing material and having a shape to fit into an interior region of a brewing canister assembly, the pod structure including a porous material allowing fluid to contact the brewing material and extract constituents of the brewing material for a brewed beverage.

Example 20 includes the beverage pod of example 19, wherein the pod structure includes an interior region that facilitates expansion of the brewing material upon exposure to the fluid during brewing.

Example 21 includes the beverage pod of any of examples 19-20, wherein the brewing canister assembly is structured to include a base and a wall surrounding the interior region, the wall including at least one component operable to move between a closed position and an open position, the open position providing at least one hole between an exterior and an interior of the brewing canister assembly to allow fluid to flow in and out of the brewing canister assembly.

In some embodiments in accordance with the present technology (example 22), a beverage pod maker includes a first container to hold a beverage material; a beverage pod material attachable to a bottom region of the first container and structured to include an opening aligned with the first container to allow the beverage material to enter therein; and a pod closure mechanism configured to seal the opening of the beverage pod material after the beverage material enters the beverage pod material from the first container.

In some embodiments in accordance with the present technology (example 23), a beverage pod maker includes a beverage material chamber; a pod material holder; and a pod closure mechanism configured to seal the pod material together after the beverage material in the beverage material chamber is placed in the pod material.

In some embodiments in accordance with the present technology (example 24), a beverage pod maker includes a beverage material chamber; a beverage material grinder positioned in the beverage material chamber; a pod material holder; and a pod closure mechanism configured to seal the pod material together after the beverage material in the beverage material chamber is ground and placed in the pod material.

In some embodiments in accordance with the present technology (example 25), a portable beverage device includes a container body having an interior chamber to contain a fluid; and a spinning mechanism positioned in the interior chamber configured for one or more of (i) cleaning, (ii) cleaning and extraction, (iii) cooling and/or venting/exposure to air, or (iv) extraction and cooling.

In some embodiments in accordance with the present technology (example 26), a removable ventable lid includes at least one hole positioning in the bottom of the lid; and (i) at least one piece operable to move between a closed position and an open position, the open position providing at least one hole positioned in the bottom of the lid access to the exterior of the lid and the closed position preventing access of the at least one hole at the bottom of the lid access to the exterior of the lid (ii) an actuator configured to modulate movement of the at least one piece between the open position and the closed position, such that air is able to flow in and out of the at least one hole when in the open position and is unable to flow in and out of the at least one hole when in the closed position.

In some embodiments in accordance with the present technology (example 27), a beverage device includes a container body having an interior chamber to contain a fluidic beverage; a flow sensor to detect fluid flow of the fluidic beverage from the device; and a data processing unit including a processor and a memory and configured to process data received from the fluid sensor.

Example 29 includes the beverage device of example 27, wherein the beverage device includes a software application program product comprising a non-transitory computer-readable storage medium having instructions, which when executed by a processor, cause the data processing unit or a processing unit of a mobile device in communication with the beverage device to process the data detected by the flow sensor to determine a parameter associated with a beverage constituent.

In some embodiments in accordance with the present technology (example 29), a method for monitoring and guiding a user's consumption of beverage compounds consumed from a beverage device includes obtaining data associated with a beverage in a beverage device; measuring one or more values associated dispensing of the beverage from the beverage device, the measuring using a fluid sensor of the beverage device; and analyzing the one or more values to determine one or more beverage constituent parameters associated with a beverage constituent consumed by the user over a time period.

Example 30 includes the method of example 29, wherein the obtaining the data includes receiving information from a user device inputted by the user, wherein the information about the beverage including one or more of beverage type, beverage amount, or content info associated with a constituent of the beverage.

Example 31 includes the method of example 29, wherein the one or more measured values include at least one of an amount of the beverage dispensed, a flow rate at which the beverage was dispensed, or a time of the dispensing.

Example 32 includes the method of example 29, wherein the analyzing includes receiving and processing one or more of motion data or location data to determine that the beverage was dispensed from the device for consumption.

Example 33 includes the method of example 29, wherein the analyzing includes processing the one or more measured values detected by the fluid sensor to determine one or more of a flow amount, a flow rate, or a time between dispensing events.

Example 34 includes the method of example 29, further comprising processing the beverage constituent parameter to determine a quantitative effect on a health and wellness goal or a beverage constituent consumption goal of the user.

Example 35 includes the method of example 34, further comprising producing a predictive analytical tool or result using machine-learning on the data and the determined quantitative effect to generate a decision support recommendation for the user with respect to the user's health and wellness goal or the beverage constituent consumption goal.

Example 36 includes the method of example 34, further comprising generating a command to change an operation of the beverage device based on the determined quantitative effect on the health and wellness goal or the beverage constituent consumption goal.

Example 37 includes the method of example 34, further comprising generating a notification to be delivered to the user based on the determined quantitative effect on the health and wellness goal or the beverage constituent consumption goal.

Example 38 includes the method of example 29, wherein the measuring the one or more values includes measuring one or more values of the beverage constituent of the beverage using an analyte sensor in the beverage device.

Example 39 includes the method of example 29, wherein the one or more beverage constituent parameters associated with the beverage constituent include an amount or concentration estimate of the beverage constituent in the user's body.

Example 40 includes the method of any of the preceding examples 29-39, wherein the beverage device includes the beverage device of example 27.

In some embodiments in accordance with the present technology (example 41), a method for monitoring and guiding a user's consumption of compounds from brewed beverages includes detecting a beverage constituent of a beverage using a sensor of a beverage device; analyzing the detected beverage constituent to determine one or more parameters associated with the beverage constituent consumed by a user over time period; obtaining health data of the user; processing the one or more parameters associated with the beverage constituent and the health data to determine a quantitative effect on a health and wellness goal or a beverage constituent consumption goal associated with the user; and generating a command to change an operation of the beverage device based on the determined quantitative effect; and/or generating a notification to be delivered to the user based on the determined quantitative effect.

Example 42 includes the method of example 41, further comprising producing a predictive analytical tool or result using machine-learning on the data and the determined quantitative effect to generate a decision support recommendation for the user with respect to the user's health and wellness goal or the beverage constituent consumption goal.

Example 43 includes the method of example 41, wherein the health data includes one or more of heart rate, body movement, blood pressure, blood oxygen level, electrophysiological reading, analyte level including a level of glucose, ATP, or electrolyte, body temperature, transpiration activity, respiratory activity, a pain event and level, or sleep information.

Example 44 includes the method of any of the preceding examples 41-43, wherein the beverage device includes the beverage device recited in any of the examples 1-18 and 27-28.

In some embodiments in accordance with the present technology (example 45), a method for monitoring and guiding a user's consumption of compounds from the brewed beverages includes detecting a beverage constituent of a beverage using a sensor of a beverage device; analyzing the detected beverage constituent to determine one or more parameters associated with the beverage constituent consumed by a user over time period; obtaining taste preference data of the user; processing the one or more parameters associated with the beverage constituent and the taste preference data to produce a brewable beverage product profile associated with the user; and generating a command with instructions to be received by a client computer of a beverage material vendor to modify a beverage material production process to customize a beverage product according to one or more taste parameters from the brewable beverage product profile.

Example 46 includes the method of example 45, further comprising producing a predictive analytical tool or result using machine-learning on the data and the produced brewable beverage product profile to generate decision support recommendations for the user with respect to a preferred beverage or beverage consumption goal of the user.

Example 47 includes the method of example 45, further comprising generating a notification to be delivered to the user based on the brewable beverage product profile.

Example 48 includes the method of any of the preceding examples 45-48, wherein the beverage device includes the beverage device recited in any of the examples 1-18 and 27-28.

Implementations of the subject matter and the functional operations described in this patent document are optionally implemented in various systems, digital electronic circuitry, or in computer software, firmware, or hardware, including the structures disclosed in this specification and their structural equivalents, or in combinations of one or more of them. Implementations of the subject matter described in this specification are optionally implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) is optionally written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program is optionally deployed for execution on one computer or on multiple computers that are located at one site or distributed across multiple sites and interconnected by a communication network.

The processes and logic flows described in this specification are optionally performed by one or more programmable processors executing one or more computer programs to perform functions by operating on input data and generating output. The processes and logic flows can also be performed by, and apparatus are also optionally implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

Unless otherwise defined, all technical terms used herein have the same meaning as commonly understood by one of ordinary skill in the art to which this invention belongs. As used in this specification and the appended claims, the singular forms "a," "an," and "the" include plural references unless the context clearly dictates otherwise. Any reference to "or" herein is intended to encompass "and/or" unless otherwise stated. Any reference to "exemplary" herein is intended to encompass "example" unless otherwise stated.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A portable beverage brewing device, comprising:
a container body having an interior chamber to contain a fluid;
a brewing canister assembly positioned in the interior chamber and including (i) at least one component operable to move between a closed position and an open position, the open position providing at least one hole between an exterior and an interior of the brewing canister assembly, and (ii) an actuator configured to modulate movement of the at least one component between the open position and the closed position, such that the fluid is able to flow in and out of the brewing canister assembly when in the open position and is unable to flow in and out of the brewing canister assembly when in the closed position, wherein the brewing canister assembly is operable to contain a brewing material in the interior of the brewing canister assembly and regulate fluid flow in and out of the brewing canister assembly to brew the brewing material;

one or more modular units to regulate or monitor one or more parameters associated with a beverage to be brewed by the portable beverage brewing device, wherein the one or more modular units includes a heating unit to modulate heating of the fluid, an analyte sensor to measure a concentration or an amount of a constituent of the beverage within the portable beverage brewing device, and a flow sensor to detect fluid flow of the beverage from the portable beverage brewing device; and a data processing unit, including a processor and a memory comprising instructions executable by the processor, configured to process data and produce one or more commands to the actuator of the brewing canister assembly and the one or more modular units of the portable beverage brewing device, the data processing unit configured to wirelessly communicate health data associated with a user of the portable beverage brewing device with a software application program product resident on a mobile device, wherein the health data includes one or more of a heart rate level, a movement level, a blood oxygen level, a blood pressure measurement, an electrophysiological measurement, a glucose level, an ATP level, an electrolyte level, a body temperature measurement, a transpiration activity level, a respiratory activity level, a pain event and level, or sleep information, wherein the software application program product comprises a non-transitory computer-readable storage medium having instructions, which when executed by a processing unit of the mobile device, cause the mobile device to process data detected by the flow sensor and the analyte sensor to determine a beverage constituent parameter including one or more of an amount, a concentration or a volume of a constituent of the beverage dispensed from the portable beverage brewing device, wherein the data processing unit is further configured to process the beverage constituent parameter and the health data to determine a quantitative value associated with an effect of consumption of the constituent of the fluid beverage.

2. The portable beverage brewing device of claim 1, further comprising:
a temperature sensor to detect a temperature of the fluid.

3. The portable beverage brewing device of claim 1, wherein the one or more modular units further includes a cooling unit to modulate cooling of the fluid.

4. The portable beverage brewing device of claim 1, further comprising:
a display on an exterior of the container body and in communication with the data processing unit, wherein the display is configured to display information pertaining to a parameter associated with the beverage.

5. The portable beverage brewing device of claim 1, further comprising:
a reversibly attachable lid to cover an opening of the container body, the lid including an aperture and an aperture cover to allow the fluid to flow out of the interior chamber when the lid is attached to the container body.

6. The portable beverage brewing device of claim 5, wherein the one or more modular units further includes a venting system including one or more venting holes in one or both of the container body and the reversibly attachable lid, the venting system including a vent-stop mechanism coupled to the one or more venting holes accessible to the interior chamber and passing through the one or both of the container body and the lid to access an exterior of the portable beverage brewing device, wherein the venting system allows outside air to access the fluid in the interior chamber.

7. The portable beverage brewing device of claim 6, wherein the one or more modular units further includes a spinning apparatus in the interior chamber configured to rotate and agitate the fluid in the interior chamber, wherein agitation of the fluid aids in flow of the outside air to expose the fluid to more air and cool the fluid.

8. The portable beverage brewing device of claim 7, wherein the spinning apparatus is configured to clean one or both of the interior chamber and the brewing canister assembly.

9. The portable beverage brewing device of claim 1, wherein the instructions, when executed by the processor of the processing unit, cause the mobile device to:
receive health data associated with a user of the portable beverage brewing device, wherein the health data includes one or more of a heart rate level, a movement level, a blood oxygen level, a blood pressure measurement, an electrophysiological measurement, a glucose level, an ATP level, an electrolyte level, a body temperature measurement, a transpiration activity level, a respiratory activity level, a pain event and level, or sleep information,
obtain or determine a health and wellness goal of the user, wherein the health and wellness goal includes a threshold value or range of values for at least some of the health data, and
process the beverage constituent parameter and the health data to determine a quantitative value associated with an effect of consumption of the constituent of the beverage on the health and wellness goal.

10. The portable beverage brewing device of claim 1, wherein the beverage includes coffee, tea, or soda pop, and the wherein the constituent includes caffeine or diterpene.

11. The portable beverage brewing device of claim 1, wherein the one or more parameters include at least one of a brewing temperature, a drinking temperature, a fluid flow rate, an amount of a brewed beverage, an extraction value associated with the brewed beverage, a brewing time, a spinning rate of a spinning mechanism, a spinning time of a spinning mechanism, or a venting time.

12. A portable beverage system, comprising:
a portable beverage device, comprising:
a data processing unit, including a processor, a memory comprising instructions executable by the processor, and a wireless transmitter, wherein the data processing unit is configured to receive data from sensors in the portable beverage device and to wirelessly transmit the data; and
a software application program product resident on a mobile device in wireless communication with the portable beverage device, the software application program product comprising a non-transitory computer-readable storage medium having instructions, which when executed by a processing unit of the mobile device cause the mobile device to process the data detected by the sensors in the portable beverage device to determine a beverage constituent parameter including one or more of an amount, a concentration or a volume of a constituent of the fluid beverage dispensed from the portable beverage device, wherein the instructions, when executed by the processor of the processing unit of the mobile device, cause the mobile device to:

receive health data associated with a user of the portable beverage device, wherein the health data includes one or more of a heart rate level, a movement level, a blood oxygen level, a blood pressure measurement, an electrophysiological measurement, a glucose level, an ATP level, an electrolyte level, a body temperature measurement, a transpiration activity level, a respiratory activity level, a pain event and level, or sleep information; and process the beverage constituent parameter and the health data to determine a quantitative value associated with an effect of consumption of the constituent of the fluid beverage.

13. The portable beverage system of claim 12, wherein the instructions, when executed by the processor of the processing unit of the mobile device, cause the mobile device to: obtain or determine a health and wellness goal of the user, wherein the health and wellness goal includes a threshold value or range of values for at least some of the health data, and process the beverage constituent parameter and the health data to determine a quantitative value associated with an effect of consumption of the constituent of the fluid beverage on the health and wellness goal.

14. The portable beverage system of claim 12, wherein the portable beverage device includes a brewing canister assembly operable to contain a brewing material in an interior region of the brewing canister assembly and regulate fluid flow in and out of the brewing canister assembly to brew the brewing material, wherein the brewing canister assembly is positioned in the interior chamber of the container body and includes (i) at least one component operable to move between a closed position and an open position, the open position providing at least one hole between an exterior and an interior of the brewing canister assembly, and (ii) an actuator configured to modulate movement of the at least one component between the open position and the closed position, such that a fluid contained in the interior chamber of the container body is able to flow in and out of the brewing canister assembly when in the open position and is unable to flow in and out of the brewing canister assembly when in the closed position.

15. The portable beverage system of claim 14, wherein the portable beverage system is operable to regulate or monitor one or more parameters associated with the fluid beverage in the portable beverage device, the one or more parameters including at least one of a brewing temperature, a drinking temperature, a fluid flow rate, an amount of a brewed beverage, an extraction value associated with the brewed beverage, a brewing time, a spinning rate of a spinning mechanism, a spinning time of a spinning mechanism, or a venting time.

16. The portable beverage system of claim 12, wherein the portable beverage device includes a temperature sensor to detect a temperature of the fluid beverage.

17. The portable beverage system of claim 12, wherein the portable beverage device includes a heating unit to modulate heating of the fluid beverage.

18. The portable beverage system of claim 12, wherein the portable beverage device includes a cooling unit to modulate cooling of the fluid beverage.

19. A portable beverage system, comprising:

a portable beverage device, comprising:

a container body having an interior chamber to contain a fluid beverage, a sensor to measure an amount of fluid dispensed from the portable beverage device, and a data processing unit, including a processor, a memory comprising instructions executable by the processor, and a wireless transmitter, wherein the data processing unit is configured to receive data from the sensor of the portable beverage device and to wirelessly transmit the data; and a software application program product resident on a mobile device in wireless communication with the portable beverage device, the software application program product comprising a non-transitory computer-readable storage medium having instructions, which when executed by a processing unit of the mobile device cause the mobile device to (i) receive beverage information about the fluid beverage including at least one of a beverage type or an amount of the fluid beverage, and (ii) process the beverage information and the data detected by the sensor of the portable beverage device to estimate a beverage constituent parameter dispensed from the portable beverage device, the beverage constituent parameter including one or more of an amount, a concentration or a volume of a constituent of the fluid beverage, wherein the instructions, when executed by the processor of the processing unit of the mobile device, cause the mobile device to:

receive health data associated with a user of the portable beverage device, wherein the health data includes one or more of a heart rate level, a movement level, a blood oxygen level, a blood pressure measurement, an electrophysiological measurement, a glucose level, an ATP level, an electrolyte level, a body temperature measurement, a transpiration activity level, a respiratory activity level, a pain event and level, or sleep information; and process the beverage constituent parameter and the health data to determine a quantitative value associated with an effect of consumption of the constituent of the fluid beverage.

20. The portable beverage system of claim 19, wherein the instructions, when executed by the processor of the processing unit of the mobile device, further cause the mobile device to:

obtain or determine a health and wellness goal of the user.

21. The portable beverage system of claim 20, wherein the health and wellness goal includes a threshold value or range of values for at least some of the health data.

22. The portable beverage system of claim 19, wherein the portable beverage device includes a brewing canister assembly operable to contain a brewing material in an interior region of the brewing canister assembly and regulate fluid flow in and out of the brewing canister assembly to brew the brewing material, wherein the brewing canister assembly is positioned in the interior chamber of the container body and includes (i) at least one component operable to move between a closed position and an open position, the open position providing at least one hole between an exterior and an interior of the brewing canister assembly, and (ii) an actuator configured to modulate movement of the at least one component between the open position and the closed position, such that a fluid contained in the interior chamber of the container body is able to flow in and out of the brewing canister assembly when in the open position and is unable to flow in and out of the brewing canister assembly when in the closed position.

23. The portable beverage system of claim 22, wherein system is operable to regulate or monitor one or more parameters associated with the fluid beverage in the portable beverage device, the one or more parameters including at least one of a brewing temperature, a drinking temperature, a fluid flow rate, an amount of a brewed beverage, an extraction value associated with the brewed beverage, a brewing time, a spinning rate of a spinning mechanism, a spinning time of a spinning mechanism, or a venting time.

24. The portable beverage system of claim 19, wherein the portable beverage device includes a temperature sensor to detect a temperature of the fluid beverage.

25. The portable beverage system of claim 19, wherein the portable beverage device includes a heating unit to modulate heating of the fluid beverage.

26. The portable beverage system of claim 19, wherein the portable beverage device includes a cooling unit to modulate cooling of the fluid beverage.

\* \* \* \* \*